US010699284B2

(12) United States Patent
Sheth et al.

(10) Patent No.: US 10,699,284 B2
(45) Date of Patent: *Jun. 30, 2020

(54) INFORMATION MANAGEMENT SYSTEM FOR PRODUCT INGREDIENTS TO FILL GAPS IN THE MARKET AND TO DETERMINE PROPER ATTRIBUTION

(71) Applicant: Label Insight, Inc., Chicago, IL (US)

(72) Inventors: Ronak Sheth, Chicago, IL (US); Anton Xavier, Chicago, IL (US); Dagan Xavier, Chicago, IL (US); Dheeraj Patri, Chicago, IL (US); Tyler Trollinger, Chicago, IL (US); Harrison Nguyen, Chicago, IL (US); John Castaldo, Chicago, IL (US); Jeffrey Williams, Chicago, IL (US); Abbie Bys, Chicago, IL (US); Paul Hutchinson, Chicago, IL (US); James Shedlick, Chicago, IL (US); Jack Mallers, Chicago, IL (US)

(73) Assignee: Label Insight, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,287

(22) Filed: Jun. 29, 2018

(65) Prior Publication Data
US 2018/0322512 A1 Nov. 8, 2018

Related U.S. Application Data

(63) Continuation-in-part of application No. 15/910,949, filed on Mar. 2, 2018, now Pat. No. 10,552,793, (Continued)

(51) Int. Cl.
*G06Q 30/02* (2012.01)
*G06F 16/583* (2019.01)
*G06K 9/00* (2006.01)

(52) U.S. Cl.
CPC .......... *G06Q 30/02* (2013.01); *G06F 16/583* (2019.01); *G06K 9/00442* (2013.01)

(58) Field of Classification Search
CPC ......... G06K 19/06037; G06K 7/10861; G06K 7/1417; G06F 17/2725; G06F 17/277; G06Q 10/087
See application file for complete search history.

(56) References Cited

U.S. PATENT DOCUMENTS

| 8,639,036 B1 * | 1/2014 | Singer .................. G06K 9/6217 382/141 |
| 9,721,446 B1 | 8/2017 | Hanis |

(Continued)

FOREIGN PATENT DOCUMENTS

WO WO2008/031163 A1 3/2008

OTHER PUBLICATIONS

International Search Report & Written Opinion in related PCT App No. PCT/US2017/046348, dated Nov. 2, 2017.
(Continued)

*Primary Examiner* — Laura A Gudorf
(74) *Attorney, Agent, or Firm* — Polsinelli PC

(57) ABSTRACT

An ingredient data system that ingests text and graphics of product labels associated with consumer products generally includes a memory having instructions stored thereon; and at least one processor to execute the instructions to transmit via a network a representation of a label view to a user interface on a client computing device that displays one or more of the master attributes associated with the first request, at least a portion of each of the images of one or more of the product labels of the consumer products having one or more of the master attributes associated with the first request, and at least a portion of each of the images of one or more of the product labels associated with the related consumer products having
(Continued)

the at least one master attribute different from one or more of the master attributes associated with the first request.

20 Claims, 13 Drawing Sheets

Related U.S. Application Data which is a continuation-in-part of application No. PCT/US2017/046348, filed on Aug. 10, 2017.

(60) Provisional application No. 62/468,408, filed on Mar. 8, 2017, provisional application No. 62/372,958, filed on Aug. 10, 2016.

(56) References Cited

U.S. PATENT DOCUMENTS

| | | |
|---|---|---|
| 2006/0122468 A1 | 6/2006 | Tavor et al. |
| 2012/0005222 A1 | 1/2012 | Bhagwan |
| 2012/0117072 A1* | 5/2012 | Gokturk .............. G06F 16/954 |
| | | 707/740 |
| 2013/0105565 A1 | 5/2013 | Kamprath |
| 2013/0295532 A1 | 11/2013 | Minvielle |
| 2014/0156412 A1 | 6/2014 | Tse |
| 2014/0180874 A1* | 6/2014 | Zhao ................ G06Q 30/0643 |
| | | 705/26.61 |
| 2014/0322678 A1 | 10/2014 | Briancon et al. |
| 2015/0100516 A1 | 4/2015 | Hicks |
| 2016/0104225 A1 | 4/2016 | Stillman |
| 2016/0307246 A1 | 10/2016 | Porubcan |
| 2017/0039885 A1 | 2/2017 | Flores |
| 2017/0237899 A1 | 8/2017 | Wexler |

OTHER PUBLICATIONS

Nonfinal Office Action, U.S. Appl. No. 15/466,091, dated Nov. 1, 2017.

Response to Nonfinal Office Action, U.S. Appl. No. 15/466,091, filed Mar. 1, 2018.

* cited by examiner

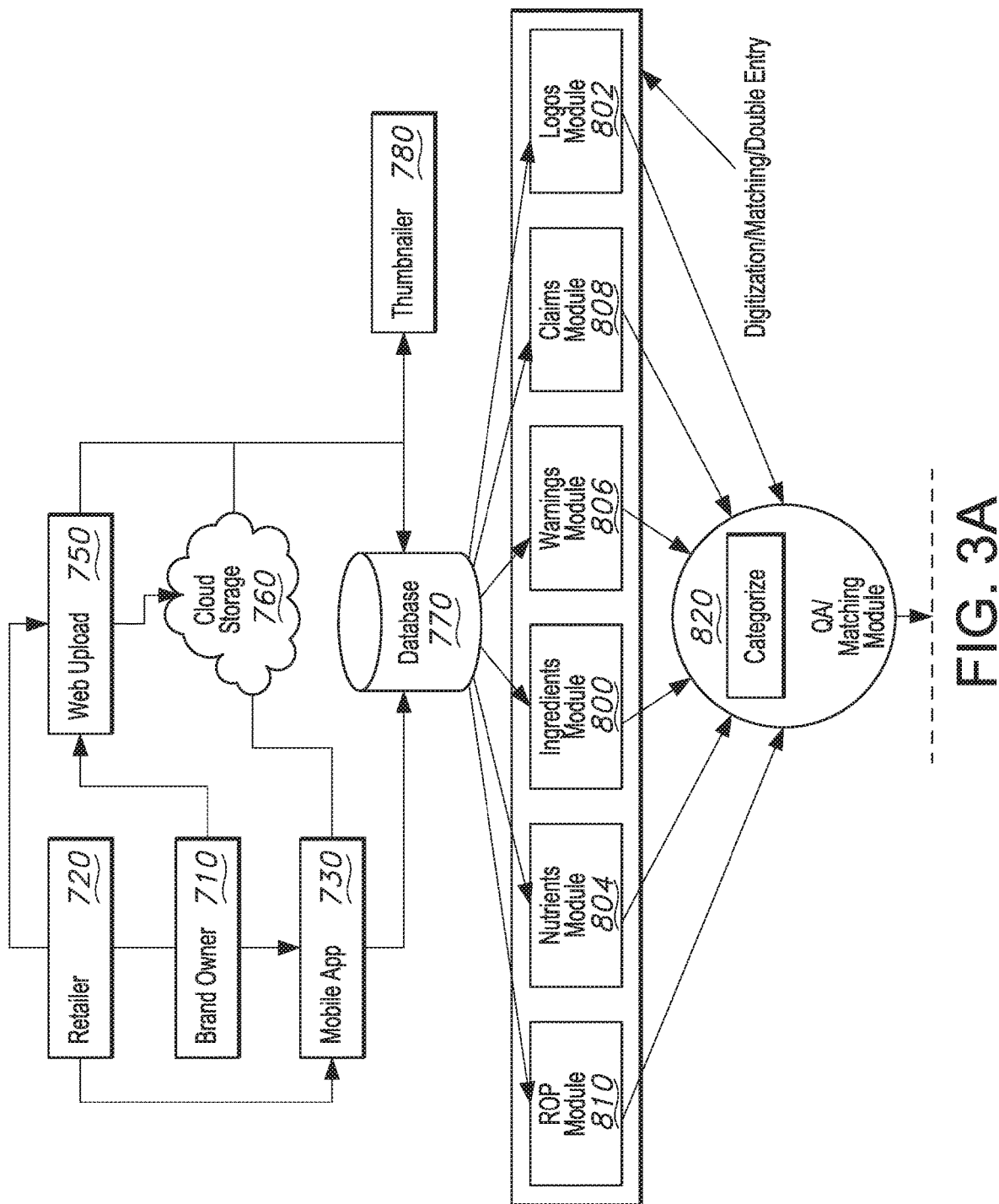

US 10,699,284 B2

INFORMATION MANAGEMENT SYSTEM FOR PRODUCT INGREDIENTS TO FILL GAPS IN THE MARKET AND TO DETERMINE PROPER ATTRIBUTION

CROSS-REFERENCE TO RELATED APPLICATIONS

The present application is a continuation-in-part of U.S. Non-provisional application Ser. No. 15/910,949, filed Mar. 2, 2018, entitled Information Management System for Product Ingredients, which is a bypass continuation-in-part of International Application PCT/US17/46348, filed Aug. 10, 2017, and published as WO/2018/031805 on Feb. 15, 2018, which claims priority to U.S. Provisional Application No. 62/468,408, filed Mar. 8, 2017, and U.S. Provisional Application No. 62/372,958, filed Aug. 10, 2016, both entitled Information Management System for Product Ingredients. This application cross-references U.S. Non-provisional application Ser. No. 15/466,029, filed Mar. 22, 2017, entitled Information Management System for Product Ingredients; U.S. Non-provisional application Ser. No. 15/466,059, filed Mar. 22, 2017, entitled Information Management System for Product Ingredients; and U.S. Non-provisional application Ser. No. 15/466,091, filed Mar. 22, 2017, entitled Information Management System for Product Ingredients. The above-captioned applications are hereby incorporated by reference as if set forth herein in their entirety.

FIELD

The present disclosure relates to an information management computing system and related network computing systems for automatically capturing, analyzing, and manipulating product information, such as for food products, including an omnibus ingredient detection system that automatically detects and deconstructs information typically displayed on the labels of products.

BACKGROUND

A typical food package contains various information, including information about amounts of various ingredients and other information, such as marketing claims, certification information, and the like. However, ingredient text on the packaging can be long and highly complex, and many different words can be used to identify the same ingredient or set of ingredients. Ingredients contained in lists are quite frequently nearly incomprehensible to an average consumer. Ingredient lists, marketing claims, and other text can also include confusing statements such as and/or statements, compound and parenthetical listings, and even somewhat opaque terms like "contains natural flavors." The product packaging includes many other graphics and text that can be more helpful or more confusing to the consumer. Moreover, the product packaging and labeling can vary greatly between manufacturers and retailers, resulting in differing label formats and ingredient information that can make it difficult to compare across the products from different manufacturers. Ingredients are also difficult to manage for manufacturers themselves, who may not understand what statements they can make that comply with regulatory requirements, requirements of certification, and advertising regulations. As a result of the complexity and obscurity of ingredient information, manufacturers and retailers may not fully understand competitive products, so it can be difficult to understand how products should be positioned relative to third party products. Regulators may also find it difficult to confirm compliance. Accordingly, the inventors have recognized a need for improved systems and technology for managing ingredient information.

BRIEF DESCRIPTION OF THE DRAWINGS

The many aspects of the present disclosure and how they may be implemented in practice are described below by way of non-limiting examples and with reference to the accompanying drawings.

FIGS. 3A, 3B, 3C and 3D are partial diagrams that form together an exemplary ingredient data management platform and computing environment of the ingredient detection system that receives information from the label of the product in accordance with the present disclosure.

SUMMARY

Figure 1:
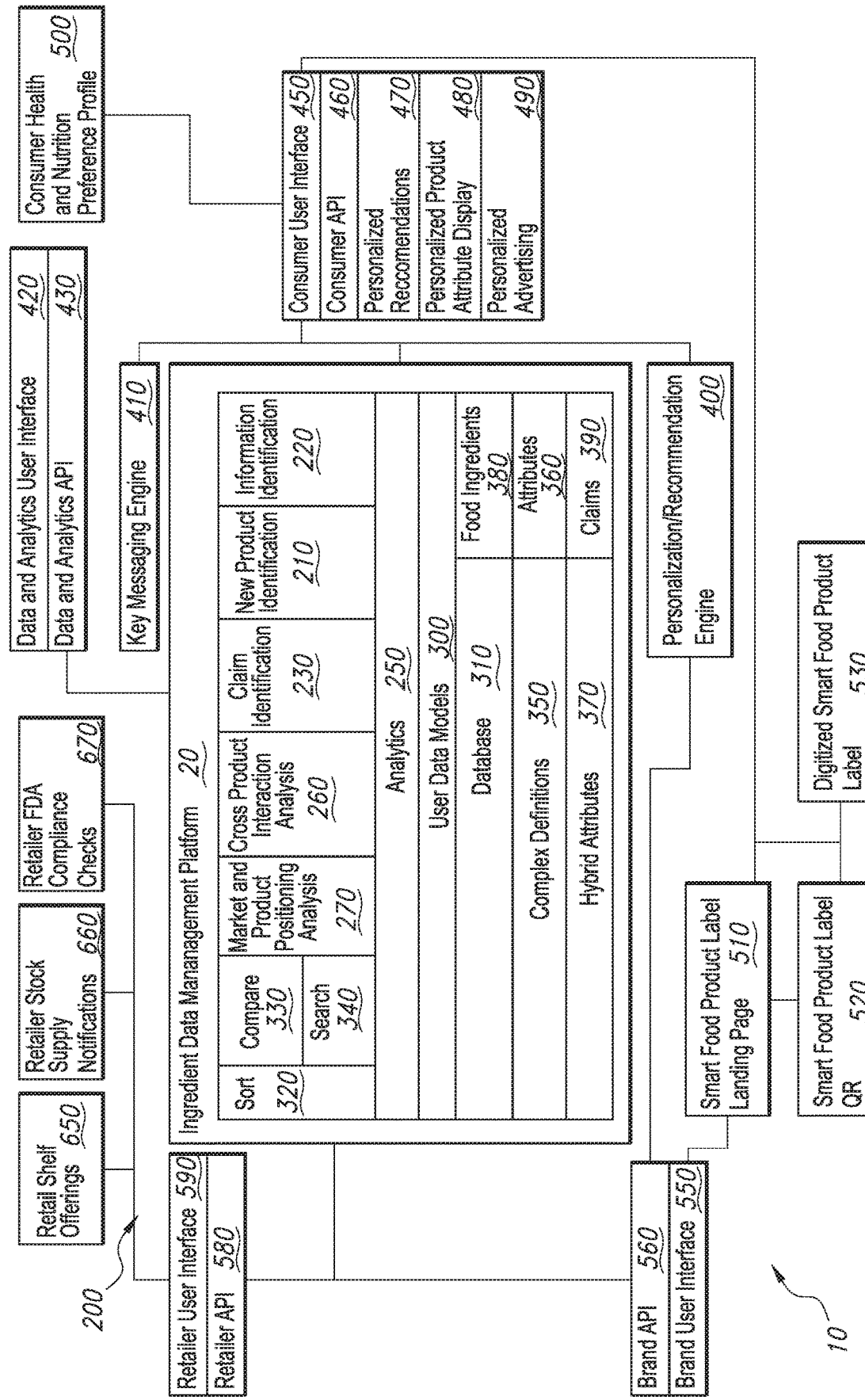
FIG. 1 is a diagram of an ingredient detection system having an ingredient data management platform including a technology stack in accordance with various aspects of the present disclosure.

In many aspects, an ingredient data system that ingests text and graphics of product labels associated with consumer products includes a memory having instructions stored thereon. The system also includes at least one processor to execute the instructions to: process and parse the text and graphics of images of the product labels to identify at least one piece of constituent information from the text and graphics, associate one or more base attributes to each piece of the constituent information, and assign one or more of the base attributes to one or more master attributes that are descriptive of one of claims, ingredients, and nutritional information of one or more of the consumer products having the product labels; store in a database the images of one or more of the product labels, one or more of the base attributes, and one or more of the master attributes associated with each of the product labels of the consumer products; receive a first request about one or more of the consumer products having one or more of the master attributes; retrieve at least a portion of one of one or more of the images of the product labels from the database based on one or more of the master attributes and at least a portion of one or more images of product labels associated with related consumer products from the storage system having at least one master attribute different from one or more of the master attributes associated with the first request; and transmit via a network a representation of a label view to a user interface on a client computing device that displays one or more of the master attributes associated with the first request, at least a portion of each of the images of one or more of the product labels of the consumer products having one or more of the master attributes associated with the first request, and at least a portion of each of the images of one or more of the product labels associated with the related consumer products having the at least one master attribute different from one or more of the master attributes associated with the first request.

In the many aspects, the at least one processor further executes the instructions to: receive a second request about one or more of the related consumer products; and transmit, in response to the second request, a representation of the label view to the user interface on the client computing device that displays at least a portion of the images of one or more of the product labels associated with the related consumer products and detail regarding constituent information set forth in or absent from one or more of the product labels associated with the related consumer products having one or more of the master attributes different from the one or more master attributes associated with the first request.

In the many aspects, one or more of the master attributes associated with the first request provide information displayed on the user interface by the client device that is different from the text and graphics of the product labels of the consumer products having the one or more master attributes.

In the many aspects, the user interface receives an adjustment of one or more of the base attributes, which were assigned to the one or more of the master attributes associated with the first request.

In the many aspects, the first and second request are from one of a retailer and a brand owner. The label view displays via the user interface at least a portion of each of the images of one or more of the product labels of the related consumer products and detail regarding constituent information set forth in or absent from one or more of the product labels associated with consumer products having one or more master attributes different from the one or more master attributes associated with the first request.

In the many aspects, the at least one processor further executes the instructions to: generate and populate a first layer of information that includes in combination, at least a portion of the images of one or more of the product labels, one or more of the base attributes associated with the constituent information identified in the text and graphics on one or more of the product labels, and one or more of the master attributes associated with the one or more of the base attributes; generate and populate a second layer of information with information from the first layer of information and receive changes to the second layer of information via the user interface; and transmit a representation of the label view to the user interface to display at least the second layer of information with the changes received from the user interface.

In the many aspects, the at least one processor further executes the instructions to accept changes from the client computing device via the user interface to the second layer of information while preventing changes to the first layer of information.

In the many aspects, the at least one processor further executes the instructions to transmit contents of the label view to the user interface to display in the label view at least a portion of the first layer of information and at least a portion of the second layer of information with the changes from the user interface that hide from display at least a portion of the first layer of information in the label view.

In the many aspects, the at least one processor further executes the instructions to transmit contents of the label view to the user interface to display the second layer of information with the changes from the user interface that includes information in addition to the first layer of information.

In the many aspects, the at least one processor further executes the instructions to receive a request from one of a brand owner and a retailer to publish immediately to the label view the second layer of information and transmit contents of the label view to the user interface to display the second layer of information with the changes received from the user interface.

In the many aspects, the label view is accessible via the user interface from the client device that is selected from a group consisting of at least one of a smartphone, a handheld scanner, a kiosk by the consumer, a wearable, and a computer.

In the many aspects, the consumer products having the product labels are selected from a group consisting of at least one of foods, beverages, consumer packaged goods, and personal items.

In the many aspects, the system includes a point-of-sale computing device that communicates via the network. The point-of-sale computing device transmits to the at least one processor at least a portion of sales history for the consumer products associated with the first request and the related consumer products having the one or more master attributes different from the one or more master attributes associated with the first request.

In many aspects, an ingredient data system that ingests text and graphics of product labels associated with consumer products includes a memory having instructions stored thereon. The system also includes at least one processor to execute the instructions to: process and parse the text and graphics of images of the product labels to identify at least one piece of constituent information from the text and graphics, associate one or more base attributes to each piece of the constituent information, and assign one or more of the base attributes to one or more master attributes that are descriptive of one of claims, ingredients, and nutritional information of one or more of the consumer products having the product labels; store in a database the images of the product labels, one or more of the base attributes, and one or more of the master attributes associated with each of the product labels of the consumer products; receive a first request about one or more of the consumer products having one or more of the master attributes; retrieve at least a portion of one of one or more of the images of the product labels from the database based on one or more of the master attributes associated with the first request and at least a portion of one or more images of product labels associated with related consumer products from the database having at least one master attribute different from one or more of the master attributes associated with the first request; and transmit via a network a representation of an electronic label view to a user interface on a client computing device that displays one or more of the master attributes associated with the first request, at least a portion of each of the images of one or more of the product labels having one or more of the master attributes associated with the first request, and at least a portion of each of the images of one or more of the product labels associated with the related consumer products. The first request is from one of a retailer and a brand owner. The electronic label view displays via the user interface at least a portion of each of the images of one or more of the product labels of the consumer products that are not associated with the first request and detail regarding constituent information set forth in or absent from one or more of the product labels associated with the related consumer products having at least one master attribute different from one or more of the master attributes associated with the first request.

In the many aspects, the user interface receives an adjustment of one or more of the base attributes, which were assigned to the one or more of the master attributes associated with the first request.

In the many aspects, the at least one processor further executes the instructions to: receive a second request about one or more of the related consumer products; and transmit, in response to the second request, a representation of the electronic label view to the user interface to display at least a portion of each of the images of one or more of the product labels associated with the related consumer products and detail regarding constituent information set forth in or absent from one or more of the product labels associated with the related consumer products having at least one master attribute different from one or more of the master attributes associated with the first request.

In the many aspects, one or more of the master attributes associated with the first request provide information via the user interface to the client device that is different from the text and graphics of the product labels of the consumer products having the one or more master attributes.

In the many aspects, the at least one processor further executes the instructions to: generate and populate a first layer of information that includes in combination, at least a portion of the images of one or more of the product labels, one or more of the base attributes associated with the constituent information identified in the text and graphics on one or more of the product labels, and one or more of the master attributes associated with the one or more of the base attributes; generate and populate a second layer of information with information from the first layer of information and receive changes to the second layer of information via the user interface; and transmit contents of the electronic label view to the user interface to display at least the second layer of information with the changes received from the user interface.

In the many aspects, the at least one processor further executes the instructions to accept changes via the user interface to the second layer of information while preventing changes to the first layer of information via the user interface.

In the many aspects, the consumer products having the product labels are selected from a group consisting of at least one of foods, beverages, consumer packaged goods, and personal items.

In many aspects, an ingredient data system that ingests text and graphics of product labels associated with consumer products to check compliance with rules pertaining to what can be included on the product labels including a memory having instructions stored thereon. The system also includes at least one processor to execute the instructions to: process and parse the text and graphics of images of the product labels to identify at least one piece of constituent information from the text and graphics, associate one or more base attributes to each piece of the constituent information, and assign one or more of the base attributes to one or more master attributes that are descriptive of one of claims, ingredients, and nutritional information of one or more of the consumer products having the product labels; and store in a database the images of one or more of the product labels, one or more of the base attributes, and one or more of the master attributes associated with each of the product labels of the consumer products. The database also stores compliance information related to one or more of the consumer products. The at least one processor further executes the instructions to receive a first request about one or more of the consumer products having at least one or more of the base attributes; retrieve at least a portion of one of one or more of the images of the product labels from the database based on one or more of the base attributes associated with the first request and the compliance information for each of the product labels associated with the consumer products; and transmit via a network a representation of a label view to a user interface on a client computing device that displays one or more of the base attributes associated with the first request, at least a portion of each of the images of one or more of the product labels of the consumer products designated under one or more of the base attributes associated with the first request, and at least a portion of details of noncompliance when one or more of the pieces of the constituent information are identified as impermissible according to the compliance information.

In the many aspects, the at least one processor further executes the instructions to: receive a second request about one or more of the pieces of the constituent information identified as impermissible according to the compliance information; and transmit, in response to the second request, a representation of the label view to the user interface on the client computing device that displays at least a portion of the details of the noncompliance including constituent information determined to be impermissible in one or more of the product labels associated with the first request according to the compliance information.

In the many aspects, one or more of the master attributes associated with the first request provide information displayed on the user interface to the client device other than in the text and graphics of the product labels of the consumer products having the assigned one or more master attributes.

In the many aspects, an impermissible piece of the constituent information according to the compliance information includes constituent information identified as being one of subject to a recall, subject to a ban, and subject to an investigation.

In the many aspects, the compliance information is based on rules promulgated by a rulemaking authority associated with the consumer products associated with the first request.

In the many aspects, the first request originates from a same jurisdiction that empowers the rulemaking authority.

In the many aspects, the rulemaking authority is the Food and Drug Administration (FDA) and the jurisdiction is the United States of America.

In the many aspects, the rulemaking authority is the European Food Safety Authority (EFSA) and the jurisdiction is the European Union.

In the many aspects, the rulemaking authority is the World Health Organization.

In the many aspects, the rulemaking authority is a Non-Government Organization.

In the many aspects, the at least one processor further executes the instructions to: generate and populate a first layer of information that includes in combination, at least a portion of the images of one or more of the product labels, one or more of the base attributes associated with the constituent information identified in the text and graphics on one or more of the product labels, and one or more of the master attributes associated with the one or more of the base attributes; generate and populate a second layer of information with information from the first layer of information and receive changes to the second layer of information via the user interface; and transmit a representation of the label view to the user interface to display at least the second layer of information with the changes from the user interface.

In the many aspects, the at least one processor further executes the instructions to accept changes via the user interface to the second layer of information while preventing changes to the first layer of information via the user interface.

In the many aspects, the at least one processor further executes the instructions to transmit the representation of the label view to the user interface to display in the label view at least a portion of the first layer of information, at least a portion of the second layer of information with the changes from the user interface, and at least a portion of the details of the noncompliance including constituent information determined to be impermissible in one or more of the product labels associated with the first request in accordance with the compliance information after the changes to the second layer of information.

In the many aspects, the label view is accessible via the user interface from the client device that is selected from a group consisting of at least one of a smartphone, a handheld scanner, a kiosk by the consumer, a wearable, and a computer.

In the many aspects, the consumer products having the product labels are selected from a group consisting of at least one of foods, beverages, consumer packaged goods, and personal items.

In many aspects, an ingredient data system that ingests text and graphics of product labels associated with consumer products to check compliance with rules pertaining to what can be included on the product labels including a memory having instructions stored thereon. The system also includes at least one processor to execute the instructions to: process and parse the text and graphics of images of the product labels to identify at least one piece of constituent information from the text and graphics, associate one or more base attributes to each piece of the constituent information, and assign one or more of the base attributes to one or more master attributes that are descriptive of one of claims, ingredients, and nutritional information of one or more of the consumer products having the product labels; and store in a database the images of one or more of the product labels, one or more of the base attributes, and one or more of the master attributes associated with each of the product labels of the consumer products. The storage system also stores compliance information related to one or more of the consumer products based on information from the Food and Drug Administration (FDA). The at least one processor further executes the instructions to receive a first request about one or more of the consumer products having at least one or more of the base attributes; retrieve at least a portion of one of one or more of the images of the product labels from the database based on one or more of the base attributes associated with the first request and the compliance information for each of the product labels associated with the consumer products; and transmit via a network a representation of a label view to a user interface on a client computing device that displays one or more of the base attributes associated with the first request, at least a portion of each of the images of one or more of the product labels of the consumer products associated with one or more of the base attributes associated with the first request, and at least a portion of details of noncompliance when at least one of the pieces of the constituent information are identified as impermissible according to the compliance information including which of the at least one piece of constituent information set forth in one or more of the product labels associated with the first request is impermissible according to the compliance information. The at least one piece of constituent information is determined to be impermissible according to the compliance information when identified as being one of subject to a recall, subject to a ban, and subject to an investigation.

In the many aspects, one or more of the master attributes associated with the first request provide information via the user interface to the client device other than in the text and graphics of the product labels of the consumer products designated under the one or more master attributes.

In the many aspects, the at least one processor further executes the instructions to: generate and populate a first layer of information that includes in combination, at least a portion of the images of one or more of the product labels, one or more of the base attributes associated with the constituent information identified in the text and graphics on one or more of the product labels, and one or more of the master attributes associated with the one or more of the base attributes; generate and populate a second layer of information with information from the first layer of information and receive changes to the second layer of information via the user interface; and transmit contents of the label view to the user interface to display at least the second layer of information with the changes from the user interface while preventing changes to the first layer of information via the user interface.

In the many aspects, the at least one processor further executes the instructions to transmit a representation of the label view to the user interface to display in the label view at least a portion of the first layer of information, at least a portion of the second layer of information with the changes from the user interface, and at least a portion of the details of the noncompliance including constituent information determined to be impermissible in one or more of the product labels associated with the first request in accordance with the compliance information after the changes to the second layer of information.

In the many aspects, the label view is accessible via the user interface from the client device that is selected from a group consisting of at least one of a smartphone, a handheld scanner, a kiosk by the consumer, a wearable, and a computer.

In the many aspects, the consumer products having the product labels are selected from a group consisting of at least one of foods, beverages, consumer packaged goods, and personal items.

In many aspects, an ingredient data system that ingests text and graphics of product labels associated with consumer products including a memory having instructions stored thereon. The system also includes at least one processor to execute the instructions to: process and parse the text and graphics of images of the product labels to identify at least one piece of constituent information from the text and graphics, associate one or more base attributes to each piece of the constituent information, and assign one or more of the base attributes to one or more master attributes that are descriptive of one of claims, ingredients, and nutritional information of one or more of the consumer products having the product labels; store in a database the images of one or more of the product labels, one or more of the base attributes, one or more of the master attributes associated with each of the product labels of the consumer products, and at least a portion of a sales history and sales comparisons for the consumer products; receive a first request about one or more of the consumer products having one or more of the master attributes; retrieve at least a portion of one of one or more of the images of the product labels of the consumer products and at least a portion of the sales history from the database based on one or more of the master attributes associated with the first request; and retrieve at least a portion of one or more images of product labels associated with related consumer products and at least a portion of their sales history from the database. The related consumer products have different master attributes from the one or more of the master attributes associated with the first request. The at least one processor further executes the instructions to transmit via a network a representation of a label view to a user interface on a client computing device that displays one or more of the master attributes associated with the first request, at least a portion of each of the images of one or more of the product labels of the consumer products having the one or more master attributes associated with the first request and at least a portion of the sales history, and at least a portion of each of the images of one or more of the product labels associated with the related consumer products and at least a portion of a sales history.

In the many aspects, the at least one processor further executes the instructions to: receive a second request about one or more of the related consumer products; and transmit, in response to the second request, a representation of the label view to the user interface on the client computing device that displays at least a portion of the images of one or more of the product labels associated with the related consumer products and detail regarding constituent information set forth in or absent from one or more of the product labels associated with the related consumer products having one or more of the master attributes different from the one or more master attributes associated with the first request.

In the many aspects, one or more of the master attributes associated with the first request provide information via the user interface to the client device that is different from the text and graphics of the product labels of the consumer products having the one or more master attributes.

In the many aspects, the user interface receives an adjustment of one or more of the base attributes, which were assigned to the one or more of the master attributes associated with the first request.

In the many aspects, the first and second request are from one of a retailer and a brand owner. The label view displays via the user interface at least a portion of each of the images of one or more of the product labels of the related consumer products and detail regarding constituent information set forth in or absent from one or more of the product labels associated with the consumer products having different master attributes from the one or more master attributes associated with the first request. The label view displays on the user interface at least a portion of one or more of the sales comparisons detailing at least one of the consumer products associated with the first request and one of the related consumer products.

In the many aspects, the at least one processor further executes the instructions to: generate and populate a first layer of information that includes in combination, at least a portion of the images of one or more of the product labels, one or more of the base attributes associated with the constituent information identified in the text and graphics on one or more of the product labels, and one or more of the master attributes associated with the one or more of the base attributes; generate and populate a second layer of information with information from the first layer of information and receive changes to the second layer of information via the user interface; and transmit a representation of the label view to the user interface to display at least the second layer of information with the changes from the user interface.

In the many aspects, the at least one processor further executes the instructions to accept changes via the user interface to the second layer of information while preventing changes to the first layer of information via the user interface.

In the many aspects, the label view is accessible via the user interface from the client device that is selected from a group consisting of at least one of a smartphone, a handheld scanner, a kiosk by the consumer, a wearable, and a computer.

In the many aspects, the consumer products having the product labels are selected from a group consisting of at least one of foods, beverages, consumer packaged goods, and personal items.

In many aspects, an ingredient data system that ingests text and graphics of product labels associated with consumer products including a memory having instructions stored thereon. The system includes at least one processor to execute the instructions to: process and parse the text and graphics of images of the product labels to identify at least one piece of constituent information from the text and graphics, associate one or more base attributes to each piece of the constituent information, and assign one or more of the base attributes to one or more master attributes that are descriptive of one of claims, ingredients, and nutritional information of one or more of the consumer products having the product labels; store in a database the images of one or more of the product labels, one or more of the base attributes, one or more of the master attributes associated with each of the product labels of the consumer products, and at least a portion of a sales history and sales comparisons for the consumer products; receive a first request about one or more of the consumer products having one or more of the base attributes; retrieve at least a portion of one of one or more of the images of the product labels of the consumer products and at least a portion of the sales history from the database based on one or more of the base attributes associated with the first request; and transmit via a network a representation of a label view to a user interface that displays one or more of the base attributes associated with the first request and one or more master attributes selected from the one or more of the base attributes, at least a portion of each of the images of one or more of the product labels of the consumer products and at least a portion of the sales history, and at least a portion of the sales comparisons between the consumer products associated with the first request.

In the many aspects, one or more of the master attributes associated with the first request provide information via the user interface to the client device that is different from the text and graphics of the product labels of the consumer products having the one or more master attributes.

In the many aspects, the user interface receives an adjustment of the one or more of the base attributes, which were assigned to the one or more of the master attributes associated with the first request.

In the many aspects, the at least one processor further executes the instructions to assign the one or more of the base attributes to the one or more master attributes and at least a portion of relevant sales history and one of claims, ingredients, and nutritional information of one or more of the consumer products having the product labels.

In the many aspects, the at least one processor further executes the instructions to: generate and populate a first layer of information that includes in combination, at least a portion of the images of one or more of the product labels, one or more of the base attributes associated with the constituent information identified in the text and graphics on one or more of the product labels of the consumer products and the sales history, and one or more of the master attributes associated with the one or more of the base attributes; generate and populate a second layer of information with information from the first layer of information and receive changes to the second layer of information via the user interface; and transmit a representation of the label view to the user interface to display at least the second layer of information with the changes from the user interface.

In the many aspects, the at least one processor further executes the instructions to accept changes via the user interface to the second layer of information while preventing changes to the first layer of information on the user interface.

In the many aspects, the label view is accessible on the user interface from the client device that is selected from a group consisting of at least one of a smartphone, a handheld scanner, a kiosk by the consumer, a wearable, and a computer.

In the many aspects, the consumer products having the product labels are selected from a group consisting of at least one of foods, beverages, consumer packaged goods, and personal items.

In the many aspects, the user interface receives an adjustment of the one or more of the base attributes, which were assigned to the one or more of the master attributes associated with the first request.

In many aspects, a system for a retailer or a brand owner to publish a portion of an electronic label for view by a user that contains additional information beyond what is set forth on a product label of a product associated with the retailer or the brand owner generally includes an ingredient data management platform that generates a first layer of information that includes in combination information from the product label and attributes determined from the information from the product label but not listed on the product label. The system also includes a publisher module of the ingredient data management platform that generates a second layer of information, that populates the second layer of information with information from the first layer of information, that is configured to receive changes to the second layer of information from the retailer or the brand owner associated with the populated information from the first layer of information, and that publishes the second layer of information with the changes from the retailer or the brand owner to the portion of the electronic label. The publisher module is configured to accept changes from the retailer or the brand owner to the second layer of information and prevent changes to the first layer of information from the retailer or the brand owner.

In the many aspects, the publisher module publishes the second layer of information with the changes from the retailer or the brand owner to the portion of the electronic label that hide a portion of the information from the first layer of information from view in the electronic label.

In the many aspects, the publisher module publishes the second layer of information with the changes from the retailer or the brand owner to the portion of the electronic label that include additional information relative to the information from the first layer of information.

In the many aspects, the publisher module publishes the second layer of information with the changes from the retailer or the brand owner to the portion of the electronic label that hide a portion of the information from the first layer of information from view in the electronic label and that include additional information relative to the information from the first layer of information.

In the many aspects, the publisher module is configured to publish immediately to the electronic label the second layer of information at a request of the retailer or the brand owner.

In the many aspects, the publisher module is configured to publish to the electronic label the second layer of information when the retailer or the brand owner obtains a predetermined number of approvals.

In the many aspects, the ingredient data management platform generates the first layer of information based on multiple product labels including information common to each of the multiple product labels. The publisher module is configured to receive changes to the second layer of information about one of the multiple product labels from the retailer or the brand owner. The publisher module publishes the second layer of information with the changes to all of the multiple product labels based on the changes associated with one of the multiple product labels.

In the many aspects, the publisher module of the ingredient data management platform is configured to receive the changes to the second layer of information and configured to track and maintain a ledger of the changes from which a previous version of the second layer of information is accessible In the many aspects, the portion of the electronic label is configured to provide information related to a SmartLabel brand label.

In the many aspects, the electronic label is accessible from a mobile device that is selected from a group consisting of at least one of a smartphone, a handheld scanner, a kiosk by the consumer, a wearable, and a computer.

In the many aspects, the portion of the electronic label is also configured to display serving size information. The serving size information is selected from a group consisting of at least one of a reference amount customarily consumed, a user-adjustable weight per serving, 100 grams of weight per serving, and a recommended daily allowance.

In the many aspects, the product having the product label is selected from a group consisting of at least one of foods; beverages; consumer packaged goods; personal items; pet care products; clothing; toys for children; lawn care products; window stickers for vehicles; heating, ventilation, air conditioning products; and bedding products.

In the many aspects, a system to harmonize a portion of an electronic label for view by a user that contains additional information beyond what is set forth on a product label of a product associated with the retailer or the brand owner generally includes an ingredient data management platform that generates a first layer of information that includes in combination information from the product label and attributes determined from the information from the product label but not listed on the product label. The system also includes a harmonizer module of the ingredient data management platform that generates a second layer of information, that populates the second layer of information with information from the first layer of information, that is configured to receive at least a third layer of information including information about the product associated with the product label, and that publishes the second layer of information in cooperation with the third layer of information including a portion of the third layer information that is additional relative to the second layer of information. The harmonizer module is configured to prevent changes to the first layer of information from at least one of the user, the retailer, and the brand owner.

In the many aspects, the harmonizer module is configured to receive a plurality of layers of information including information about the product associated with the product label. The harmonizer module is configured to publish the second layer of information in cooperation with the plurality of layers of information including a portion of the plurality of layers of information that is additional relative to the second layer of information and a portion of the plurality of layers of information that replaces a portion of the second layer of information.

In the many aspects, a portion of the plurality of layers of information is configured to replace a portion of the second layer of information.

In the many aspects, the third layer of information is associated with information from one of a global data synchronization network, a digital asset management system, ingredient supply chain data, and product information management data.

In the many aspects, the system further includes a publisher module of the ingredient data management platform that generates an additional layer of information, that populates the additional layer of information with information from the third layer of information, that is configured to receive changes to the additional layer of information from the retailer or the brand owner associated with the populated information from the third layer of information, and that publishes the additional layer of information with the changes from the retailer or the brand owner to a portion of an electronic label. The publisher module is configured to accept changes from the retailer or the brand owner to the additional layer of information and prevent changes to the third layer of information from the retailer or the brand owner.

In the many aspects, the publisher module of the ingredient data management platform is configured to receive the changes to the additional layer of information and configured to track and maintain a ledger of the changes from which a previous version of the additional layer of information is accessible In the many aspects, a system to harmonize and publish a portion of an electronic label for view by a user that contains additional information beyond what is set forth on a product label of a product associated with a retailer or a brand owner generally includes an ingredient data management platform that generates a first layer of information that includes in combination information from the product label and attributes determined from the information from the product label but not listed on the product label. The system includes a publisher module of the ingredient data management platform that generates a second layer of information, that populates the second layer of information with information from the first layer of information, and that is configured to receive changes to the second layer of information from the retailer or the brand owner associated with the populated information from the first layer of information. The system also includes a harmonizer module of the ingredient data management platform that is configured to receive at least a third layer of information including information about the product associated with the product label, and that publishes the second layer of information in cooperation with the third layer of information including a portion of the third layer information that is additional relative to the second layer of information and the second layer of information includes the changes from the retailer or the brand owner to the portion of the electronic label. The publisher module is configured to accept changes from the retailer or the brand owner to the second layer of information and prevent changes to the first layer of information from the retailer or the brand owner.

In the many aspects, the harmonizer module is configured to receive a plurality of layers of information including information about the product associated with the product label. The harmonizer module is configured to publish the second layer of information in cooperation with the plurality of layers of information including a portion of the plurality of layers of information that is additional relative to the second layer of information and a portion of the plurality of layers of information that replaces a portion of the second layer of information.

The many aspects of the present disclosure include a method for deconstructing information from a plurality of labels using information technology. The plurality of labels is for a plurality of consumer products available to users. The method includes obtaining, using a computing device, a plurality of labels from the plurality of consumer products. Each label of the plurality of labels identifies the content of a respective consumer product of the plurality of consumer products. The method includes processing, using the computing device, a label of the plurality of labels to identify a first piece of constituent information corresponding to a first portion of the label and a second piece of constituent information corresponding to a second portion of the label that is different than the first portion of the label. The method includes assigning, using the computing device, a first base attribute to the first piece of the constituent information and assigning, using the computing device, a second base attribute to the second piece of the constituent information. The first base attribute is descriptive of the first piece of the constituent information and is different than the second base attribute that is descriptive of the second piece of the constituent information. The method includes associating, using the computing device, a first master attribute with at least one of the first base attribute and generating for display at a client device, a portion of a label view based on a query about at least one consumer product of the plurality of consumer products, the portion of the label view containing detail of the master attribute.

In many aspects, the first and second piece of constituent information are each at least one of text and graphics from a portion of each label in the plurality of label. The portion of each of the labels in the plurality of label is at least one of nutrition facts, ingredient listings, certification listings, recycling information, warning listings, certification statements, universal product codes, manufacturers information, marketing claim information, and package size.

In many aspects, the processing, using the computing device, of the label of the plurality of labels to identify the first piece of constituent information corresponding to the first portion of the label includes routing the first portion of each of the labels automatically to an automatic recognition and comparison process for confirmation of a match between the first base attribute and the first piece of the constituent information on each of the labels.

In many aspects, the obtaining, using a computing device, of the plurality of labels from the plurality of consumer products includes capturing each of the labels of the plurality of labels at a scanning device and transmitting the plurality of labels to the computing device.

In many aspects, one of the consumer products for which the portion of the label view is generated by the computing device in response to the query is related to at least one item that is selected from a group consisting of at least one of foods; beverages; consumer packaged goods; personal items; pet care products; clothing; toys for children; lawn care products; window stickers for vehicles; heating, ventilation, air conditioning products; and bedding products.

In many aspects, the foods are selected from a group consisting of at least one of canned goods, produce, meats, dairy products, and snacks. The beverages are selected from a group consisting of at least one of bottled water, fruit juice, vegetable juice, protein shakes, nutritional shakes, pre-packaged coffee, pre-packaged tea, soda pop, carbonated juices; wines, liquor, beer, mixers, and energy drinks. The personal items are selected from a group consisting of at least one of deodorants, toothpastes, mouthwashes, vitamins, herbal supplements wound dressings, cosmetics, skin moisturizers, sun blocks, anti-itch creams, and sunburn creams. The pet care products are selected from a group consisting of at least one of domestic animal foods, treats, litter box materials, topical dressings, and specialized diet mixes. The clothing is selected from a group consisting of at least one of undershirts, undergarments, pants, shoes, coats, information about material from which the clothing is made, coatings on the clothing, and treatments on the clothing. The toys for children are selected from a group consisting of at least one of mobiles, teething instruments, baby bottles, toys that can fit into a mouth of a child, and pacifiers. The lawn care products are selected from a group consisting of at least one of fertilizers, pesticides, and moisture retentive media. The window stickers for vehicles are selected from a group consisting of at least one of automobiles, commercial vehicles, off-road vehicles, motorcycles, all-terrain vehicles, lawn-mowing equipment, and snow removal equipment. The heating, ventilation, and air conditioning products are selected from a group consisting of at least one of air conditioning handlers, furnaces, humidifiers, de-humidifiers, swamp-coolers, attic fans, media air cleaners, and electrostatic air cleaners. The bedding products are selected from a group consisting of at least one of mattresses, box springs, mattress covers, sheets, comforters, duvets, pillows, pillow cases, dust covers, and blankets.

In many aspects, the user is a consumer accessing the computing device with a mobile device through which the user is able to identify at least one of the consumer products to obtain the portion of the label view containing the master attribute descriptive of at least one of the consumer products.

In many aspects, the portion of the label view is configured to provide information related to a SmartLabel® brand label. In many aspects, the mobile device of one of the users is configured to receive QR code data and to present the portion of the label view that pertains to the at least one of the consumer products that is associated with the QR code data. In many aspects, the mobile device is selected from a group consisting of at least one of a smartphone, a handheld scanner, a kiosk by the consumer, a wearable, and a computer.

In many aspects, the label view is configured to detail other consumer products with which the master attribute is also associated. In many aspects, the portion of the label view that contains detail of the master attribute is also configured to display serving size information. The serving size information is selected from a group consisting of at least one of a reference amount customarily consumed, a user-adjustable weight per serving, 100 grams of weight per serving, and a recommended daily allowance.

In many aspects, the portion of the label view that contains detail of the master attribute is also configured to display at least one food code recognized by the National Health and Nutrition Examination Survey. The food code is related to the at least one of the consumer products on which the portion of the label view is based.

In many aspects, one of the users is a brand owner accessing the computing device with a brand owner interface through which the brand owner is able to identify the at least one of the consumer products to obtain the portion of the label view containing the master attribute descriptive of the at least one of the consumer products. The brand owner interface is configured to permit the brand owners to input corrective information to be applied to the portion of the label view for the one of the consumer products.

In many aspects, the brand owner interface is configured to include all of the base attributes associated with each of the many pieces of the constituent information for one of the consumer products. The computing device is configured to provide the brand user interface with at least one of a confirmation of a legitimacy of the at least one claim, a suggestion for at least one additional claim, and a suggestion for removal of the at least one claim.

In many aspects, a method for deconstructing information from a plurality of labels into constituent information using information technology with the plurality of labels being on products for consumers includes obtaining the plurality of the labels from the consumer products into an ingredient data management platform. The method includes detecting automatically with the ingredient data management platform each piece among a plurality of pieces of constituent information from each label in the plurality of labels and assigning at least a first base attribute automatically with the ingredient data management platform to a first piece of the constituent information and to all other pieces of the constituent information that match the first base attribute of the first piece of the constituent information. The method includes assigning at least a second base attribute automatically with the ingredient data management platform to a second piece of the constituent information and to all other pieces of the constituent information that match the second base attribute of the second piece of the constituent information. Each of the first base attribute and the first piece of the constituent information are different from the second base attribute and the second piece of the constituent information. The method includes associating a master attribute automatically with the ingredient data management platform to both the first base attribute and the second base attribute and generating a portion of a label view in response to a query about at least one of the consumer products. The portion of the label view containing detail of at least the master attribute includes information that is otherwise unavailable in the pieces of constituent information of the one of the consumer products to which the label view refers.

In many aspects, the portion of the label view that contains detail of the master attribute is also configured to display serving size information. The serving size information is selected from a group consisting of at least one of a reference amount customarily consumed, a user-adjustable weight per serving, 100 grams of weight per serving, and a recommended daily allowance.

In many aspects, the ingredient data management platform is configured to be accessed by one of the consumers with a mobile device through which one of the consumers is able to identify one of the consumer products to obtain the portion of the label view. The mobile device is selected from a group consisting of at least one of a smartphone, a handheld scanner, a kiosk by the consumer, a wearable, and a computer.

In many aspects, the mobile device of one of the consumers is configured to receive QR code data. The label view pertains to one of the consumer products that is associated with the QR code. The mobile device is one of a smartphone, a handheld scanner, a kiosk by the consumer, a wearable, and a computer.

In many aspects, detecting automatically with the ingredient data management platform includes capturing each of the labels of the plurality of labels at a scanning device and transmitting the plurality of labels to the ingredient data management platform.

In many aspects, a method for parsing information from a plurality of product labels using information technology includes obtaining constituent information with an ingredient data platform from text and graphics found on a portion of a label from a plurality of the product labels. The method includes assigning base attributes automatically with the ingredient data platform to each piece of the constituent information on at least one of the product labels and associating the base attributes assigned by the ingredient data platform with different base attributes in at least one pre-constructed taxonomy data structure handled by the ingredient data platform to establish relationships between the base attributes that were previously assigned to the ingredient data platform and the base attributes from the pre-constructed taxonomy data structure.

The method includes assigning a master attribute automatically with the ingredient data platform to a relationship between the base attributes assigned by the ingredient data platform and the associated base attributes in the pre-constructed taxonomy data structure. The method includes generating at least a portion of a label view containing detail based on the master attribute pertaining to at least one consumer product whose product label lacks information detailed in the portion of the label view.

In many aspects, the portion of each product label includes items of constituent information that are at least one of nutrition facts, ingredient listings, certification listings, recycling information, warning listings, certification statements, universal product codes, manufacturers information, marketing claims and package size.

In many aspects, the at least one consumer product for which the portion of the label view is generated by the ingredient data platform is related to one item selected from a group consisting of foods; beverages; consumer packaged goods; personal items; pet care products; clothing; toys for children; lawn care products; window stickers for vehicles; heating, ventilation, air conditioning products; and bedding products. In many aspects, the at least one consumer product is foods selected from a group consisting of at least one of canned goods, produce, meats, dairy products, and snacks. The at least one consumer product is beverages selected from a group consisting of at least one of bottled water, fruit juice, vegetable juice, protein shakes, nutritional shakes, pre-packaged coffee, pre-packaged tea, soda pop, carbonated juices; wines, liquor, beer, mixers, and energy drinks. The at least one consumer product is personal items selected from a group consisting of at least one of deodorants, toothpastes, mouthwashes, vitamins, herbal supplements wound dressings, cosmetics, skin moisturizers, sun blocks, anti-itch creams, and sunburn creams. The at least one consumer product is pet care products selected from a group consisting of at least one of domestic animal foods, treats, litter box materials, topical dressings, and specialized diet mixes. The at least one consumer product is clothing selected from a group consisting of at least one of undershirts, undergarments, pants, shoes, coats, information about material from which the clothing is made, coatings on the clothing, and treatments on the clothing. The at least one consumer product is toys for children selected from a group consisting of at least one of mobiles, teething instruments, baby bottles, toys that can fit into a mouth of a child, and pacifiers. The at least one consumer product is lawn care products selected from a group consisting of at least one of fertilizers, pesticides, and moisture-retentive media. The at least one consumer product is window stickers for vehicles selected from a group consisting of at least one of automobiles, commercial vehicles, off-road vehicles, motorcycles, all-terrain vehicles, lawn-mowing equipment, and snow removal equipment. The at least one consumer product is heating, ventilation, and air conditioning products selected from a group consisting of at least one of air conditioning handlers, furnaces, humidifiers, de-humidifiers, swamp-coolers, attic fans, media air cleaners, and electrostatic air cleaners. The at least one consumer product is bedding products selected from a group consisting of at least one of mattresses, box springs, mattress covers, sheets, comforters, duvets, pillows, pillow cases, dust covers, and blankets.

In many aspects, at least one of the users is a consumer accessing the ingredient data platform with a mobile device through which the user identifies at least one of the consumer products to obtain a label view containing the portion of the label view with the master attribute descriptive of one of the consumer products. In many aspects, the portion of the label view is configured to provide information to support a SmartLabel® brand view.

In many aspects, the mobile device of one of the users is configured to receive QR code data to present the label view that pertains to one of consumer products that are associated with the QR code. In many aspects, the mobile device is at least one of a smartphone, a handheld scanner, a kiosk accessible by the consumer, a wearable device, a laptop, a notebook, a tablet, a smartwatch, and a computer.

In many aspects, the label view that contains detail of the master attribute is also configured to display at least the master attribute associated with at least one of a reference amount customarily consumed, a predetermined weight per serving, 100 grams of weight per serving, and a recommended daily allowance.

In many aspects, the method includes determining that a piece of the constituent information on one of the product labels is incorrect. In many aspects, a label portion is generated to provide corrected information for the product labels when it is determined that the piece of the constituent information on one of the product labels is incorrect.

In many aspects, a system includes an ingredient data platform that automatically, under computer control, detects items of constituent information from identified product labels for consumer products, that assigns base attributes automatically to all of the items of constituent information on the product labels, and that establishes relationships between the assigned base attributes with different base attributes in pre-constructed taxonomies. The system also assigns a master attribute automatically to at least one of the established relationships, and configures at least one data structure for display in a portion of a label view containing detail of the master attribute that pertains to at least one of the consumer products. The detail of the master attribute contains information unavailable in the constituent information associated with the at least one of the consumer products.

In many aspects, the ingredient data platform is configured to be accessed by a user with a mobile device through which the user identifies the at least one of the consumer products to obtain the portion of the label view containing the master attribute descriptive of one the at least one of the consumer products. In many aspects, the mobile device is configured to receive QR code data and to present the label view that pertains to the at least one of the consumer products that is associated with the QR code. The mobile device is at least one of a smartphone, a handheld scanner, a kiosk accessible by the consumer, a wearable device, a laptop, a notebook, a tablet, a smartwatch, and a computer.

In many aspects, the ingredient data platform captures automatically at least one of text and graphics from the constituent information that includes at least one of nutrition facts, ingredient listings, certification listings, recycling information, warning listings, certification statements, universal product codes, manufacturer's information, and package size.

In many aspects, the portion of the label view is configured to provide information to support a SmartLabel® brand view. In many aspects, the label view displays at least the master attribute associated with at least one of a reference amount customarily consumed, a predetermined weight per serving, 100 grams of weight per serving, and a recommended daily allowance.

In many aspects, the ingredient data platform determines automatically that an item of the constituent information on one of the product labels is incorrect.

In many aspects, a label portion is automatically generated to provide corrected information for the product label when it is determined that an item of information is incorrect. In many aspects, the ingredient data platform determines automatically that at least one of a nutrition fact, a certification listing, a marketing claim, and a certification statement should be added to the product label.

The many aspects of the present disclosure include a method for automatically deconstructing, analyzing, and confirming information on a plurality of labels using information technology. The plurality of labels is for a plurality of consumer products. The method includes obtaining, using a computing device, a plurality of labels from the plurality of consumer products. Each label of the plurality of labels identifies content of a respective consumer product of the plurality of consumer products. The method includes processing, using the computing device, a label of the plurality of labels to identify constituent information on the label including a first set of claims on the label. The method also includes generating a portion of a label view for display at a client device based on a query about at least the respective consumer product associated with the label including automatically displaying a second set of claims having at least one claim based on the constituent information that is different than any claim in the first set of claims.

In many aspects, the second set of claims includes at least one of a confirmation of a legitimacy of at least one claim from the first set of claims. In many aspects, the second set of claims includes a suggestion for at least one additional claim. In many aspects, the second set of claims includes a suggestion for removal of the at least one claim from the first set of claims. In many aspects, the second set of claims deletes at least one claim from the first set of claims. In many aspects, the second set of claims substitutes a new claim for the at least one deleted claim.

In many aspects, the constituent information is at least one of text and graphics and includes at least one of nutrition facts, ingredient listings, certification listings, recycling information, warning listings, certification statements, universal product codes, manufacturers information, marketing claim information, and package size.

In many aspects, the obtaining, using a computing device, the plurality of labels from the plurality of consumer products includes capturing each of the labels of the plurality of labels at a scanning device and transmitting the plurality of labels to the computing device.

In many aspects, the respective consumer products for which the portion of the label view is generated by the computing device in response to the query is related to at least one item that is selected from a group consisting of at least one of foods; beverages; consumer packaged goods; personal items; pet care products; clothing; toys for children; lawn care products; window stickers for vehicles; heating, ventilation, air conditioning products; and bedding products.

In many aspects, the foods are selected from a group consisting of at least one of canned goods, produce, meats, dairy products, and snacks. The beverages are selected from a group consisting of at least one of bottled water, fruit juice, vegetable juice, protein shakes, nutritional shakes, pre-packaged coffee, pre-packaged tea, soda pop, carbonated juices; wines, liquor, beer, mixers, and energy drinks. The personal items are selected from a group consisting of at least one of deodorants, toothpastes, mouthwashes, vitamins, herbal supplements wound dressings, cosmetics, skin moisturizers, sun blocks, anti-itch creams, and sunburn creams. The pet care products are selected from a group consisting of at least one of domestic animal foods, treats, litter box materials, topical dressings, and specialized diet mixes. The clothing is selected from a group consisting of at least one of undershirts, undergarments, pants, shoes, coats, information about material from which the clothing is made, coatings on the clothing, and treatments on the clothing. The toys for children are selected from a group consisting of at least one of mobiles, teething instruments, baby bottles, toys that can fit into a mouth of a child, and pacifiers. The lawn care products are selected from a group consisting of at least one of fertilizers, pesticides, and moisture retentive media. The window stickers for vehicles are selected from a group consisting of at least one of automobiles, commercial vehicles, off-road vehicles, motorcycles, all-terrain vehicles, lawn-mowing equipment, and snow removal equipment. The heating, ventilation, and air conditioning products are selected from a group consisting of at least one of air conditioning handlers, furnaces, humidifiers, de-humidifiers, swamp-coolers, attic fans, media air cleaners, and electrostatic air cleaners. The bedding products are selected from a group consisting of at least one of mattresses, box springs, mattress covers, sheets, comforters, duvets, pillows, pillow cases, dust covers, and blankets.

In many aspects, the client device is a mobile device through which a user is able to identify the at least one of the consumer products to obtain the portion of the label view descriptive of at least one of the consumer products.

In many aspects, the mobile device is selected from a group consisting of at least one of a smartphone, a handheld scanner, a kiosk by the consumer, a wearable, and a computer.

In many aspects, the portion of the label view is configured to provide information related to a SmartLabel® brand label.

In many aspects, a portion of the label view is configured to display serving size information. The serving size information is selected from a group consisting of at least one of a reference amount customarily consumed, a user-adjustable weight per serving, 100 grams of weight per serving, and a recommended daily allowance.

In many aspects, the client device includes a brand owner interface through which a brand owner is able to generate a portion of a label view for display including the at least one claim in the second set of claims.

In many aspects, the client device includes a brand owner interface through which the brand owner is able to generate a portion of a label view that is configured to permit the brand owner to input corrective information to be applied to the portion of the label view for at least the respective consumer product.

DETAILED DESCRIPTION

Detailed aspects of the present disclosure are provided herein; however, it is to be understood that the disclosed aspects are merely examples that may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

Figure 2:
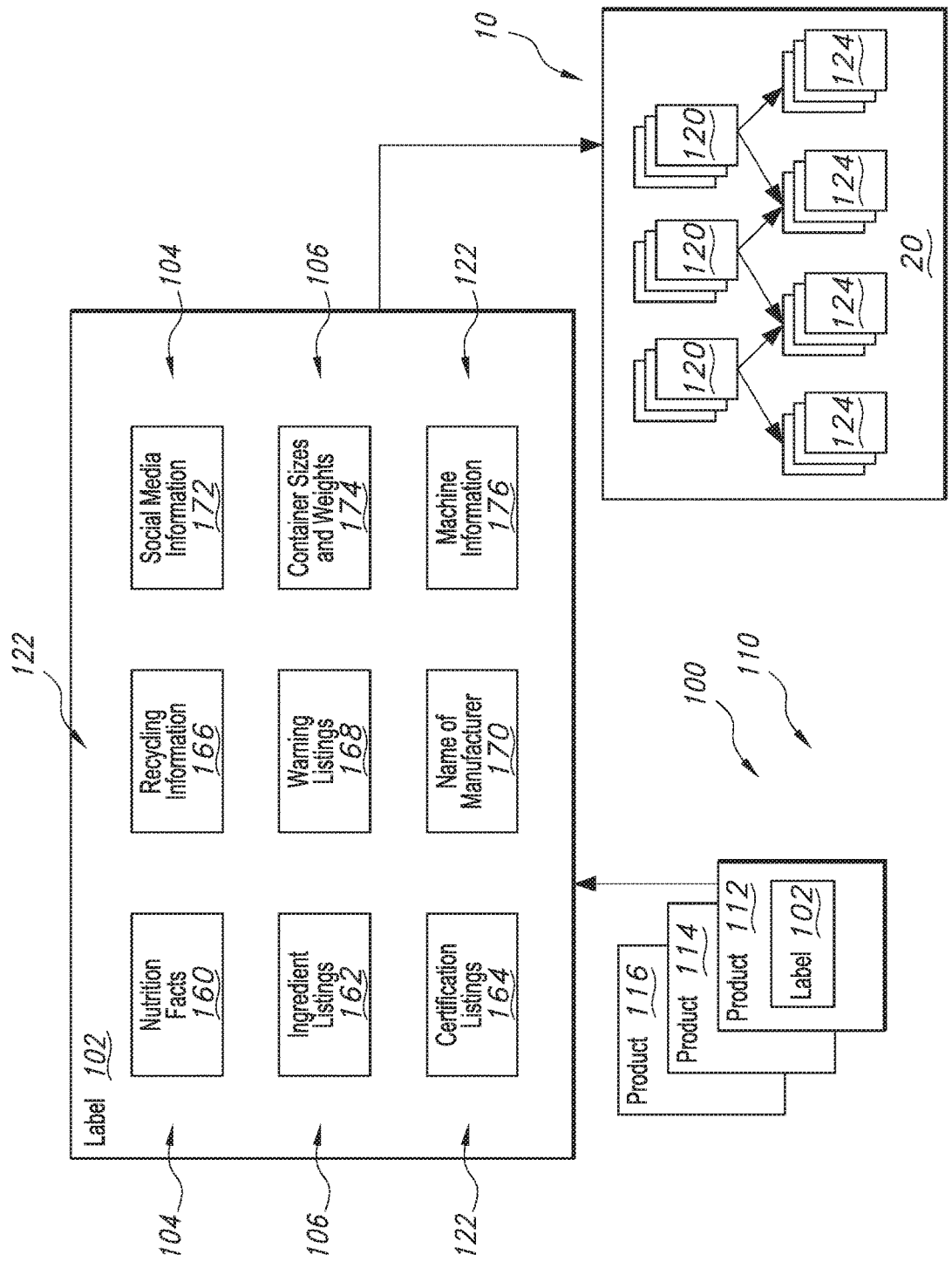
FIG. 2 is a diagram of the ingredient data management platform of the ingredient detection system and its intake of a label of a product into the ingredient data management platform in accordance with the present disclosure.

The many aspects of the present disclosure include an ingredient management computing system and/or computing environment that automatically captures and manages product information typically contained on the labels (referred to in some cases herein as labels or label flats) of food products or other consumer products. In the many aspects, the ingredient management computing system and/or computing environment 10, as depicted in FIGS. 1 and 2, can be used to automatically capture, process, parse, and/or otherwise analyze product information and/or images of product information captured or otherwise obtained from labels of a single product, multiple products (e.g., a very large numbers of products), consumer products, and the like. In the many aspects, the obtained product information is automatically captured, recognized, processed, and parsed by the ingredient management computing system and/or computing environment 10 into data, datasets, or taxonomic data structures of a highly granular level that reflects a base, or atomic, level of each ingredient of which there are many thousands in the aspects of the present disclosure, such that the computing environment, the processes, and the systems described in the present application are required in order to automatically process, analyze, deconstruct, and parse (e.g., breakdown and organize) the vast amounts of ingredient and product data into the pieces or portions of the constituent information in an efficient, instant, and real-time manner, as well as various intermediate levels of the ingredients and product information (such as where an ingredient represents a combination, mixture, compound, or the like). The obtained ingredient and product information can then be processed by the ingredient management computing system and/or computing environment 10 to automatically generate various interfaces and/or graphical user-interfaces (referred to herein as tailored views), which may be provided to users, such as consumers, manufacturers (referred to in some cases herein as brands, brand owners, or product owners), retailers, regulators, marketing professionals, service providers, and others, in real-time or near real-time.

In the many aspects of the present disclosure, the ingredient management computing system and/or computing environment 10 includes an ingredient data management platform 20, as shown in FIG. 1. The ingredient data management platform 20 includes a technology stack of the ingredient management computing system and/or computing environment 10 with various components, modules, and layers that can connect with many different users.

The ingredient data management platform 20 can automatically capture, process, parse, and/or otherwise analyze product ingredients and/or product information from images obtained from one or many labels 100 of one or many products 110 including a single label 102 of a single product 112, and from other single products such as a product 114 and a product 116. In one aspect, text 104 and graphics 106 on the labels 102 can be digitized and deconstructed by the ingredient management computing system and/or computing environment 10 so that many base attributes 120 can be assigned to all or some of constituent information 122 on the labels 100. The base attributes 120 can be categorized, sorted, and mapped to one or more taxonomic libraries that can be in a preconstructed taxonomic data structure. One or more master attributes 124 can be associated with the base attributes 120; or put another way, multiple base attributes 120 can be non-exclusively organized under the master attributes 124. In certain aspects, one of the master attributes 124 can be associated with one of the base attributes 120. In further aspects, one of the master attributes 124 can be associated with a predetermined set of base attributes 120. In additional aspects, one of the master attributes 124 can be associated with the lack of a predetermined set of base attributes 120 being assigned (or in this case, not being able to be assigned) to the constituent ingredients 122 on the labels 100.

The ingredient data management platform 20 can generate tailored views that can be selected by one of the users of the ingredient management computing system and/or computing environment 10. The tailored views (or portions thereof) can display the master attributes 124. The tailored views can also display at least one of the master attributes 124, the constituent information 122, the base attributes 120. In certain examples, the constituent information 122 can include or can be used to recreate the actual text 104 and graphics 106 from the labels 100. The tailored views (or portions thereof) can be used by many users to make decisions about the products 110 with much more information and much more easily understood information relative to what is set forth on typical product labels. As such, the tailored views can display master attributes 124 that are descriptive of products 110 and contain information not found or available from the text 104 and the graphics 106 of the labels 100.

In one example and as shown in label 102, the ingredient management computing system and/or computing environment 10 can be directed to food products, and the label 102 is attached to a consumable product available to the buying public in retail channels, such as on shelves of a store or in an online retail environment. In further examples, the ingredient management computing system and/or computing environment 10 can be directed to personal items with similar labels such as for deodorants, toothpaste, mouthwash, vitamins, herbal supplements, wound dressings, cosmetics, skin moisturizers, sun blocks, anti-itch creams, sunburn creams, and the like. In other examples, the ingredient management computing system and/or computing environment 10 can be directed to pet care products with similar labels such as for domestic animal food, treats, litter box materials, topical dressings, specialized diet mixes, and the like.

In further examples, the ingredient management computing system and/or computing environment 10 can be directed to clothing with similar labels such as for undershirts, undergarments, pants, shoes, coats, and the like, such as to contain, in the various aspects, information about materials, coatings, treatments, or the like, for the same. In other examples, the ingredient management computing system and/or computing environment 10 can be directed to toys for children with similar labels such as for mobiles, teething instruments, baby bottles, toys that can fit into a mouth of a child, pacifiers, and the like. In yet further examples, the ingredient management computing system and/or computing environment 10 can be directed to lawn care products with similar labels such as for fertilizers, pesticides, moisture-retentive media, and the like. In other examples, the ingredient management computing system and/or computing environment 10 can be directed to window stickers for vehicles such as for automobiles, commercial vehicles, off-road vehicles, motorcycles, all-terrain vehicles, lawn-mowing equipment, snow removal equipment, and the like. In further examples, the ingredient management computing system and/or computing environment 10 can be directed to heating, ventilation, and air conditioning products with similar labels such as for air conditioning handlers, furnaces, humidifiers, de-humidifiers, swamp-coolers, attic fans, media air cleaners, electrostatic air cleaners, and the like. Additional examples include the ingredient management computing system and/or computing environment 10 being directed to bedding products with similar labels such as for mattresses, box springs, mattress covers, sheets, comforters, duvets, pillows, pillow cases, dust covers, blankets, and the like.

In the many aspects of the present disclosure, the tailored views can include a view such as a label view (or a portion thereof). The label view can be used for food products or other consumer-directed items discussed herein and can provide more detailed and enhanced labels for the buyer. In many aspects, information presented in the tailored view can be used at least in part to create a view that can be used for product verification processes with the manufacturers of the food products, the brand owners, or the like. Information presented in the tailored view through a brand or manufacturer interface can be used at least in part to create another tailored view that can be used to determine compliance with regulatory labeling requirements on food products or the other items discussed herein. Further tailored views can be used to elicit corrective information from the brand owner or manufacturer. Additional tailored views can identify claims that could be added or claims that should be omitted from the labels 100 processed by the ingredient data management platform 20.

In many aspects of the present disclosure, the constituent information 122 can include what is on the package of a product, i.e., every piece of information. In some aspects, the constituent information 122 can be raw data of the product and its labels delivered in an appropriate data stream or through a suitable communication system. In one example, a serving size of thirty grams can be identified as constituent information associated with a food product. By way of this example, the serving size of thirty grams can be considered the raw data from the labeling on the product. The constituent information 122 can be taken verbatim from the labeling but the serving size of thirty grams and other raw data can be split up and organized into its parts. By way of this example, the serving size of thirty grams can be deconstructed and split into two pieces of data: 30 units, and the unit of measure is grams. It will be appreciated in light of the disclosure that the number of units can be varied as can the units of measure. In one example, a single unit could be identified such as one unit and the unit of measure being in liquid ounces, i.e., 1 oz.

In many aspects of the present disclosure, the base attributes 120 can include information derived from the constituent information 122. In many aspects, the base attributes 120 can be the building blocks in the ingredient management computing system and/or computing environment 10. In many examples, the base attributes 120 can be derived from the recognition of information in the constituent information 122 by running recognition processes discussed herein on the constituent information 122. In one example, high fructose corn syrup can be constituent information 122 listed on the labels 100 and can be recognized by the system and/or computing environment 10 and assigned one of many base attributes 120 including "artificial sweetener." In a further example, "HFCS" can be in the constituent information 122 listed on the labels 100 in lieu of the labels saying high fructose corn syrup. HFCS can also be recognized by the ingredient management computing system and/or computing environment 10 and can be assigned one of many base attributes 120 including "artificial sweetener."

In many aspects of the present disclosure, the master attribute 124 can be a "head attribute" under which many of the base attributes 120 can be non-exclusively organized. By way of the previous examples, HFCS can be part of constituent information 122 on one label 100 while High Fructose Corn Syrup can be part of constituent information 122 on another label 100. The base attribute 120 of artificial sweetener can be derived from both the HFCS and the high fructose corn syrup constituent information 122. The base attribute 120 of artificial sweetener can be organized under the master attribute 124 of sweetener. Depending on the use of the master attributes 124, the base attribute 120 of artificial sweetener can be organized under other master attributes 124 such as added sugar, non-sucrose sugars, and the like. In further examples, a master attribute 124 of reduced salt can have base attributes 120 organized under it such as low salt, lower salt, or the like. By way of this example, the constituent information 122 can be a hint of salt, low sodium, or comparable statements detailing a reduction in salt content. In this way, all reduced salt claims can be organized and accessed under the reduced salt master attribute 124 and/or organized under other master attributes 124 that relate to the master attributes where base attributes 120 regarding reduced salt can be helpful such as heart health related master attributes 124.

In many aspects of the present disclosure, the text 104 and the graphics 106 on the labels 100 can be parsed, deconstructed, and digitized so that all of the data on the labels 100 and/or further data associated with the product can be used to identify and save the constituent information 122. The constituent information 122, derived from either the label 100 itself or from other sources, can be stored in a relational database. Various automatic computing methods can be used including machine learning to recognize the patterns in the constituent information 122 stored in the relational database.

The base attributes 120 can be automatically derived from the constituent information 122 to pre-process and facilitate the derivation of information from the constituent information 122 for the ultimate organization under and access through the master attributes 124. Once organized under the master attributes 124, any user can access, confirm, or compare any of the constituent information 122 through the relationship with the master attributes 124.

In many aspects of the present disclosure, the constituent information 122 can present additional combinations and patterns of data on which additional master attributes 124 can be created. The creation of the additional master attributes 124 can be performed automatically by the ingredient management computing system and/or computing environment 10. Examples of such additional master attributes 124 can include "Whole Foods Allowed Ingredients," "Basil Ingredients," "Trans Fat Ingredients," "Low Sodium Claims," or the like. The additional combinations and patterns of data recognized in the constituent information 122 can be directed into one or more NoSQL databases or other suitable data stores. In many aspects, the ingredient management computing system and/or computing environment 10 can automatically apply many forms of statistical analysis and/or fuzzy logic to automatically and non-exclusively organize the base attributes 120 under one or more master attributes 124 based on the one or more recognized patterns of in the data from the constituent information 122. Any base attributes 120, which are not recognized and as such are not organized under one or more master attributes 124 (or organized under relatively few master attributes 124), can be identified for further analysis that can include automatic and manual forms of analyses. Here, the manual forms of analyses can be learned and later emulated by the ingredient management computing system and/or computing environment 10 when contextual similar base attributes 120 can require further organization or changes to the organizational strategies. As such, the manual inputs to assist in the organization of the base attributes 120 under the master attributes 124 can be deployed later under the automatic processes of the ingredient management computing system and/or computing environment 10.

With reference to FIG. 2, the labels 100 can include many areas of text 104 and many areas of graphics 106, all of this constituent information 122 and anything else on the labels 100 can be automatically processed, parsed, deconstructed, and retained by the ingredient data management platform 20. The automatic processing, parsing, deconstruction, and retention, of the constituent information 122 can be completed by the ingredient data management platform 20 as disclosed herein. The ingredient data management platform 20 can be configured to provide these services resident with the platform 20 or obtain the services hosted in the cloud through connectivity with a cloud network facility or other communication networks.

In the many aspects, the ingredient data management platform 20 can automatically capture, process, parse, and/or otherwise analyze the constituent information 122 on the labels 100 to assign one or more of the base attributes 120 to each piece of the constituent information 122. To make this process more efficient, the ingredient data management platform 20 can automatically parse the constituent information 122 into nutrition facts 160, ingredient listings 162, certification listings 164, recycling information 166, warning listings 168, and the like. The ingredient data management platform 20 can also automatically process and identify further areas on the label 102 such as the name of the manufacturer 170 and its contact and social media information 172. The ingredient data management platform 20 can also automatically process and identify further areas on the label 102 such container sizes or weights 174, universal price code (UPC) or other machine information 176 such as QR codes, batch, serial, and other manufacturing numbers and information.

In many aspects, the ingredient data management platform 20 can receive all (or some) of the constituent information 122 on the labels 100 and can automatically process, parse, and/or otherwise analyze all of the text 104 and the graphics 106 of each piece of the constituent information 122 and assign at least one of the base attributes 120 to each of the pieces of constituent information 122. In many instances, more than one of the base attributes 120 can be assigned to each piece of the constituent information 122 for each piece of information found on the labels 100. In one example, one of the base attributes 120 can be assigned when a certain ingredient is detected on the labels 100. Other base attributes 120 can be assigned to other similar ingredients on the labels 100. The base attributes 120 can be used to identify the same ingredients from the constituent information 122 on labels 100 that can be differently described label-to-label, or even within a specific label such as the label 102. One of the labels 100 can list an ingredient that is equivalent to an ingredient listing on another label. In this instance, the ingredient data management platform 20 can assign base attributes 120 to each ingredient and determine a relationship between the base attributes 120 based on the location of the base attributes (and the ingredients or portion thereof to which they are assigned) in the taxonomic data structures, or the like that permit organization of the relationships.

By way of example, a common food coloring often known as Yellow 5 is also known as Tartrazine; however, Yellow 5 can, in fact, be listed on labels of food products, or other purchasable items described herein in many different ways (perhaps hundreds or even over one thousand different ways). The ingredient data management platform 20 can assign one of the base attributes 120 that can indicate the presence of Yellow 5 (i.e., a head ingredient) in the food product when in fact the label contains information showing any one of the many ways to indicate the presence of Yellow 5 but not actually the word "Yellow 5." Thus, the many different ways to say Yellow 5 can be captured as base attributes 120 and associated with the "contains Yellow 5" or "same as Yellow 5" master attributes 124. In this example, "contains Yellow 5" can be one of the master attributes 124 that is applied when any of the thousand ways to indicate Yellow 5 is used on the labels 100. In a further example when the consumer is one of the users and receives one of the tailored views from the ingredient data management platform 20, the consumer can be mindful of an allergy to Yellow 5, but otherwise not be required to be versed in every one of the thousand ways to indicate Yellow 5. Thus, the ingredient data management platform 20 can be constructed to link the many synonyms or near-synonyms in the constituent information 122 to base attributes 120, so that label information (i.e., the constituent information 122 on the labels 100) can be reduced or deconstructed to sets of master attributes 124 that are consistently deployed in the ingredient data management platform 20 and therefore it can be shown that the users can rely on the master attributes 124 to better understand the information on the labels 100.

The many aspects of the present disclosure include the ingredient data management platform 20 having many technology layers 200 that can perform one or more functions and interact with or be part of other layers 200. The ingredient data management platform 20 can obtain all of the text 104 and graphic 106 textual information from the labels 100 including the ingredient listings 162 of the products 110. The ingredient data management platform 20 can also include a new product identification layer 210. The new product identification layer 210 can interact with the products 110 and can accept ingredient information, such as by capturing labels 100 into the ingredient data management platform 20. In many aspects, the new product identification layer 210 can interact with an information derivation layer 220 and a claim identification layer 230 (which identifies, for example, marketing claims made on a label) to digitize the labels 100 with the ingredient data management platform 20 and categorize the information from the text 104 and the graphics 106 on the labels 100.

In many aspects of the present disclosure, the new product identification layer 210 can, under computer control, automatically compare the product 110 to an existing dictionary, pre-determined references, or the like. The new product identification layer 210 in association with its computing environment can then automatically determine based on metadata associated with the product 110, its brand, its manufacturer, or other associated inputs or contextual information whether this is a new or the same product or the new or same ingredients, certifications, warnings, container information or the like. In some aspects, the new product identification layer 210 can automatically identify new product labels of products that are related to products already learned by (i.e., deconstructed and saved in the libraries and taxonomic structures of) the ingredient data management platform 20 so that features common to the new label and already learned labels need not be learned again in this computing environment. In further aspects, the new product identification layer 210 can also automatically assist in identifying new constituent information 122 on a label that can be described in a different way whether it is ingredients (e.g. HFCS is High Fructose Corn Syrup), product labels, or changes in container labeling or configuration.

In many aspects of the present disclosure, the ingredient data management platform 20 and the computing environment can include the information derivation layer 220 that can automatically analyze patterns on the label 100 of the product 110 to determine its constituent information 122 and assist in the assigning of base attributes 120 in the computing environment. In many aspects of the present disclosure, the claim identification layer 230 can automatically analyze patterns in claims identified in the text 104 and/or graphics 106 of the label 100 to determine with the computing environment the true intent of the identified claims. In one example, a "hint of salt" can be identified in the constituent information 122 and assigned the base attribute 120 that details low sodium.

In further aspects, the ingredient data management platform 20 can have an analytics layer 250 that can associate with the many layers 200 of the ingredient data management platform 20, including a cross-product interaction analysis layer 260 and a market and product positioning analysis layer 270. Each of these layers 250, 260, 270 can interact with other layers 200, including a user data models layer 300 and a database layer 310. The layers 200 can also include a sort layer 320, a compare layer 330, and a search layer 340 to manipulate all (or some) of the master attributes 124, the base attributes 120, and the constituent information 122 based on labels 100. In many aspects of the present disclosure, the analytics layer 250 can, among other things, automatically identify all of the constituent information 122 and analyze all of the base attributes 120 and master attributes 124 in the computing environment. In some examples, the analysis of the base attributes 120 and master attributes 124 in the computing environment can result in the automatic suggestions of claims that can be made about (or should be removed from) the product label 100 such as low sodium when such claim can be made or removing low sodium when the circumstances dictate it. In many aspects of the present disclosure, the cross-product interaction analysis layer 260 can automatically use patterns identified by the computing environment in one product, in order to automatically determine similar patterns identified and analyzed in other products. In many aspects of the present disclosure, the market and product positioning analysis layer 270 can automatically determine the context of a product as it relates to other products assigned within its category by the computing environment based on metadata of product. In some examples, the market and product positioning analysis layer 270 can assist the computing environment in automatically suggesting related products for the user. In further examples, the market and product positioning layer 270 can automatically assist the computing environment in automatically identifying constituent information 122 on labels 100 and automatically assigning base attributes 120 based on products positioned in close proximity on a retail shelf offering or offered in a related position with other products in a web-based offering.

In many aspects of the present disclosure, the database layer 310 can be a database of holding pattern information for the computing environment that can be used for matching against constituent information 122 during its automatic identification by the computing environment or its assigning of base attributes 120 or master attributes 124. In many aspects of the present disclosure, the sort layer 320 can provide the computing environment with the ability to slice, sort, re-sort, arrange, and drill-down automatically into different base attributes 120, constituent information 122, and master attributes 124 using derived metadata, contextual information, product positioning, and the like. In many aspects of the present disclosure, the compare layer 330 can provide the computing environment with the ability to compare the base attributes 120, constituent information 122, and master attributes 124 of the products automatically against each other and then re-arranged based on the comparison using derived metadata, contextual information, product positioning, and the like. In many aspects of the present disclosure, the search layer 340 can provide the computing environment with the ability to allow fuzzy searching to gain true intent of search automatically to better compare and view the base attributes 120, constituent information 122, and master attributes 124 of the products 110.

In further aspects, the ingredient data management platform 20 can include a complex definitions layer 350 for determining and cataloging relatively complex text strings in labels 100 that can include, for example, compound ingredient lists with parenthetical statements. An attributes layer 360, or a hybrid attributes layer 370, or both, can interact with the other layers 200 of the ingredient data management platform 20 to determine master attributes 124 based on the base attributes 120 assigned to the constituent information 122 for the products 110 that can be displayed in tailored views. Those tailored views can be based on user profiles or reports, or both. A food ingredients layer 380, or a claims layer 390, or both, can interact with the other layers 200 of the ingredient data management platform 20 to further determine master attributes 124 for the products 110 that can be displayed in tailored views.

In many aspects of the present disclosure, the complex definitions layer 350 can include core definitions for use in the computing environment. The core definitions can include information about relationships between the base attributes 120, the constituent information 122, and the master attributes 124 and specifically when certain base attributes are automatically assigned non-exclusively under one or more master attributes 124. The core definitions that include information about relationships between the base attributes 120, the constituent information 122, and the master attributes 124 can serve as building blocks in the computing environment for the attributes layer 360. The attributes layer 360 can use the building blocks from the computing environment and established by the complex definitions layer 350 to automatically build a wide variety of master attributes 124 based on the profiles of the user, the needs of the brand owners or manufacturers, or entities looking to confirm the correctness of the constituent information 122. The hybrid attributes layer 370 can identify multiple base attributes 120 or master attributes 124 in the computing environment and automatically create additional master attributes 124 with a hybrid of other attributes based on the profiles of the user, the needs of the brand owners or manufacturers, or entities looking to confirm the correctness of the constituent information 122.

In some aspects of the present disclosure, the ingredient data management platform 20 can be a cloud-based platform and can be constructed to deliver the software as a service and to allow access via application programming interfaces (APIs) that are suitable for use by various users or constituencies, such as allowing API-based access between the ingredient data management platform 20 and information technology systems used by manufacturers, retailers, marketers, and the like. In further aspects, the ingredient data management platform 20 can connect to or can include a personalization and recommendation engine 400 and a key messaging engine 410. The ingredient data management platform 20 can also include a data and analytics user interface 420 with a data and analytics API 430. The many users of the ingredient data management platform 20 can connect with an interface or an API, or both, suitable for the needs of that user.

In further aspects of the present disclosure, the ingredient data management platform 20 can include a consumer user interface 450 and a consumer API 460. The consumer user interface 450 can have a personalized recommendations layer 470, a personalized product attribute display layer 480, and a personalized advertising layer 490. The consumer user interface 450 can also have a consumer health and nutrition preference layer 500. The consumer user interface 450 can also connect with a smart food product label landing page layer 510, a smart food product label QR code layer 520, and a digitized smart food product label layer 530. In many aspects of the present disclosure, the personalized product attribute display layer 480 can automatically create a view of the product that can be customized with specific attributes available in the computing environment based on individual user selection. In many aspects of the present disclosure, the smart food product label landing page layer 510 can create an exclusive or custom landing page with "deeper" master attributes 124. The deeper master attributes can be derived automatically from the label 100 based on a smart food product as specified by the SmartSPEC® brand tailored view. The deeper master attributes can be automatically configured by information in the SmartSPEC® brand tailored view. The deeper master attributes can also be automatically configured by information from the user, the brand owner, or the like.

In yet further aspects of the present disclosure, the ingredient data management platform 20 can include a brand user interface 550 and a brand user API 560. In other aspects, the ingredient data management platform 20 can include a retailer user interface 590 and a retailer API 580. The brand user interface 550 and the brand user API 560, the retailer user interface 590, and the retailer API 580, the consumer user interface 450 and consumer API 460 can connect to a personalization and recommendation engine layer 400. The brand user interface 550 and the consumer user interface 450 can connect to a smart food product label landing page layer 510, a smart food product label QR code layer 520, and a digitized smart food product label layer 530.

In further examples, the retailer user interface 590 can connect with a retailer shelf offerings layer 650. The shelf offering layers 650 can, among other things, locate items in a store on an aisle at a particular shelf location, such as based on the ingredients that may indicate an appropriate aisle (e.g., a "milk" ingredient as one of the major ingredients and a "cheese" statement in a marketing text element might suggest the "dairy" aisle for a product). The retailer user interface 590 can also connect with a retailer stock supply notification layer 660 and a retailer compliance check layer 670 (which may allow compliance personnel or computing resources dedicated to compliance to confirm, using information from the ingredient data management platform 20 that a label and/or the product itself complies with applicable regulations, such as Food and Drug Administration ("FDA") regulations or similar regulations of other jurisdictions). Through various applicable APIs, many different users can connect to the ingredient data management platform 20 that can include additional layers that can be integral with the platform 20 or that are connected to add one or more such services as needed.

The labels 100 for many products 110 from a manufacturer can be received into the ingredient data management platform 20. The text 104 and the graphics 106 can form the nutrition facts 160, ingredient listings 162, certification listings 164, recycling information 166, warning listings 168, etc. on the labels 100 that can all be received into the ingredient data management platform 20. As mentioned in the example above, many base attributes 120 are determined from the constituent information 122 found on the labels 100 and relationships to and with detailed taxonomies that can allow for an understanding of alternative names for ingredients (like Yellow 5). Moreover, the base attributes 120 can be assigned based on how constituent information 122 can roll up into other ingredients that are listed in the ingredients area on the labels 100, e.g., compound ingredients. The base attributes 120 can be assigned to each piece of the product's constituent information 122 and can be used to better understand and validate (or suggest removal of) claims about foods or other products including claims based on ingredients, health claims, and others.

In many aspects, the ingredient data management platform 20 can deconstruct all of the information on the labels 100 and can assign base attributes 120 to all of the information. Similar to the Yellow 5 example above, many different names can be used to indicate added sugar. By way of this example, a multitude of ingredients (from the constituent information 122) can be recognized and assigned base attributes 120 that are sugar and ingredients comparable to sugar. One of the master attributes 124 can be "Added Sugar" and can be associated with the respective consumer products 110 having the labels 100 containing such constituent information 122. The ingredient data management platform 20 can then identify many food products and determine which ones have "Added Sugar" without requiring the user to know the hundreds of different ingredients that can be added to a food product that amounts to "Added Sugar." Just like the Yellow 5 example, a user can inquire about one of the characteristics of a certain food product or many food products and the ingredient data management platform 20 can identify those food products without the user having to be versed in all of the possible sugar contributors or synonyms for Yellow 5.

In the various aspects of the present disclosure, the master attributes 124 can be delivered to the many users through the tailored views. The master attributes 124 can be based on a combination or relationship of the base attributes 120, contextual information of the product, the type of user requesting the information, user profiles, search histories or relevant analytic results, and the like. The types of users can generally include the brand owners or product manufacturers, the retail user that sell products on a retail basis (like packaged food), and the consumer. In other instances, government and regulatory bodies such as the FDA can be a user or any of the one or more regulatory agencies associated with the products. Each of these types of users can have purposefully distinct uses of the ingredient data management platform 20 with specific tailored views.

In accordance with the many aspects of the present disclosure, the ingredient data management platform 20 enables many distinct use cases for manufacturers, retailers, and consumers, among others, including use cases related to marketing research, product development, and compliance with certification processes and government regulators. The use cases can also include product positioning including shelf organization and marketing claims, and advertising placement and review including personalized recommendations for consumers.

In accordance with present disclosure, the ingredient data management platform 20 can provide users with enhanced information relative to what is listed in the text 104 and the graphics 106 on the labels 100. The base attributes 120 can be determined automatically under computer control based on what is in each of the different categories recognized from the text 104 and graphics 106 on the labels 100. In certain instances, the same information in the text 104 and graphics 106, however, can be categorized into at least two categories. Master attributes 124 can then be automatically assigned to each of the products based on the base attributes 120 or the categories in which they are organized, or both. In certain aspects of the present disclosure, one of the master attributes 124 can be based on at least two of the base attributes 120 in two of the different categories.

For the various use cases detailed herein, the ingredient data management platform 20 can receive many requests from the users that can request many different tailored views and include reports listing many master attributes 124. The reports when applicable can also include or be descriptive of base attributes 120 and constituent information 122. In the various aspects of the present disclosure, a subset of master attributes 124 can be selected automatically when the request from one of the users is acknowledged or received. The subset of the master attributes 124 can be based on a combination of the request received from the user and contextual information (such as a history or likes and dislikes of certain products, variants, or brands) associated with the product so that what is delivered can be shown to have an unprecedented level of information helpful to the user relative to the label on the product.

In the various aspects of the present disclosure and with reference to FIGS. 3A, 3B, 3C and 3D, an exemplary version of an ingredient data management platform 700 can similarly receive information from the labels 100 of the products 110. The ingredient data management platform 700 can be another embodiment of the ingredient data management platform 20. The information from the labels 100 can be from a brand owner 710 directly and can be in the form of the label text and graphic images from which the actual box or container art and labels are produced. The labels 100 can also be delivered from retailers 720. From the retailers 720, the labels 100 can be the actual artwork, information, text, etc., that form the product labels. In further examples, the labels 100 can include images taken of the actual labels. The actual labels can be on the product at the time or can be ready to be affixed to the product (i.e., the label flat). The retailer 720, the brand owners 710, and others can use a mobile application 730 to send the images taken of the actual labels. Whether images, actual label art, or a feed of information, the labels 100 can be received into a web upload module 750.

In the various aspects of the present disclosure, the web upload module 750 can communicate with a cloud storage facility module 760, a database module 770, and a thumbnailer module 780. The ingredient data management platform 700 can break down the text 104 and graphics 106 of the labels 100 into the base attributes 120 that can be parsed and stored into many different category modules including an ingredients module 800, a logos module 802, a nutrients module 804, a warnings module 806, and a claims module 808. Certain aspects of the present disclosure include categories, e.g. six categories, in which the base attributes 120 can be classified. In certain aspects, there can a be a rest-of-product module 810 that can serve as a catch-all when certain information does not pertain to the other categories. It will be appreciated in light of the disclosure that the types or number of categories, or both, into which the base attributes 120 can be arranged can vary based on the type of product. While the example above pertains to food, other categories could be implemented when needed such as for non-consumables.

In many aspects of the present disclosure, the web upload module 750 can allow drag and drop functionality to automatically upload labels 100 of products 110 into the ingredient data management platform 20 and the computing environment. Images can be identified, and with drag and drop functionality, can be detected and automatically loaded into the ingredient data management platform 20 and made available in the computing environment. In many aspects of the present disclosure, the database module 770 can house metadata about the images from labels 100 uploaded into the cloud storage module 760. In many aspects of the present disclosure, the thumbnailer module 780 can automatically take high-resolution images and create thumbnail images for better user experience in analytics and API portals in the computing environment.

In many aspects of the present disclosure, the ingredients module 800 can automatically identify, deconstruct, and assist with analyzing all ingredients on the product 110 loaded into the computing environment to identify its constituent information 122. In many aspects of the present disclosure, the logos module 802 can automatically identify and assist with analyzing all logos and certificates (e.g., Kosher, Gluten Free certifications, or the like) to identify such logos in the constituent information 122. In many aspects of the present disclosure, the nutrients module 804 can identify, deconstruct, and analyze nutrients as detailed or outlined by the known Product Nutrient or Supplement facts panel on the label 100 or other nutrients listings in text or graphics to automatically identify such nutrients the constituent information 122. In many aspects of the present disclosure, the warnings module 806 can automatically identify, deconstruct, and assist with analyzing all the constituent information 122 in the computing environment related to allergens and other consumer warnings associated with facilities (e.g., made in a facility that also processes peanuts), contents, combinations with other products, or the like. Allergens identified with the warnings module 806 can also be automatically identified, deconstructed, analyzed and saved or associated with the metadata of the respective consumer products 110. In many aspects of the present disclosure, the claims module 808 can receive unstructured claims data from the computing environment and understand the meaning of the claims in the constituent information 122 by using resources in the computing environment such as pattern recognition, machine learning, keyword identification, or the like to assign appropriate base attributes 120 and master attributes 124. In many aspects of the present disclosure, the rest-of-product module 810 can automatically identify, deconstruct, and assist with analyzing all data on the package not captured by module 800, 802, 804, 806, 808 and make that data available in the computing environment.

In many aspects of the present disclosure, the ingredient recognition engine 900 can take the ingredients automatically captured by the ingredients module 800 and can use the computing environment to parse and recognize patterns to determine and correctly identify ingredients to assign the base attributes 120 and the master attribute 124 accordingly. In many aspects of the present disclosure, the claim recognition engine 902 can take the claims as captured by claims module 808 and can automatically parse and recognize patterns to determine objective claims (such as Hint of Salt means Low Sodium). In many aspects of the present disclosure, the nutrient recognition engine 904 can take the nutrients from the nutrients module 804 and can automatically parse and identify true values of similar constituent ingredients, such as Ascorbic Acid and Vitamin C being the same. In many aspects of the present disclosure, the rest-of-product recognition engine 906 can take the data from the rest-of-product module 810 and can automatically parse, identify, and map relationships between brand and manufacturer and flavor and product size and other data on the label not otherwise processed by the other engines 900, 902, 904.

In many aspects of the present disclosure, the attribution module 950 can take base attributes 120 assigned to the constituent information 122 and use recognition engines to allow for manipulation of what base attributes 120 and master attributes 124 are associated with the various pieces of constituent information. In many aspects of the present disclosure, the indexing module 960 can take the data from a relational database and index it into a NoSQL or document store for faster access and fuzzy searching.

The information on the labels 100 can be received into the ingredient data management platform 700 using imaging scanning and an optical character recognition (OCR) system 820 that can recognize the text 104 or the graphics 106, or both, on the label 100. The graphics on the label can detail certifications or marketing claims such as "Gluten Free" or "Kosher" and those too can be recognized automatically and can be loaded into the ingredient data management platform 700. Each and every piece of information on the labels 100 can be received into the ingredient data management platform 700.

In further aspects of the present disclosure, the ingredient data management platform 700 can use a combination of OCR and graphical image recognition (i.e., one or more recognition and comparison processes). When there is a match between the OCR and graphical image recognition and possibly manual human data entry, the ingredient data management platform 700 can determine that the information is correct with the match and accept it for the label. When there is any mismatch in the entered information, the ingredient data management platform 700 can use this unmatched entered data as a feedback loop, and as such the ingredient data management platform 700 can learn from this feedback loop.

In some aspects of the present disclosure, the feedback loop that indicates the error in matched information can prompt the ingredient data management platform 700 to present the incorrectly matched information from the label 100 to additional computing resources to make an automatic determination or to a data entry person (i.e., a human checker) when appropriate. By way of this example, when the information recognized by the OCR and graphical recognition systems matches entered information from other computing resources; the entry of the information is deemed correct with the match and received by the ingredient data management platform 700. By way of this example, when the information recognized by the OCR and graphical recognition system can match the information entered by other computing resources, then it is deemed a match and received into the ingredient data management platform 700.

With all of the constituent information 122 extracted from the label 100 and the accuracy of its entry confirmed through the matching processes described herein, the ingredient data management platform 700 can begin to associate (or confirm the association) of the base attributes 120 to each piece of the constituent information 122 obtained from the label 100. In the many aspects of the present disclosure and with reference to FIG. 3B, the ingredient data management platform 700 can include an ingredient recognition engine 900, a claim recognition engine 902, a nutrient recognition engine 904, and a rest-of-product recognition engine 906. Each of the engines 900, 902, 904, 906 can deconstruct the information on the labels 100 that pertain to the engine and determine base attributes 120 from that information by identifying the specific ingredients, marketing statements, certifications, and claims.

Further aspects of the present disclosure include deconstructing text 104 of the labels 100 that can include a compound ingredient listing from the ingredient listings. The ingredient recognition engine 900 of the ingredient data management platform 700 can recognize these compound ingredient listings and can deconstruct the compound ingredient listings into individual ingredients. In certain aspects, the base attributes 120 can be automatically assigned to the individual ingredients recognized in the compound ingredient listing and at least one of the base attributes 120 can be associated with each of the individual ingredients from the compound ingredient listing.

In other examples, the compound ingredient listing can include the text of a name of a mixture followed by a parenthetical in the listing containing the individual ingredients. By way of this example, base attributes 120 can be automatically assigned to the individual ingredients recognized in the compound ingredient listing and at least one of the base attributes 120 can be associated with each of the individual ingredients and categorized in the ingredients category. In one example, the compound ingredient listing can be "7 Grain Flour Blend (Flaxseed, Barley, Oats, Spelt, Wheat, Corn, and Rice)." The ingredient recognition engine 900 can determine that the beginning text that announces the mixture (i.e., "7 Grain Flour Bread) can be determined to not be an ingredient and no base attributes would need to be assigned to the 7 Grain Flour Bread beginning text. The individual ingredients listed in the parenthetical (i.e., Flaxseed, Barley, Oats, Spelt, Wheat, Corn, and Rice), however, can have base attributes 120 associated with them by the ingredient recognition engine 900. The beginning text that announces the mixture (i.e., 7 Grain Flour Bread) can be determined to be relevant to the claim category, or other categories besides the ingredient category, and can base attributes associated with those categories.

In further examples, the compound ingredient listing can include an "and/or" statement. By way of this example, base attributes 120 can be automatically assigned to the constituent information 122 recognized in the compound ingredient listing by assuming that all of the individual ingredients are present. In other examples, the retail brand user can confirm portions of ingredients in the compound ingredient listing and base attributes 120 can be associated accordingly with the information from the brand user. In one example, the compound ingredient listing can be "Vegetable Oil (Canola, Cottonseed, and/or Sunflower)." The beginning text that announces the mixture (i.e., "Vegetable Oil") can be determined to not be an ingredient (but an overly broad term for these purposes) and no base attributes need to be assigned to it as an individual oil. Vegetable Oil is nevertheless saved to the ingredients module 800 for consideration of applicability to the other base attributes. In further examples, the beginning text that announces the mixture (i.e., "Vegetable Oil") can also be determined to be an ingredient and one or more of the base attributes 120 can be assigned to it. The individual ingredients listed in the parenthetical with the "and/or" statement, i.e., "Canola, Cottonseed, and/or Sunflower," would have base attributes associated and with them in the ingredients category. The beginning text (i.e., "Vegetable Oil") can be determined to be relevant to the claim category, or other categories besides the ingredient category, and can have the base attributes 120 associated with those categories, such as an example of a presence or a lack of palm oil.

The claim recognition engine 902 of the ingredient data management platform 700 can recognize and parse all of the claims on the labels 100 including those in the text, and those in graphics. The claims can be in reference to the product contained in the container, or to the container itself, for example how it can be recycled. The nutrient recognition engine 904 of the ingredient data management platform 700 can recognize and parse all of the nutrients listed on the labels 100 especially including the information in the nutritional data area of the labels 100. The rest-of-product recognition engine 906 of the ingredient data management platform 700 can recognize and parse all of the other information on the labels 100 including those in the text, and those in graphics. The rest-of-product recognition engine 906 can identify and parse certification statements, UPC codes, manufacturer's information, and the like.

Each of the engines 900, 902, 904, 906 can deconstruct the constituent information 122 on the labels 100 that pertains to the products and assign base attributes 120 to that constituent information 122 by identifying the individual ingredients, marketing statements, certifications, and claims. These engines take the plain information from the label, whether it be text or graphics, or both, and assign base attributes so that the ingredient data management platform 700 is able to recognize every ingredient, claim, certification, or any marking, text, or graphics on the label 100. When the ingredient data management platform 700 is not able to recognize a word, or other text or graphic on the labels 100, the ingredient data management platform 700 can flag the data and require further human input or further computing environment resources to identify it.

In many aspects, each of the engines 900, 902, 904, 906 can deconstruct the constituent information 122 on the labels 100 using pre-constructed taxonomies of many different ingredients, nutrients, claims, and other text and graphics found on the labels 100. The taxonomies can link different individual ingredient names by what they are the "same as" providing the ability to search and find products that contain a specific ingredient even though that ingredient may have hundreds or thousands of unique names. Recalling the Yellow 5 examples that have over 1,000 different names, the taxonomies can group all of the "same as Yellow 5" entries together.

In the further aspects of the present disclosure, each of the engines 900, 902, 904, 906 can deconstruct the constituent information 122 on the labels 100 using rules engines to identify the many different ingredients, nutrients, claims, and other text and graphics found on the labels 100. In other aspects of the present disclosure, each of the engines 900, 902, 904, 906 can deconstruct the constituent information 122 on the labels 100 using inverted radix trees to drill down, isolate and ultimately identify all of the constituent information 122 in the form the different ingredients, nutrients, claims, and other text 104 and graphics 106 found on the labels 100.

Figure 3B:
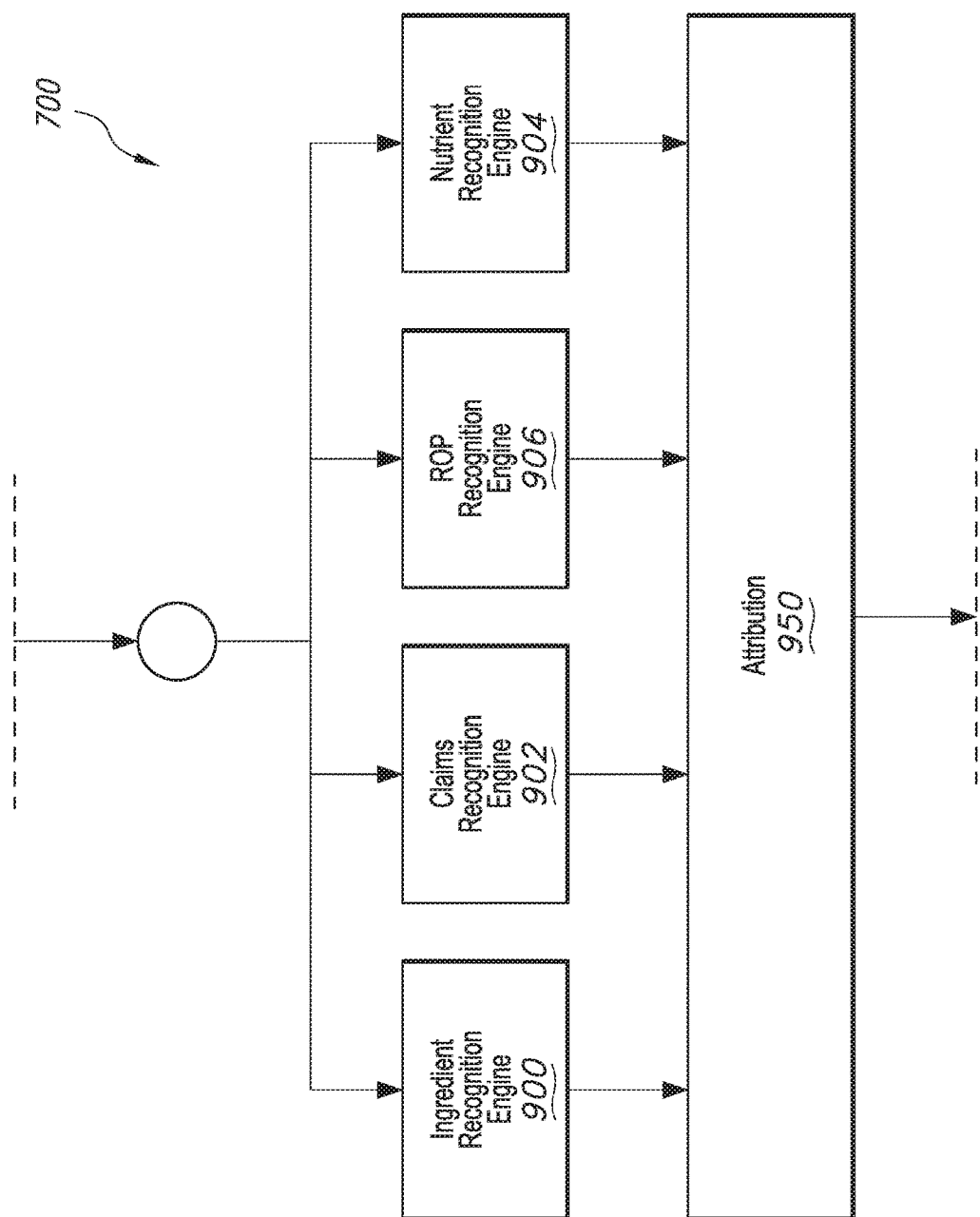
Figure 3C:
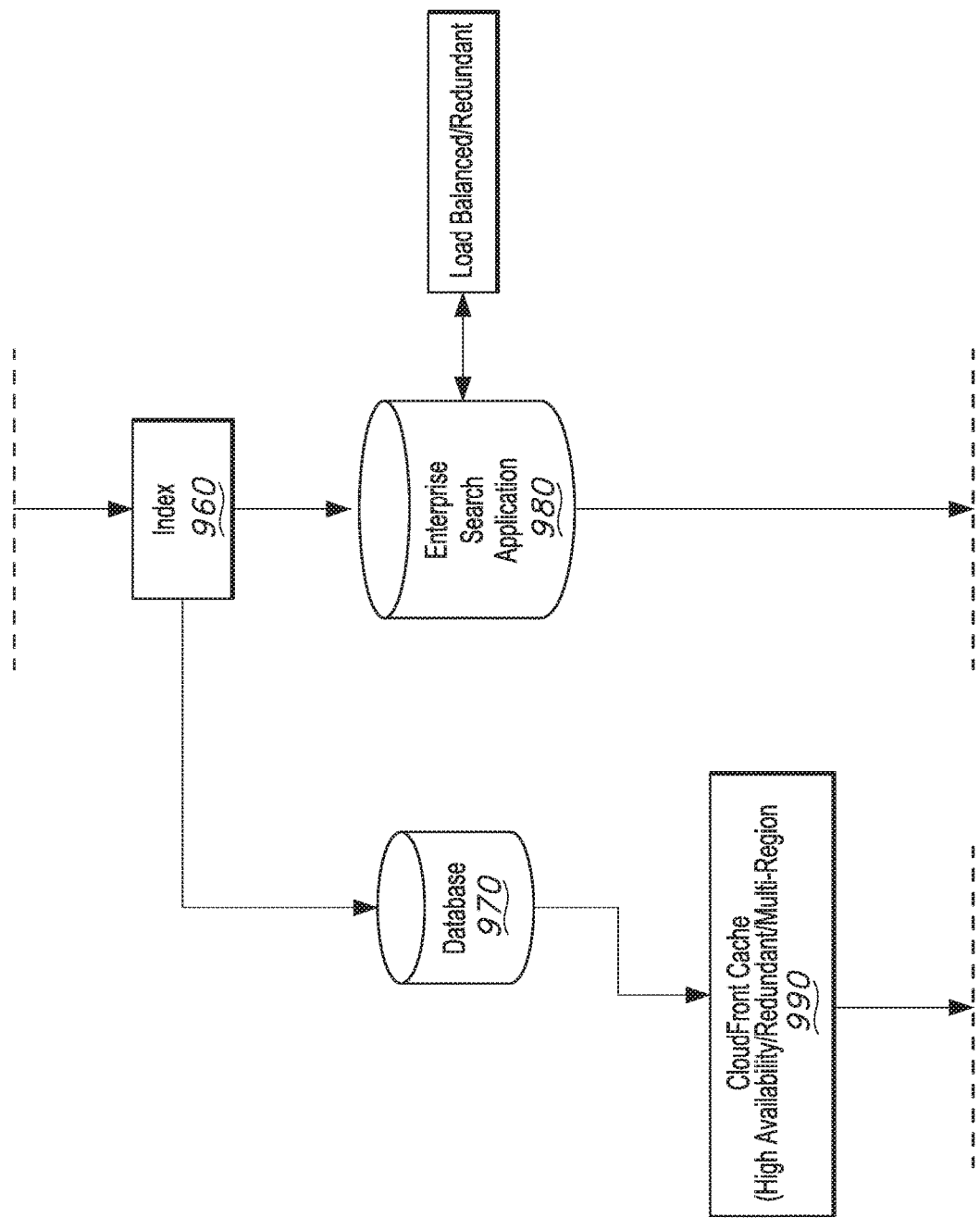

In many aspects, each of the engines 900, 902, 904, 906 after deconstructing the constituent information 122 on the labels 100 and assigning base attributes 120, can move the identified information to the attribution module 950. The attribution module 950 can assign the master attributes 124 to all of the information identified by each of the engines 900, 902, 904, 906 but by specifically referencing the assigned base attributes 120. With reference to FIG. 3C, the master attributes 124 for each of the products can be directed to an indexing module 960 and database module 970 from the attribution module 950. The database module 970 can be an Amazon DynamoDB® brand database service. From the database module 970, the information can be passed to an enterprise search platform 980, such as a SOLR on Apache Lucene™ brand platform. The database module 970 can move information to and from a cache 990, such as cloud front cache.

Figure 3D:
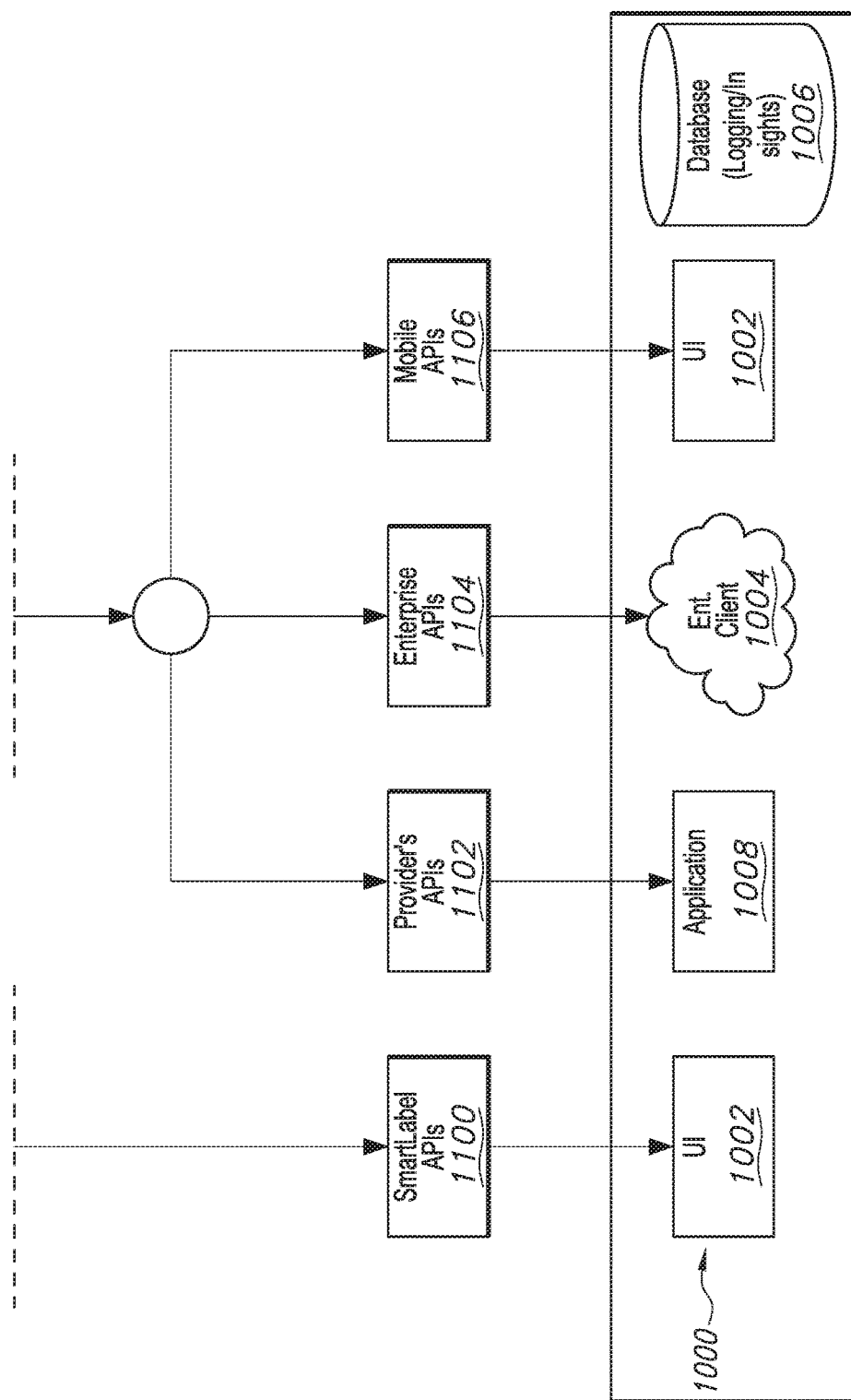

From the database module 970, the cache 990, and the enterprise search platform 980, the information with master attributes 124 assigned and searchable (along with the base attributes 120 and constituent information 122 as needed) can be made available to the many different users through specific user interfaces 1000 and through APIs that can interact with user interfaces or work with other systems, as shown in FIG. 3D. The user interfaces 1000 can include a user interface 1002 on a mobile device and can also include an enterprise interface 1004 that can be made available or can be resident on a user's computer or private network facilities. The user interface 1000 can also include a database 1006 that can be queried by a user. The user interface 1000 can also include an application 1008 that can be queried by a user remotely or used in a resident or dedicated fashion. In many aspects, the APIs can include a SmartLabel® brand API 1100, a provider API 1102, an enterprise API 1104, a mobile API 1106, and the like. The SmartLabel brand API 1100, the provider API 1102, the enterprise API 1104, and the mobile API 1106 can each be a representational state transfer API. That can rely on a stateless, client-server, cacheable communications protocol. In many aspects, the HTTP protocol or the HTTPS protocol can be used.

The various aspects of the present disclosure can include a custom filter that the ingredient data management platform 700 can use when delivering the subset of master attributes 124 to the user. The user can establish the custom filter so that the same arrangement of master attributes 124, as determined by the user, can be repeatedly delivered to the user in the same format established by the custom filter. The custom filter can serve as a custom specification where users can pre-configure one or more views. For example, the user may be mindful of an allergy or irritant and when viewing products can highlight certain ingredients that might affect the user undesirably.

Moreover, the user can amend the custom filter or specification using the customer user interface. Additionally, the data displayed in the custom filter or specification can be normalized so that different users can compare using the similarly configured filters of specifications. The user can also employ APIs to facilitate the data within third-party applications. Further aspects of the present disclosure can include delivering the subset of the master attributes 124 to the user by presenting the subset in a custom view having a first format based on one of the requests from the user and one of the products. In other aspects, the user can be a brand owner and the presenting of the master attributes 124 includes delivering the custom view having the first format determined through interaction with a brand user interface. The brand user interface can be configured to receive input from the brand user to deliver the custom view changed from the first format to a second format where the second format based on the input from the brand user through the brand user interface.

In accordance with the many aspects of the present disclosure, the brand user interface 550 can use the brand user API 560 to access the ingredient data management platform 20 for detailed information about the ingredients provided by the brand users or manufacturers. To this end, the brand user can connect between its own databases and those of another party with information from the ingredient data management platform 20. In other aspects, the ingredient data management platform 20 can include the retailer user interface 590 and the retailer API 580 that can access the ingredient data management platform 20 for detailed information about the ingredients that the retailer sells, including by direct connection between the retailers' own databases, inventory databases at various retail locations and the ingredient data management platform 20. The consumer API 460 can access the ingredient data management platform 20 for detailed information about the ingredients of interest to the consumer and can coordinate such ingredient data with user applications, other medical programs, exercise programs, or social media applications of the user. The consumer API 460 can also be used to connect with computers in the home and those interfaces available through the retailer and brand owner that can connect with the ingredient data management platform 20 and the interfaces or mobile devices of the consumer to provide the rich ingredient information to various systems directed by the user.

In further aspects, the retailer API 580 can be used to coordinate point of sale transactions to provide the information from the ingredient data management platform 20 to a third-party who can be tracking point of sale transactions for that retailer. The retailer can know not only what is being sold and how it is being sold, but the retailer can also determine many different aspects of the overall sales and drill-down into differing purchases based on the information from the ingredient data management platform 20. Moreover, the consumer APIs 460 can be used to coordinate to confirm purchases at the point of sale, track nutrition, or use the data at the point of the sale and direct or port that data into other user-preferred applications. The brand user APIs 560 can also be used to track and perform analytics on the point of sale transactions to determine many different things including the success of brands in certain geographies, customer demand for certain ingredients, and the like. Every attribute that is associated with each of the products in the ingredient data management platform 20 can be associated with the product at the point of sale and the retailer, the brand owners, the consumer and various third-party tracking and data aggregation entities can track these sales and perform analytics on the associated data. This tracking can, in turn, provide for the selection of items on retailers' shelves that more directed to the buying demands of customers.

When a user identifies products of interest in one or more filters, profiles, or custom specifications, the ingredient data management platform 20 can automatically begin to build a health and nutrition profile based on the detailed understanding of the attributes of that product when associated with the consumer interest. For example, when the consumer shows interest in a sort of high fiber chocolate☐covered muesli bars, the ingredient data management platform 20 can infer that the user is interested in high fiber, and this interest can be added to their profile. In a further example, the user can further indicate interest in a preservative free bar or a low-calorie bar, or both, and, therefore, the ingredient data management platform 20 can add preservative free or low calorie, or both, to their profile.

In yet further aspects of the present disclosure, the user can be a consumer and the consumer can access the ingredient data management platform 20 using the consumer user interface. The consumer user interface can be used to provide a consumer label view that contains more information that the label on the food product to which it relates. The consumer label view can be a SmartLabel® that is viewable through the consumer user interface. The SmartLabel® can conform to the SmartLabel® brand of labels. Additional aspects of the present disclosure include the delivering the subset of the master attributes 124 including presenting the subset in the consumer label view to the consumer through the consumer user interface.

The consumer user interface can be configured to receive QR code data from a mobile device of the consumer and to present the consumer label view that pertains to the QR code on the consumer user interface that is on the mobile device. In some aspects, the consumer label view can contain information not on the label of the food product to which the QR code data pertains.

In other aspects, the consumer user interface can be configured to display the consumer label view that is limited only to the food product to which the QR code pertains. In further aspects, the consumer user interface can be configured to display the consumer label view that details a grouping of food products including the food product to which the QR code pertains. By way of this example, the user can search for a food product with the QR code and receive a SmartLabel® brand label or consumer label view through the consumer user interface.

In yet further aspects of the present disclosure, the consumer user interface can be configured to highlight to the user the food product to which the QR code pertains relative to other food products in a grouping of food products all of which can be related to the food product initially identified with the QR code. By way of this example, the user can search for a food product with the QR code and receive the SmartLabel® brand label or consumer label view through the consumer user interface that compares many related food products relative to the food product identified by the QR code. In certain aspects, QR code data can be received from the mobile device that contains at least two food products. The consumer user interface can be configured to display the consumer label view that details a grouping of food products including the at least two food products that pertain to the received QR code data. In the various aspects of the present disclosure, the mobile device can be a smartphone, a handheld scanner, a kiosk by the consumer, and a portable computer and the consumer user interface can be on the mobile device.

The SmartLabel® brand label can include several sections including the Nutrition Facts Panel, Ingredients, Allergens, Marketing Claims, Health & Safety, GMO Disclosure, Product Instructions, Sustainability, and Brand/Company. Several of the sections listed in the SmartLabel® brand label are verbatim from the package, such as the Nutrition Facts Panel and Product Instructions sections, while others can require analysis, taxonomy based recognition and off package data generation.

In one example, the SmartLabel® brand label ingredient section can require that all ingredients be individually parsed and for their parenthetical relationships to be displayed in a hierarchical fashion. The systems and methods disclosed herein can make this task relatively easy, as each ingredient can be parsed out individually while maintaining its order and parenthetical relationship to the other ingredients located within the ingredient declaration.

In further examples, the SmartLabel® brand label allergen section can highlight the containment level of the 8 FALCPA allergens based on ingredient declarations and allergen warning statements. Using the systems and methods disclosed herein, the ingredients can be parsed and each ingredient can be assigned FALCPA allergen properties for the three main containment levels—Contains, May Contain and Does Not Contain. This results in an analysis that can be used to determine the FALCPA allergen containment level of each ingredient associated to an individual product based purely on the ingredient declaration. The systems and methods disclosed herein further make it possible to determine more specific containment levels such as Facility Free, Shared Facility and Shared Equipment based only on the allergen warning statement. This result in a comprehensive allergen analysis that can be shown to allow for easy identification of the six FALCPA allergen containment levels required as part of the SmartLabel® brand label specification.

In an additional example, the SmartLabel® brand label marketing claims section can use a mixture of verbatim claims generated directly from the package, off package claims and derived claims from other data points available on the package. The off package and derived claims can be shown to be some of the most valuable pieces of information, as they can add additional information and marketing ability from what is on the package due to limited real estate on the packaging. The systems and methods disclosed herein can provide unique derived claims that can be created based on using additional data points from the label. The derived attributes can offer manufacturers' a variety of options when implementing the SmartLabel® brand label including an FDA Nutrient Content Claim that utilizes nutrient analysis per serving, per Reference Amounts Customarily Consumed (RACC), per 100 and main/meal/individual category analysis, or an ingredient absence statement that relies on attributes already determined by the disclosed systems and methods. In other aspects of the present disclosure, the ingredient data management platform 700 can host at least two users and each of the users being a consumer engaged to the ingredient data management platform 700 through the consumer user interface. The first consumer and the second consumer each have a mobile device with the consumer user interface. In various aspects, the consumer user interface of the first consumer creates a first profile based on requests from the first consumer. The consumer user interface of the second consumer creates a second profile based on requests from the second consumer.

In further aspects of the present disclosure, the selecting of the subset of the master attributes 124 automatically can include selecting a first subset of the master attributes 124 automatically when a first request is acknowledged from the first consumer and selecting a second subset of master attributes 124 automatically when a request is acknowledged from the second consumer. An example of a first subset of master attributes 124 can be three attributes: no Yellow 5, no sugar, and gluten free. The first subset of the master attributes 124 is based on a combination of the request received from the first consumer, the contextual information associated with the product, and the first profile. The second subset of the master attributes 124 is based on a combination of the request received from the second consumer, the contextual information associated with the product, and the second profile.

Differences between the first profile and the second profile increase with more requests from the first user or the second user, or both. The profiles of each of the users can develop to a point where the first consumer can view a certain food product using their profile in the consumer user interface and what they see would be very different, and in some instances, drastically different than what the second consumer can view through their profile in the consumer user interface of the same food product.

In certain aspects of the present disclosure, the ingredient data management platform 20, 700 can associate all of the constituent information 122 obtained from the label of a food product with food codes recognized by the National Health and Nutrition Examination Survey based on the base attributes determined from the label. The National Health and Nutrition Examination Survey (NHANES) is a survey research program conducted by the National Center for Health Statistics (NCHS) to assess the health and nutritional status of adults and children in the United States and to track changes over time. These NHANES food codes can be shown to aide in food-mapping to determine specific food compositions. In certain aspects of the present disclosure, the NHANES food codes can also be shown to serve as a reference value to drive a unified global approach and global standard giving the ability to classify every ingredient associated with the food product based on the NHANES food codes. In additional aspects of the present disclosure, the automatic assigning master attributes 124 to each of the food products is based on the base attributes 120 and includes applying food codes recognized by the National Health and Nutrition Examination Survey to the product based on the base attributes 120 from the ingredients category.

In certain aspects of the present disclosure, the ingredient data management platform 20, 700 can display the information from the labels 100 with reference to a reference amount customarily consumed (RACC). In this example, the user can be a consumer and ingredients obtained from the label can be displayed to the user with the RACC amounts even when the label lacks on RACC information. In further examples, the consumer user interface can be configured to display the ingredients with reference to a predetermined weight per serving. In one example, the predetermined weight per serving can be 100 grams. In further examples, the consumer user interface can be configured to display the ingredients with reference to a recommended daily allowance.

In many aspects of the present disclosure, the brand owner can review and confirm the correctness of all master attributes 124, base attributes 120, constituent information 122, and other information from each of its products for which labels 100 have been accepted into the ingredient data management platform 700. In further aspects, the brand owners can add additional detail to or verify, or both, the information from their products through the brand owner interface. The brand owner can indicate the country of origin of the product and for each individual ingredient. The brand owner can further indicate at which manufacturing facility the product is made and from where portions of ingredients have been sourced. The added information from the brand owner can be communicated to the retail user through the retail user interface and to the consumer through the consumer interface.

In many aspects of the present disclosure, the brand owner can use the brand user interface to display master attributes 124 associated with the food product as selected by the brand owner to confirm and verify whether the food product is complaint with a regulatory or certification authority. The master attributes 124 can be applied by the ingredient data management platform 20 and the brand owner can be notified that claims on the labels 100 of the product are correct, or in some instances, they may not be correct and can be altered. The brand user interface can also be configured to display master attributes 124 associated with the products as selected by the brand owner to confirm whether the food product is a candidate for a certification or a claim not already otherwise associated with the product. As such, the ingredient data management platform 20 can identify for the brand owner one or more certifications and or claims that could be applied but are not yet on the labels 100.

In many aspects of the present disclosure, the brand owner, or retailers, or both, can use the brand user interface, retailer interface, or a mobile application to conduct compliance checks of their products before the Food and Drug Administration (FDA). The information in the ingredient data management platform 20, 700 when related to food can be confirmed and verified by the FDA as a compliance check with FDA mandates for recalls, banned ingredients, FDA approvals, and the like.

In many aspects of the present disclosure, the consumer can use the consumer user interface to explore the product base and all master attributes 124, base attributes 120, and the constituent information 122 in the ingredient data management platform 20, 700. As such, the user can start a search based on a single ingredient. The user interface can apply various analytics that allows exploration of product categories at different levels, such as based on ingredients and claims. For example, information from the ingredient data management platform 20 can reveal that one in five snacks, energy or granola bars in the US now makes a non-GMO claim of some kind. It can be shown that this food category that includes snacks, energy or granola bars is the leading category for non-GMO claims, compared with an average of 4.2% for all the grocery products in its database.

Figure 4:
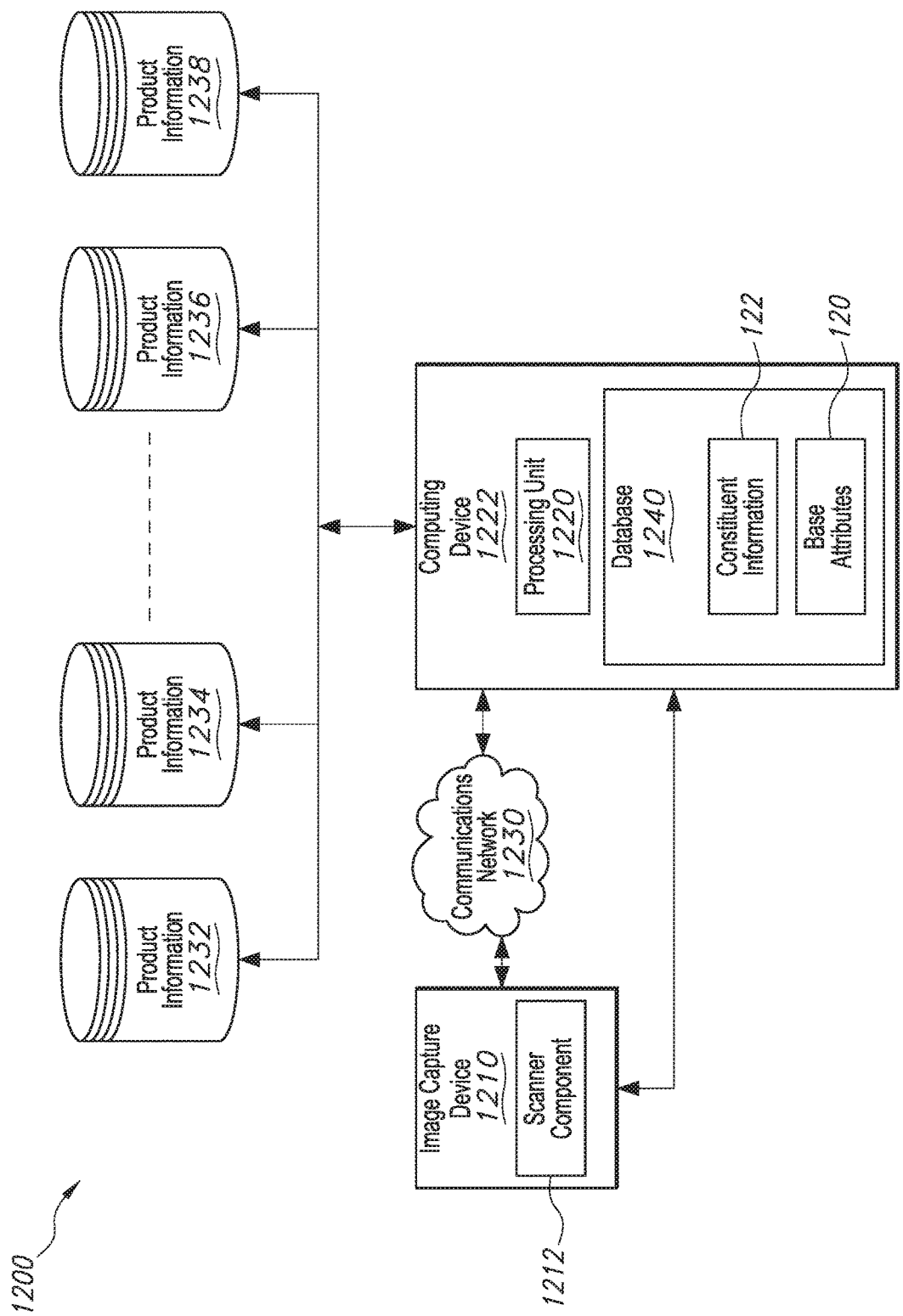
FIG. 4 is a diagram of an exemplary image capturing computing system in accordance with the present disclosure.

In many aspects of the present disclosure, an image capturing computing system 1200 can perform the methods and processes discussed in the present application and depicted in FIG. 4. The image capturing computing system 1200 can include an image capture device 1210 that can functionally communicate with a processing unit 1220 of a computing device 1222 directly, or over a communications network 1230, which may be an IP-based telecommunications network, the Internet, an intranet, a local area network, a wireless local network, a content distribution network, or any other type of communications network, as well as combinations of networks.

The image capture device 1210 can be employed to automatically capture product information from a product or consumable good, such as an image of a product label located on a portion of a product or consumable good, such as the label 100 (FIG. 2). In many aspects of the present disclosure, metadata identifying portions of the product label as graphic or text may be encapsulated or otherwise embedded within the captured image. Although FIG. 4 only includes a single device, it is contemplated that there may be multiple image capture devices 1210 (e.g., remotely located, or scalable through a cloud network facility) that automatically capture product information including product labels of products and/or consumable goods.

Each image capture device 1210 can include a scanner component 1212 that can function to obtain product information from a product or consumable good. Stated differently, the scanner component 1212 can optically scan some portion of a product, such as the label 100, and output image data corresponding to the scanned portion of the product. In one specific example, the scanner 1212 may optically scan a barcode label or other machine-readable components of the label that can be provided on consumer products.

The image capture device 1210 can automatically transmit the product information (e.g., scanned image data) and any associated metadata to the image processing unit 1220 for processing and parsing. In some aspects, the product information may have been previously captured and stored in a database for later retrieval and processing by the computing device 1222, such as from the product information 1232, 1234, 1236, 1238.

The processing unit 1220 may employ various optical character recognition (OCR) programs to process, deconstruct, and parse the product information and/or product image data, which generates text strings from alphanumeric label information and generates graphics maps/images from graphics and/or logos included in the image data of the product labels. The text and/or graphics data may be compared to various text and graphics data in a database to return information relative to the scanned text string(s)/graphic(s). In many aspects, the image processing unit 1220 can automatically parse the product labels to determine or otherwise identify every piece of constituent information 122 on the labels 100 and assign one or more base attributes 120 to each piece of constituent information 122 for each product, particularly including all text and graphics on the label.

In many aspects, the computing device 1222 may automatically catalog and index or otherwise store the constituent information 122 and the base attributes 120 in a database 1240. Although the database 1240 is depicted as being located within the computing device 1222, it will be appreciated in light of the disclosure that the database 1240 can be located external to the computing device 1222, such as at a remote location or through a cloud network facility that can be connected to the computing device 1222 through the communications network 1230.

Figure 5:
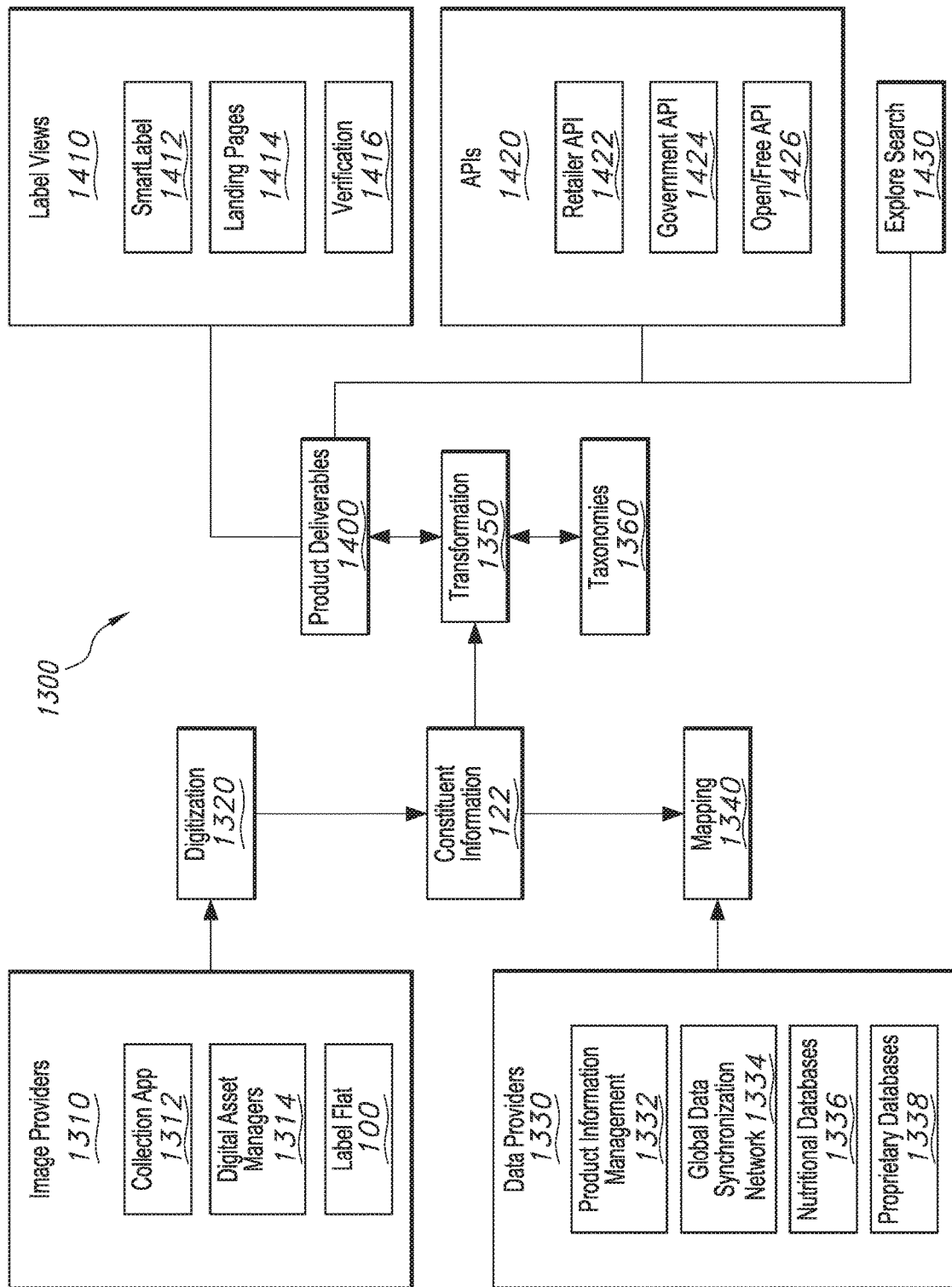
FIG. 5 is a diagram of an exemplary technology stack for obtaining constituent information and providing master attributes and additional information to views, APIs, and search systems in accordance with the present disclosure.

In many aspects of the present disclosure, an exemplary technology stack 1300 can be associated with the ingredient data management platform 20, as depicted in FIG. 5. The technology stack 1300 can be an embodiment of the technology stack in the ingredient data management platform 20. The technology stack 1300 can obtain constituent information 122 and provide master attributes 124 and additional information to views, APIs, and search systems in accordance with the present disclosure. The technology stack 1300 can connect to image providers 1310. The image providers 1310 can provide the text 104 and graphics 106 directly from the labels 100. The image providers 1310 can include a collection app 1312 and digital asset managers 1314 from which constituent information 122 can be exchanged or downloaded. The image providers 1310 can also include the labels 100 from which the constituent information 122 can be obtained. Information from the image providers 1310 can be digitized at 1320. The technology stack 1300 can also connect to data providers 1330. The data providers 1330 can provide the information relevant to each consumer products directly to the ingredient data management platform 20. The data providers 1330 can include information obtained from product information management 1332, the global data synchronization network 1334, one or more nutritional databases 1336, and one or more proprietary databases 1338. Information from the data providers 1330 can be mapped at 1340.

From digitalization at 1320 and mapping at 1340, the information from the image providers 1310 and the data providers 1330 can be transformed at 1350. The transforming at 1350 can include the assignment of the base attributes 120 and their organization under the master attributes 124. The transforming at 1350 can include accessing taxonomies at 1360 in the assignment of the base attributes 120. The transforming at 1350 provides content for label views, APIs, and for search facilities as product deliverables at 1400. As such, the product deliverables 1400 can support label views 1410 (i.e., tailored views) including SmartLabel® pages 1412, landing pages 1414, verification pages 1416, and the like. The product deliverables 1400 can also support APIs 1420 including retailer APIs 1422, government APIs 1424, open/free APIs 1426, and the like. The product deliverables 1400 can also support information for an explorer search 1430 so that any user can perform many different search functions on the information from the ingredient data management platform 20.

In many aspects of the present teachings and with reference to FIGS. 1, 6A, 6B, and 6C, the ingredient data management platform 20 of the computing environment 10 including the exemplary ingredient data management platform 700 (FIGS. 3A-3D) and the exemplary technology stack 1300 (FIG. 4) disclosed herein may facilitate customizing, maintaining, and making portfolio wide adjustments of off-package information, detail, and further representations of content on the many products 110 by the brand owner 710 or the retailer 720. As disclosed herein, the brand owner 710 or the retailer 720 may use the ingredient data management platform 20 to determine the base attributes 120 based on the identified constituent information 122 recognized on and ingested from the many product labels 100. From the recognized and ingested constituent information 122 from the many labels 100, the ingredient data management platform 20 may be configured to provide a selection of the master attributes 124 and further information available in one or more tailored views including electronic labels 1510 such as a SmartLabel® brand label, the smart food product label landing page 510, the smart food product label QR 520, the digitized smart food product label 530, and other views. In many examples, the ingredient data management platform 20 transforms the constituent information 122 recognized and ingested from the many labels 100 and determines the master attributes 124 and further information available from the products 110 labels 100. As a result, the ingredient data management platform 20 transforms and provides information to the user not otherwise available on the product labels 100.

Figure 6A:
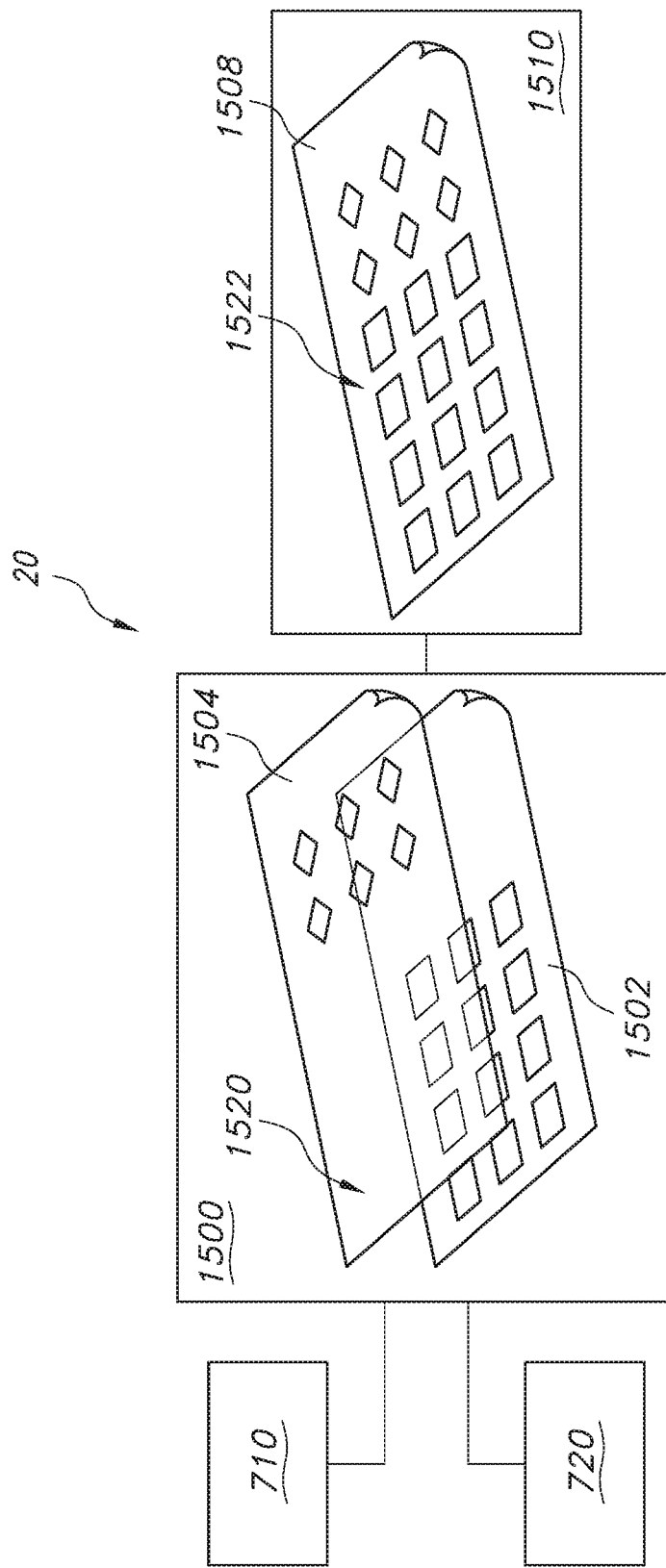
FIGS. 6A, 6B, and 6C are diagrams of exemplary publisher modules in the ingredient data management platform that include a first layer of information and a second layer of information whose information is combined into a published layer of information viewable in an electronic view in accordance with the present disclosure.
Figure 6B:
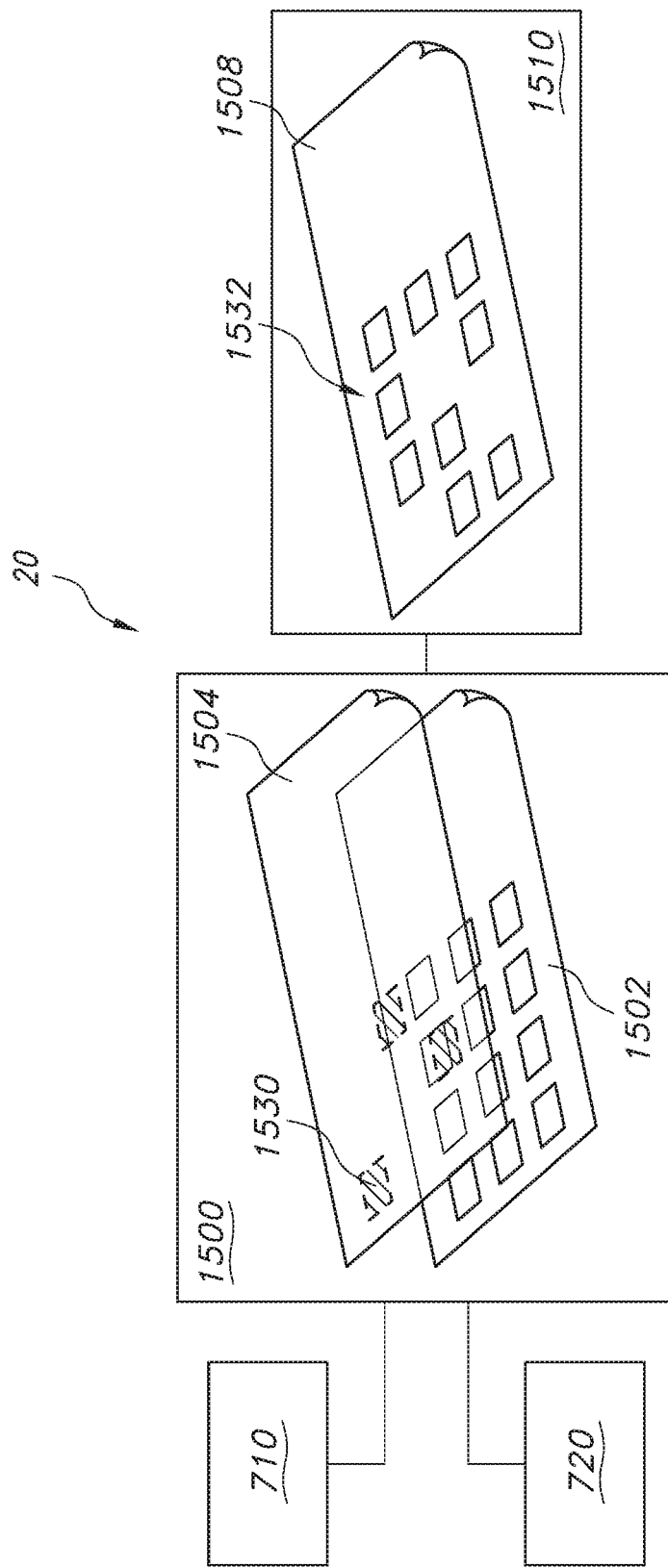
Figure 6C:
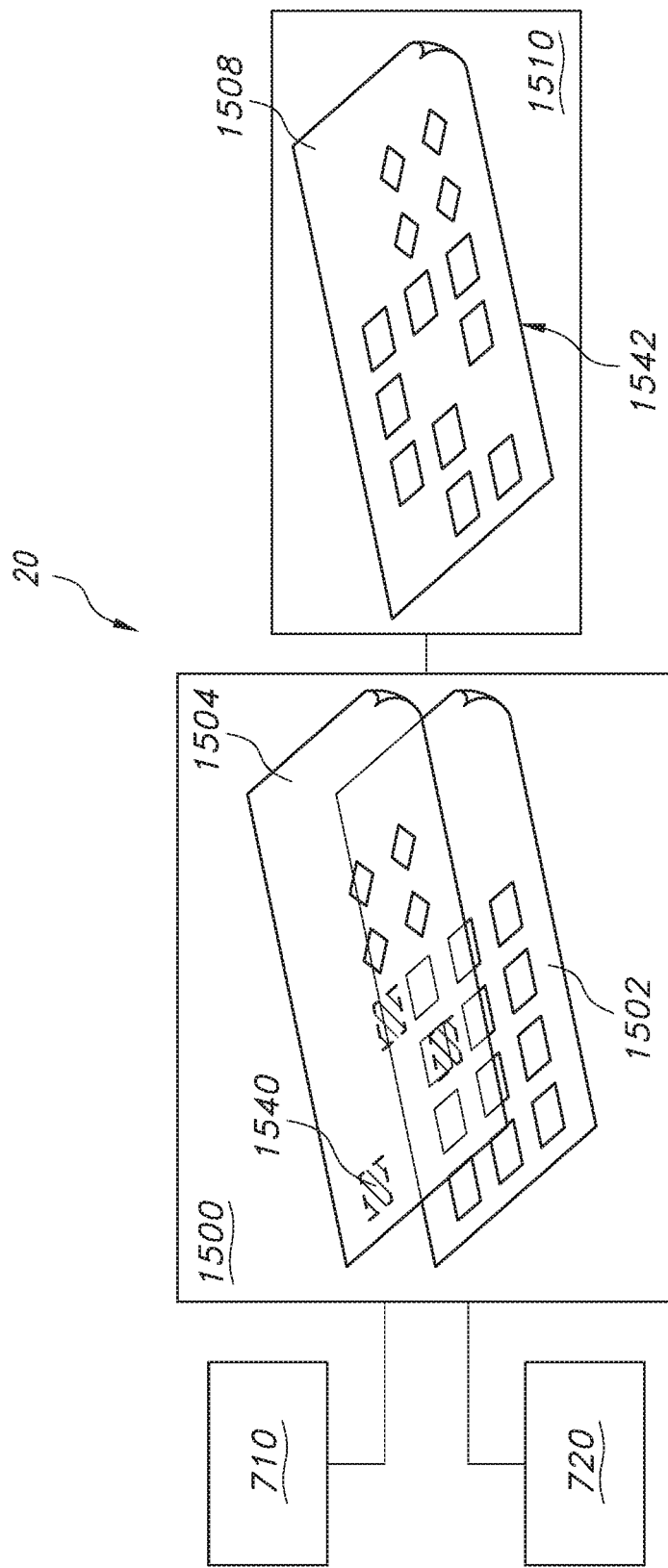

In many aspects, the master attributes 124 and the further information available in the one or more tailored views can be made available through a publisher module 1500 that can provide or obtain a first layer of information 1502, as shown in FIGS. 6A, 6B, 6C. The first layer of information 1502 can include information directly found on the product labels 100 and information, not otherwise found on, but determined from the product labels 100 by the ingredient data management platform 20. Information directly found on the product labels can include the retail shelf offerings 160, the ingredient listings 162, the certification listings 164, the recycling information 166, the warning listings 168, the name of the manufacturer 170, the social media information 172, the container sizes and weights 174, the machine information 176 pertaining to manufacturer, and the like, as shown in FIG. 2. The publisher module 1500 can also provide, build, or create a second layer of information 1504 that can be used as an editing layer that when published in combination with information from the first layer of information 1502 may provide a published layer of information 1508 that can be displayed in at least a portion of an electronic label 1510 or other tailored views. By way of these examples, the first layer of information 1502 includes in combination, information directly from the product label 100 and information determined by ingredient data management platform 20 that is based on the product label 100 but not actually written or depicted on the product label 100.

The second layer of information 1504 can be populated with the information from the first layer of information 1502. The publisher module 1500 can be configured so the brand owner 710 or the retailer 720 can amend, edit, re-arrange, delete, and/or otherwise modify any information in the second layer of information 1504. As disclosed herein, those changes can only be made to the second layer of information 1504. In addition, the publisher module 1500 can be configured so the brand owner 710 or the retailer 720 cannot amend, edit, re-arrange, delete, and/or otherwise modify any information in the first layer of information 1502. The ability of the brand owner 710 or the retailer 720 to quickly amend and publish the information from the second layer of information 1504 and make the information almost immediately available to users is a powerful tool to update the electronic label 1510 for multiple products 110 without the need to update, reprint, or push any changes or updates out to the actual print packaging and labels 100 for the actual products. The publisher module 1500 may also be configured to accept a change, an edit, an amendment, or another modification to the information in the second layer of information 1504 and make one or more changes across the same ingredient, package information, nutritional claim, or others that also exist in the second layer of information 1504 when directed through the publisher module 1500.

To the benefit of the brand owner 710 or the retailer 720, the first layer of information 1502 not only may contain information from product labels 100 but also contain additional information determined by the ingredient data management platform 20 that can add additional detail, certifications, warnings, allergy information, and other information as needed and disclosed herein. As such, the publisher module 1500 can be configured to use to the first layer of information 1502 to specifically pre-populate and memorialize its information in the second layer of information 1504. The brand owner 710 or the retailer 720, in turn, may not be permitted to alter in any way the information in the first layer of information 1502. As an example, the information in the first layer of information 1502 is locked, fixed, or may not be modified and cannot be changed by the brand owner 710 or the retailer 720 (unless there are, for example, changes to underlying ingredients or other information physically on the label 100 of the product 110 itself). The second layer of information 1504 can, therefore, be configured to supersede, substitute, and/or mask and also incorporate or wholly pass through information from the first layer of information 1502 when information from the first layer of information 1502 and the second layer of information 1504 are published through the publisher module 1500 in one or more of the electronic labels 1510 by the brand owner 710 or the retailer 720. As such, any additional information, any changes to information, and any removal of information, relative to what is set forth in the first layer of information 1502 can be memorialized in the second layer of information 1504 and publication of the information from the at least two layers of information 1502, 1504 can determine what the user can view through one or more tailored views including the electronic labels 1510, the SmartLabel® brand label, and the like.

In many aspects, the methods and systems herein include a system for the brand owner 710 or the retailer 720 to publish a portion of the electronic label 1510 for view by a user that contains additional information beyond what is set forth on the product label 100 on the product 110 associated with the brand owner 710 or the retailer 720. In general, the system includes the ingredient data management platform 20 that generates the first layer of information 1502, and that includes in combination, information from the product label 100 and attributes 124 determined from the information from the product label 100 but not listed on the product label 100. The system also includes the publisher module 1500 of the ingredient data management platform 20 that generates the second layer of information 1504. The publisher module 1500 populates the second layer of information 1504 with information from the first layer of information 1502. The publisher module 1500 is configured to receive changes to the second layer of information 1504 from the brand owner 710 or the retailer 720 and publish the second layer of information 1504 with the changes from the brand owner 710 or the retailer 720 to the portion of the electronic label 1510. The ingredient data management platform 20 is configured to accept changes from the brand owner 710 or the retailer 720 to the second layer of information 1504 and prevent changes to the first layer of information 1502 from the brand owner 710 or the retailer 720.

In many aspects, the publisher module 1500 may allow the brand owner 710 and the retailer 720 to make changes to the ingredient name and/or description presented by editing the name and/or description, deleting the name and/or description, or replacing the name and/or description entirely with some other content.

In FIG. 6A, the changes to the second layer of information 1504 may only add information relative to information 1520 in the first layer of information 1502. The added information 1522 in the second layer of information 1504 is, therefore, viewable in combination with the information 1520 that was pre-populated into the second layer of information 1504 from the first layer of information 1502 and viewable as the published layer of information 1508 through the electronic label 1510.

In FIG. 6B, the changes to the second layer of information 1504 only subtract information relative to information 1530 in the first layer of information 1502. Edited information 1532 in the second layer of information 1504 removes information at 1520 that was pre-populated into the second layer of information 1504 from the first layer of information 1502. The edited information 1522 from the second layer of information 1504 is viewable as the published layer of information 1508 through the electronic label 1510.

In FIG. 6C, the changes to the second layer of information 1504 include a combination of edits, deletions, additions, and other modifications relative to information 1540 in the first layer of information 1502. Edited information 1542 in the second layer of information 1504 removes from and adds to information 1520 that was pre-populated into the second layer of information 1504 from the first layer of information 1502. The edited information 1542 from the second layer of information 1504 is viewable as the published layer of information 1508 through the electronic label 1510. In FIGS. 6A, 6B, and 6C, any edited information 1522, 1532, and 1542 in the second layer of information 1504 only removes from (i.e., by hiding or obscuring from view) and/or adds to information 1520, 1530, and 1540 that was pre-populated into the second layer of information 1504 from the first layer of information 1502. The edited information 1522, 1532, and 1542 from the second layer of information 1504 in no way alters the information 1520 1530, and 1540 as it resides in the first layer of information 1502.

In the many aspects, the publisher module 1500 publishes the second layer of information 1504 with the changes from the retailer 720 or the brand owner 710 to the portion of the electronic label 1510 that hide a portion of the information from the first layer of information 1502 from view in the electronic label 1510.

In the many aspects, the publisher module 1500 publishes the second layer of information 1504 with the changes from the retailer 720 or the brand owner 710 to the portion of the electronic label 1510 that include additional information relative to the information from the first layer of information 1502.

In the many aspects, the publisher module 1500 publishes the second layer of information 1504 with the changes from the retailer 720 or the brand owner 710 to the portion of the electronic label 1510 that hide a portion of the information from the first layer of information 1502 from view in the electronic label 1510 and that include additional information relative to the information from the first layer of information 1502.

In the many aspects, the publisher module 1500 is configured to publish immediately to the electronic label 1510, the second layer of information 1504, at a request of the retailer 720 or the brand owner 710.

In the many aspects, the publisher module 1500 is configured to publish to the electronic label 1510, the second layer of information 1504, when the retailer 720 or the brand owner 710 obtains a pre-determined number of approvals.

In the many aspects, the ingredient data management platform 20 generates the first layer of information 1502 based on multiple product labels 100 including information common to each of the multiple product labels 100. The publisher module 1500 is configured to receive changes to the second layer of information 1504 about one of the multiple product labels 100 from the retailer 720 or the brand owner 710. The publisher module 1500 publishes the second layer of information 1504 with the changes to all of the multiple product labels 100 based on the changes associated with the one of the multiple product labels 100.

In the many aspects, the publisher module 1500 of the ingredient data management platform 20 is configured to receive the changes to the second layer of information 1504 and configured to track and maintain a ledger of the changes from which a previous version of the second layer of information 1504 is accessible.

In the many aspects, the portion of the electronic label 1510 is configured to provide information related to a SmartLabel® brand label.

In the many aspects, the electronic label 1510 is accessible from a mobile device that is selected from a group consisting of at least one of a smartphone, a handheld scanner, a kiosk by the consumer, a wearable, and a computer.

In the many aspects, the portion of the electronic label 1510 is also configured to display serving size information. The serving size information is selected from a group consisting of at least one of a reference amount customarily consumed, a user-adjustable weight per serving, one hundred grams of weight per serving, and a recommended daily allowance.

In the many aspects, one of the products 110 having a product label 100 is selected from a group consisting of at least one of foods, beverages, consumer packaged goods, personal items, pet care products, clothing, toys for children, lawn care products, window stickers for vehicles, heating, ventilation, air conditioning products, and bedding products.

In many aspects, the publisher module 1500 may allow the brand owner 710 or the retailer 720 to tell a story behind a product such as a farm that grows the product, a family business, and ingredients with a long tradition, famous ingredients or a location, an expensive or rare component, an exclusive deal, and the like. Although embodiments herein refer to descriptions of ingredients, any content in any portion of the electronic label 1510 may be treated similarly. As an example, claims made on the product packaging, such as "gluten-free" and others may be altered, edited, explained further, and otherwise changed and made available through the electronic label 1510 so the brand owner 710 or the retailer 720 may standardize the claim, replace the detected claim with a corresponding company-specific claim, substitute the product packaging claim (or standardize a company-specific claim) with a product-specific version of the claim, and make another change to the claim.

In many aspects, many or all of these changes may be tracked, kept in a ledger or other auditable files, logs, change records, or the like that are associated with the second layer of information 1504. In many aspects, by tracking changes, such as through the ingredient data platform that may treat each change as an event that can be recreated, each edited version of an electronic label 1510 may be associated with a state of the electronic label 1510, such as default (e.g., using only the base ingredient descriptions), edited pending (changed but not yet published), and published (a version of the electronic label 1510 that is made available generally to the public, but at least to other users of the ingredient data management platform 20. Additional internal states, such as those within the "edited pending" state may be tracked as well, including, for example, edited pending approval, reviewed, approved, not approved, and other states. Previous version states can be easily selected and then immediately published through the electronic label 1510 to remove any unwanted change, version, or modification or to generate that version for later internal or external review, judicial proceedings, administrative review, or other review.

Through change tracking and the like, the publisher module 1500 may implement an off-package content management system for ingredients, claims, product images, packaging images, packaging information, and the like with the ingredient data management platform 20 that facilitates and maintains a ledger of changes and edits. This ledger may be structured to permit later audit from the brand owner 710, the retailer 720, or other applicable entities. The tracking of changes may facilitate managing each piece of information associated with the product 110 throughout its product lifetime so that one change through the publisher module 1500 can force a change throughout the entire portfolio of products 110. However, the change may only be made to the second layer of information 1504 and not directly to the first layer of information 1502 to maintain the integrity of what populates the first layer of information 1502 (e.g., the transformations performed by the ingredient data management platform 20 on the constituent information 122 on the product labels 100).

In many aspects, the publisher module 1500 may be configured to introduce a hierarchy in creating, managing, and determining the final portions of information and what layers of information those portions are from for ultimate publication to the user through the electronic label 1510. In many examples, the first layer of information 1502 and the information contained therein that is determined by the ingredient data management platform 20 may be disposed at a lowest (e.g., a default) level of a hierarchy. In this arrangement, all (or most) of the information at this lowest (default) level of the hierarchy may be used if no other description or change to the description is available. As such, the information from the first layer of information 1502 may be duplicated, pushed, or otherwise accepted into and used to pre-fill the second layer of information 1504. Pre-filling the second layer of information 1504, in effect, creates a new information branch that facilitates changes to the information that is required to be done in the second layer of information 1504 and specifically ensures the integrity and therefore avoids all changes to the first layer of information 1502 by the brand owner 710 or the retailer 720.

In many aspects, ingredient descriptions from an ingredient description library or other collection of content from the brand owner 710 or the retailer 720 may be next on the hierarchy and when available, replace ingredients or other information initially populated into the second layer of information 1504. In this situation, the pre-existing company ingredient description may be presented instead of the default description (e.g., lower in the hierarchy) from the first layer of information 1502. In one example, this can be a wholesale replacement of text. In another example, the wording can be edited and changed on a word-by-word basis. In a further example, some portions can be edited while others can have wholesale replacement. In an additional example, whole new sections and descriptions can be added to insert information not contemplated in the first layer of information 1502. In the many examples, the changes from the brand owner 710 or the retailer 720 to the second layer of information 1504 that edit (in at least part or in whole) the information pre-filled from the first layer of information 1502 and those changes can be performed on a portfolio-wide basis and therefore may be reflected in any electronic label 1510 that displays information about that product 110. This means that when the brand owners 710 or the retailers 720 have an ingredient that is found in many products 110 across their portfolio, the publisher module 1500 can be configured to make and accept a change to one instance of that ingredient or other information as it related to one of the product labels 100 but otherwise accept that change as a change that is global (or partially global with predefined rules) across the portfolio. In many aspects, certain company ingredient descriptions and/or base ingredient descriptions may be marked so that they have precedence over other descriptions of the same ingredient. This may be based on company policy as well as based on other aspects and may be detectable through metadata associated with the one or more ingredients, products 110, retail brand offerings, markets in countries or regions, and the like. In many aspects, each level in a hierarchy may include the relevant description, a link to the relevant description, or include additional information.

In many aspects, an order of ingredient descriptions or other content in the hierarchy may impact an ability of the brand owner 710 or the retailer 720 to make bulk changes to information viewable through the electronic label 1510. Making a change to a company ingredient description may result in conformance with the new company description when the company description has precedence over what the ingredient data management platform 20 has prepopulated from recognizing and determining information from the many product labels 100.

In many aspects, changes to an ingredient description or other information, such as a description of an ingredient in a company-specific library, may impact the electronic label 1510 for some but not all products 110 that the company offers that include the specific ingredient. This may, for example, be due to the brand owner 710 or the retailer 720 editing a company ingredient description for a particular product's electronic label 1510. In many aspects, methods, and systems for automatically auditing an impact of a portfolio-wide ingredient description change may facilitate automatically identifying products 110 that include the ingredient but whose electronic label 1510 is impacted and is not impacted by the description change. All products 110, such as those products that have been processed with the ingredient data management platform 20, with a given ingredient or other constituent information 122 may be identified for a given company, brand, retail label, region offering, or the like through an ingredient cross-reference function, the cross-product interaction analysis 260, and the like that may facilitate matching master attributes 124 to many applicable products 110 given their common ingredients and other constituent information 122.

In many aspects, a further automated process may review metadata for each of the many products 110 identified including a given ingredient or other constituent information 122 (e.g., information that describes which ingredient description is used in an electronic label 1510 for a product 110) and identifies instances in the many products 110 that use a different ingredient description than, for example, the company ingredient descriptions. In this way, a list of products 110 that include the ingredient or other constituent information 122 but whose electronic label 1510 may not reflect a desired change made to a company ingredient description can be generated for processing. For each of the brand owners 710 or the retailers 720, one or more ingredient description validation processes can be established to manage and to limit (or expand) the portfolio-wide changes and updates. For the example description sources in the many embodiments, the electronic label 1510 for a product 110 may not be impacted by a change to a company ingredient description of the electronic label 1510 that is configured to use the base ingredient description, an edited ingredient description, or if the description for the ingredient is not being shown in at least a published version of the electronic label 1510. Likewise, if a base ingredient description is updated and either the company ingredient description or the edited ingredient description for a given product 110 electronic label 1510 is used, the electronic label 1510 may be flagged as not being impacted by the update.

In many aspects, the ingredient data management platform 20 may integrate with company workflows, such as workflows for confirming information in an electronic label 1510 prior to the electronic label 1510 being published, updates to company-specific ingredient descriptions, product information, and the like. The ingredient data management platform 20 may be configured to obtain confirmation of one or more data elements that may be accessible (or accessible with pre-determined permissions) to users at the brand owner 710, the retailer 720, or other applicable entities with specific roles, such as editor, compliance officers, brand managers, and other roles that may participate in a workflow for publishing the electronic labels 1510 for the many products 110. In many aspects, each of the many users may be assigned a specific role and therefore may be provided access to a role-specific confirmation data element. In many aspects, the ingredient data management platform 20 may interface with external systems that role-specific users use to indicate confirmation of portions of the electronic label 1510. The user may indicate, such as by replying to an email, message, notification, system communication, or the like from the ingredient data management platform 20 with CONFIRMED (or a suitable confirmatory statement) in the reply email that the electronic label 1510 is confirmed. The ingredient data management platform 20 may update the role-specific confirmation data element accordingly and publish the same through the electronic labels 1510. Other forms of information exchange, confirmation changes, approved results, and the like between the ingredient data management platform 20 and external systems may also be used in this way other than email such as electronic messaging, web browser interfacing, APIs, and the like.

In many aspects, the brand user interface 550, the retailer user interface 590, and other applicable interfaces of the ingredient data management platform 20 may include a package image section and a text section of the many products 110. The image section may include a plurality of thumbnails of packaging views of the many products 110, wherein a selected thumbnail is enlarged in the product 110 image section. The product 110 image section may also provide user interface capabilities such as zoom, pan, and the like. In many aspects, the image section may be view-only, whereas the text section may support editing, deleting, and entering text. The text section may include a plurality of panels, where only one of the panels is visible at a time. Each panel may present a group of associated text entries, such as ingredients, claims, allergens, nutritional information, and the like. A user may select a text panel independently of an image thumbnail. In many aspects, when a user selects a text panel, such as ingredients, a corresponding enlarged packaging image of one of the products 110 that includes these may be responsively displayed in the image section. As the user navigates within the text section, relevant portions of the enlarged image in the image section may be highlighted. In many examples, when a user selects an ingredient description for editing, the corresponding ingredient text in the image section may be highlighted in its greater context.

The text section may include a plurality of tabs, each tab associated with a panel of associated text entries. A user may select a tab, review, and edit contents of the tab, and select another tab, and perform other actions. In many aspects, when a user selects, for example, an ingredient in an ingredient tab of the text section, a context portion of the user interface may automatically update to reflect context for the selected ingredient. Context in this example, may include an indication of the active source of the description, such as a description directly from the product labels 100, description determined (e.g., transformed) from the product labels 100, a company-specific description, an edited ingredient description and the like. Other context may include whether there is corresponding information in other tabs, such as allergen information, claims, nutritional content, and other information to be reviewed if the description of the ingredient is changed. Yet other information may include product recipe information, such as an amount of the ingredient in a unit of the product 110, and other information.

In many aspects, the ingredient data management platform 20 may include ingestion, processing, and export modules that may work collaboratively to provide the services of the ingredient data management platform 20 to third parties, such as product manufacturers and other third parties. The methods and systems described herein for generating and standardizing content, such as ingredient descriptions, claims, allergens, and other content with the ingredient data management platform 20 for the electronic label 1510, may also be made available for external use, such as through an export module of the publishing system and/or through an API and the like that an external system may use to access the publisher module 1500.

In many aspects, the ingredient data management platform 20 may be configured so that during ingestion and/or processing of ingredients for configuring the electronic label 1510 for the products 110, certain information may be automatically populated into its proper destination and corresponding data fields in the electronic label 1510 for the corresponding products 110. When viewed through the various user interfaces of the ingredient data management platform 20, the ingested information may appear in a corresponding tab of text information, such as nutrition attributes may appear in a nutrition tab and allergen attributes may appear in an allergen tab. The populated information may be linked to the corresponding ingredient so that further processing of the ingredient may result in the corresponding attribute value automatically being adjusted. In an example, a soy ingredient may be processed with the attribution facility that may generate information for allergens (e.g., a soy allergy warning), claims (e.g., "contains soy"), and the like. When users of the publisher module 1500 adjust the soy ingredient (e.g., by reducing an amount of soy and/or removing soy entirely, and in other ways), the adjusted ingredient list may be processed through the ingredient data management platform 20 and may be automatically updated in the electronic label 1510 for the products 110. Any changes to the information may be viewable upon accessing the corresponding tab in the text window of the ingredient data management platform 20 when the affected product 110 is accessed. As an example, if a soy ingredient is removed, soy warning claims and other claims may be removed from the electronic label 1510. In many aspects, each change, such as these automated changes may be tracked with a change tracking system that enables determining when changes occur to the electronic label 1510 data set and who caused the changes.

In many aspects, the ingredient data management platform 20 may include a harmonizer module 1600 that facilitates multiple overlapping layers of information combinable into the electronic label 1510 based on a range of criteria including, without limitation, a role of a user viewing the electronic label 1510, one or more states of the electronic label 1510, change status of individual pieces of information in the layers of information that combine to publish in the electronic label 1510 and in other locations. In many aspects, in addition to facilitating criteria-based views of an electronic label 1510, the harmonizer module 1600 may facilitate harmonizing a plurality of layers of information 1602 that may be combinable into the electronic label 1510 including the first layer of information 1502 and the second layer of information 1504 to produce a published layer of information 1604 having published information 1608. Other layers of information from the plurality of layers of information 1602 can be populated from various sources such as supply chain information 1610 (e.g., ingredient sourcing, and the like), content ownership information 1612, third-party data 1614 (e.g., standards organizations, such as government, industry, and the like), regional rules and regulations 1618, and others.

In many aspects, the harmonizer module 1600 may include information from a range of sources, such as those noted above and that information may be harmonized into individual published layers of information 1604 viewable through the electronic label 1510. Each of the sources can be a layer of information. With the publisher module 1500, a new layer of information can be created from an existing layer of information to make edits, changes, and other modifications to that information in the new layer while maintaining the integrity of (e.g., preventing changes) the existing layer of information. Each of the layers of information can also have information branches. Each version of each layer of information can be a node on the branch. The harmonizer module 1600 can assemble each layer of information for view depending on the needs of the request but can also be used in tandem with the publisher module 1500 to create new branches such that later versions can become additional versions on those branches.

In many aspects, the many sources for the harmonizer module 1600 may include a master source such as the information found in the first layer of information 1502 provided by the ingredient data management platform 20, a brand source that may be described herein as a brand or company-specific library providing information that is specific to the brand for each product, Global Data Synchronization Network (GDSN) of interoperable data pools and registry, digital asset management systems (DAMs) and the like for images of products and the like, ingredient supply chain data that may be sourced from a plurality of participants in an ingredient supply chain, product 110 processing facilities/factories, sustainability programs, regionalization of products 110 (e.g., local sourcing of some ingredients for products 110 sold in certain regions), and others.

In many aspects, harmonizing such data may include determining multiple sources of data for a common attribute, such as industry, brand, and other sources followed by ordering the sources according to a set of harmonizing rules 1630 so that conflicting data is resolved for a given view of the electronic label 1510. As an example, a supply chain provider for an ingredient according to brand information may be different than a regional provider for a geographic region. If, in these examples, harmonizing rules 1630 indicate that regional providers should be prioritized over brand providers, then a view of an electronic label 1510 for a product 110 being provided in a geographic region would be the regional provider. If there is no regional provider that corresponds to a region attribute of a view of the electronic label 1510, then the brand provider would be used. In further examples, an allergen attribute may automatically adjust regionally. A soy ingredient in the U.S. may invoke an allergen attribute associated with a soy allergy claim. However, that same ingredient in Vietnam may not invoke an allergen attribute. Therefore, the publisher layer of information 1604 for the electronic label 1510 for the product 110 in the U.S. may include the allergen warning. But an electronic label 1510 for the same product 110 in Vietnam may not include the allergen warning.

In many aspects, the first layer of information 1502 can be associated with a first information branch 1700 whose access rights are limited and changes are restricted and therefore can be considered the master branch. The initial version of the first layer of information 1502 can be memorialized in a first information branch node A 1702. Later version of the master branch information (e.g., later versions of the first layer of information 1502) can be memorialized in later first information branch node B 1704 (i.e., branch 1 node B 1704), branch one node C 1708, branch one node D 1710, branch one node E 1712, and others. The publisher module 1500 may be used to edit information found in the master branch (e.g., branch one) but all of those edits and any changes relative to the master branch are memorialized in the second information branch 1720 at node A 1722. Each of the nodes of the second branch can be versions of the information that can be directed to the electronic label 1510 for viewing and therefore can be referred to as the Smart-Label® Branch in some examples. The second information branch can include subsequent versions and those can be memorialized at node B 1704 of the second information branch 1720 (e.g., branch two node B 1724), branch two node C 1728, and others. A new node 1730 can be formed from the latest version of information in the first information branch 1700 and the second information branch 1720. The node 1730 may contain information 1732 and the branch may contain addition nodes 1734 from the ingredient data management platform 20 and from the brand owner 710 or the retailer 720.

In many aspects, the harmonizer module 1600 may maintain the integrity of the first information branch 1700 and versions of the first layer of information 1502 associated with the nodes 1702, 1704, 1708, 1710, and 1712 so that when anyone makes use of information from the first layer of information 1502, the same information is available for the same ingredients and other information from on the product labels 100. The publisher module 1500, therefore, allows the brand owner 710 or the retailer 720 to edit, augment, hide, flourish, or otherwise change any or all information from the first information branch 1700 by requiring all of those changes to occur in the second information branch 1702. The publisher module 1500 can be used to make these changes to any of the branches of information when there is a need to separate and track changes to information and the initial source of information to which those changes can be made.

In many aspects, the harmonizer module 1600 may further combine the plurality of layers of information 1602 including information 1640 from a third layer of information 1642, information 1650 from a fourth layer of information 1652, information 1660 from a shift leader of information 1662, and more or less as needed to produce the published information 1670 on the public layer of information 1604 viewable with the electronic label 1510 through various devices and interfaces. In many examples, the initial version of the third layer of information 1642 can be memorialized in a third information branch 1740 at node A 1742. In many examples, the third information branch 1740 is associated with information from a Global Data Synchronization Network (GDSN) of product information. Later versions of the third branch information (e.g., later versions of the third layer of information 1642) can be memorialized in later third information branch node B 1744 (e.g., branch three node B 1744), branch three node C 1748, and the like.

In many examples, the initial version of the fourth layer of information 1652 can be memorialized in a fourth information branch 1750 at node A 1752. In many examples, the fourth information branch 1750 is associated with information from a Product Information Management (PIM) system. Later versions of the fourth branch information (e.g., later versions of the fourth layer of information 1652) can be memorialized in later fourth information branch node B 1752 (e.g., branch four node B 1752), branch three node C 1754, and the like. A new node 1760 can be formed from the latest version of information the second information branch 1720 and the fourth information branch 1750. In this example, the node 1760 may contain information 1762 and the branch may contain addition nodes 1764 from the ingredient data management platform 20 through the publisher module 1500, from the brand owner 710 or the retailer 720, and information from a PIM system associated with the fourth branch of information 1750 from the brand owner 710 or the retailer 720.

In many aspects, the harmonizer module 1600 can be configured to accept multiple branches of data from many different sources allowing for the merger of one or more branches into new branches that can each serve certain purposes such as different stakeholders, regions, markets, languages, and other purposes but also permit customization of any branch while leaving the sources of information (e.g., one or more of the branches being combined) as unmodified for combination with other branches for other purposes.

In the many aspects, the ingredient data management platform 20 may harmonize a portion of the electronic label 1510 for view by a user that contains additional information beyond what is set forth on the product labels 100 of the products associated with the retailer 720 or the brand owner 710. The ingredient data management platform 20 generates the first layer of information 1502 that includes in combination, information from the product labels 100 and attributes determined from the information from the product labels 100 but not listed on the product labels 100. The ingredient data management platform 20 also includes a harmonizer module 1600 that generates a second layer of information 1504, that populates the second layer of information 1504 with information from the first layer of information 1502, that is configured to receive at least a third layer of information 1642 including information about the products 110 associated with the product labels 100, and that publishes the second layer of information 1504 in cooperation with the third layer of information 1642 including a portion of the third layer information 1642 that is additional relative to the second layer of information 1504. The harmonizer module 1600 is configured to prevent changes to the first layer of information 1502 from at least one of the user, the retailer 720, and the brand owner 710.

In the many aspects, the harmonizer module 1600 is configured to receive a plurality of layers of information 1602 including information about the products 110 associated with the product labels 100. The harmonizer module 1600 is configured to publish the second layer of information 1504 in cooperation with the plurality of layers of information 1602 including a portion of the plurality of layers of information 1602 that is additional relative to the second layer of information 1504 and a portion of the plurality of layers of information 1602 that replaces a portion of the second layer of information 1504.

In the many aspects, a portion of the plurality of layers of information 1602 is configured to replace a portion of the second layer of information 1504.

In the many aspects, the ingredient data management platform 20 further includes the publisher module 1500 that generates an additional layer of information, that populates the additional layer of information with information from the third layer of information 1642, that is configured to receive changes to the additional layer of information from the retailer 720 or the brand owner 710 associated with the populated information 1640 from the third layer of information 1642, and that publishes the additional layer of information with the changes from the retailer 720 or the brand owner 710 to a portion of the electronic label 1510. The publisher module 1500 is configured to accept changes from the retailer 720 or the brand owner 710 to the additional layer of information and prevent changes to the third layer of information 1642 from the retailer 720 or the brand owner 710.

In the many aspects, the publisher module 1500 of the ingredient data management platform 20 is configured to receive the changes to the additional layer of information and configured to track and maintain a ledger of the changes from which a previous version of the additional layer of information is accessible.

In the many aspects, the ingredient data management platform 20 generates a first layer of information 1502 that includes in combination, information from the product labels 100 and attributes determined from the information from the product labels 100 but not listed on the product labels 100. The ingredient data management platform 20 includes the publisher module 1500 that generates the second layer of information 1504, that populates the second layer of information 1504 with information from the first layer of information 1502, and that is configured to receive changes to the second layer of information 1504 from the retailer or the brand owner associated with the populated information from the first layer of information 1502. The ingredient data management platform 20 also includes the harmonizer module 1600. The harmonizer module 1600 may receive at least the third layer of information 1642 including information about the products 110 associated with the product labels 100, and publish the second layer of information 1504 in cooperation with the third layer of information 1642 including a portion of the third layer information 1642 that is additional relative to the second layer of information 1504 and the second layer of information 1504 includes the changes from the retailer 720 or the brand owner 710 to the portion of the electronic label 1510. The publisher module 1500 may accept changes from the retailer 720 or the brand owner 710 to the second layer of information 1504 and prevent changes to the first layer of information 1502 from the retailer 720 or the brand owner 710.

In the many aspects, the harmonizer module 1600 is configured to receive a plurality of layers of information 1602 including information about the products 110 associated with the product labels 100. The harmonizer module 1600 is configured to publish the second layer of information 1504 in cooperation with the plurality of layers of information 1602 including a portion of the plurality of layers of information 1602 that is additional relative to the second layer of information 1504 and a portion of the plurality of layers of information 1602 that replaces a portion of the second layer of information 1504.

In many aspects of the present disclosure, the ingredient data management platform can be configured to permit checking of compliance with regulatory rules (or other rulemaking bodies) governing what can be included on the product labels 100 of the consumer products 110. In the many aspects, the ingredient data management platform 20 may store compliance information regarding the regulatory rules in a database or other various searchable storage systems. The brand owner, the retailers, or both, may use the brand user interface 550, the retailer user interface 590, suitable mobile applications or services that may permit one or more compliance checks to be conducted on one or more of the consumer products 110 related to the brand owner, the retailer, or both. With reference to FIGS. 1-4, the ingredient data management platform 20 may store the compliance information related to one or more ingredients based on information provided by regulatory bodies of sovereign government authorities like the US Food and Drug Administration (FDA) where the jurisdiction is the United State of America or the European Food Safety Authority (FSA) where the jurisdiction is the European Union. In further examples, the compliance information may be from the Japanese Ministry of Health, Labor, and Welfare through the Japanese Pharmaceutical and Food Safety Bureau where the jurisdiction is Japan. The compliance information may be from Health Canada through Canada's Food and Drugs Act and Regulations where the jurisdiction is Canada. The compliance information may be from the Brazilian Health Regulatory Agency where the jurisdiction is the Federative Republic of Brazil. The compliance information may be from the Ministry of Food and Drug Safety where the jurisdiction is the Republic of Korea. In further examples, the compliance information may be non-government entities and may be agnostic to jurisdiction. In further examples, the compliance information may be from a private entity who provides one or more accreditations related to consumer products such as accreditations related to organic, humane, and dietary restrictions for consumer products and their product labels. These private entities may also be agnostic to jurisdiction.

In the many aspects, the compliance information may be stored in the same database or other storage architecture that may be the same or associated with storing of the images of product labels 100 and the many base attributes 120 and master attributes 124 associated with the product label 100. It will be appreciated in light of the disclosure that the database or other storage architecture (local or in the cloud) may be located external to the ingredient data management platform 20 such as at a remote location and connected to the ingredient data management platform 20 through one or more communications networks. In the many aspects, the compliance information may be from the FDA and may be accessible, reviewable, and available for update through the retailer FDA compliance check layer 670 (FIG. 1).

In the many aspects, the ingredient data management platform 20 may be configured to receive a request from an external system about one or more of the consumer products using one or more of the base attributes 120. Upon receiving such request, the ingredient data management platform 20 may retrieve at least a portion of one or more of the images of the product labels 100 from the database based on the base attributes 120 associated with the request and the compliance information. The ingredient data management platform 20 may then transmit contents of the product label 100 of the consumer product designated under one or more of the base attributes 120 associated with the request to the user interface of the brand owner or retailer along with details of non-compliance. The user interface may be the retailer user interface 590 or the brand user interface 550. The user interface may be available through the retailer API 580 or the brand API 560. By way of the above examples, details of non-compliance, in many examples, may include information about the piece of constituent information identified as being impermissible according to the applicable compliance information and related information. In the many aspects, the product label 100 may also include pieces of constituent information that may be identified as being subject to a recall, a ban, or an investigation by one or more of the regulations of the sovereign government authorities like the US Food and Drug Administration.

In the many aspects, the ingredient data management platform 20 may include master attributes 124 that detail information that may not be explicitly stated in the text and graphics of the product label 100. The ingredient data management platform 20 may derive information from the text and graphics of the product label 100 that detail information that may not be explicitly stated in the text and graphics of the product label 100. In the many aspects, the ingredient data management platform 20 may store compliance information related to different jurisdictions and regulatory authorities and be configured to provide compliance information and checking against the compliance information for all jurisdictions.

In many examples, Yellow 5 may also be labeled as "tartrazine" or "acid yellow 23" and is a prohibited ingredient in Norway and Austria. A retailer in Norway may, for example, present through the retailer user interface 590, the product label 100 of one or consumer products 110 to the ingredient management platform 20 to check for compliance with the Royal Norwegian Ministry of Agriculture. The ingredient management platform 20, upon detecting "tartrazine" as a constituent ingredient of the consumer product, may assign "tartrazine" as base attribute 120 and "contains Yellow 5" as master attribute 124. Further, the ingredient management platform 20 may retrieve related compliance information. Upon determining that any food product associated with the "contains Yellow 5" master attribute 124 is prohibited in Norway, the ingredient management platform 20 may present such information through the retailer API 580 or the retailer user interface 590 to the retailer. The ingredient management platform 20 may also present such information through the brand API 560 or the brand user interface 550 to the brand owner.

In many examples, a beverage brand owner in the USA may present a beverage containing "crude *stevia* extract" as a sweetener and "yellow 5" as a coloring agent to the brand user interface 550 of the ingredient management platform 20. Upon determining that the beverage with master attribute 124 as "artificial sweetener" contains a base attribute 120 of "crude *stevia* extract," which is prohibited by FDA and may indicate that the beverage is non-compliant with FDA regulations for sale in the United States of America. The brand owner may transmit a request to the ingredient management platform 20 about the base attributes 120 identified as being impermissible and the ingredient management platform 20 may indicate to the brand owner that the use of "crude *stevia* extract" as sweetener makes the beverage non-compliant in the United States of America.

Figure 7:
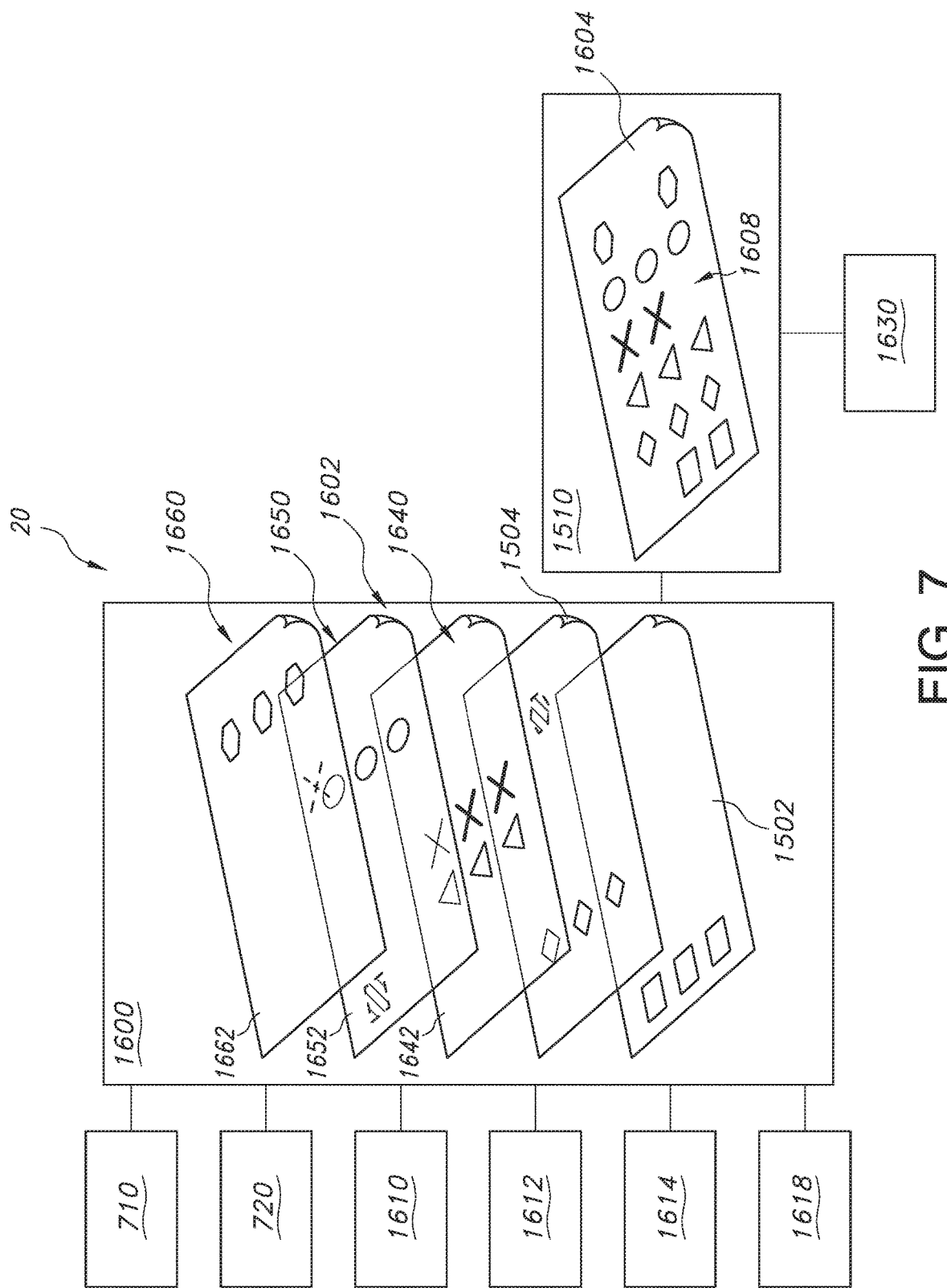
FIG. 7 is a diagram of an exemplary harmonizer module in the ingredient data management platform that includes many layers of information combined into a published layer of information viewable in an electronic view in accordance with the present disclosure.
Figure 8:
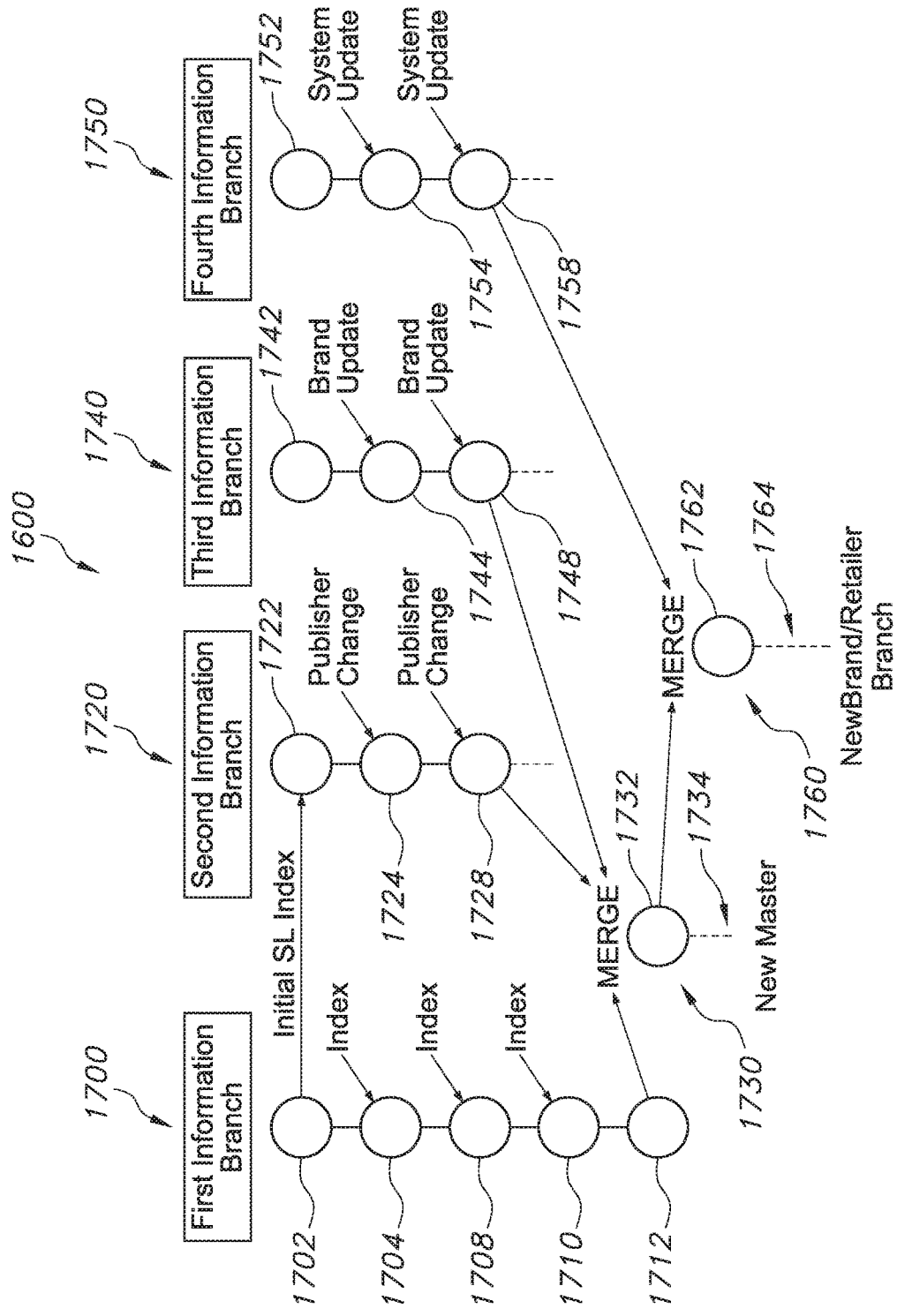
FIG. 8 is a diagram of an exemplary harmonizer module in the ingredient data management platform that includes many layers of information depicted as information branches with subsequent versions of the information being additional nodes on the information branches in accordance with the present disclosure.

In the many aspects, the ingredient data management platform 20 may further permit the retailers or brand owners to publish revised information on or about the product labels 100 once the product labels 100 have received necessary adjustments related to the non-compliant pieces of constituent information set forth in the text and graphics on the product label of the consumer product. In the many aspects, the retailers or the brand owners may publish such information through the retailer user interface 590 or brand user interface 550 of the ingredient data management platform 20. With reference to FIGS. 5, 6 and 7, the ingredient data management platform 20 may use the publisher module 1500 to generate and populate the first layer of information 1502 including information directly found on the product labels 100 and information not otherwise found on but determined or derived from the product labels 100 by the ingredient data management platform 20. The publisher module 1500 may also generate the second layer of information 1504 that may act as an editing layer for brand owners or the retailers to amend, edit, re-arrange, delete, and modify any information without affecting the first layer of information 1502. The ingredient data management platform 20 thus may allow the brand owners or the retailers to make adjustments related to any non-compliant pieces of constituent information depicted in the text and graphics of the product labels and then update a representation of the label view in the electronic label 1510 (or other electronic or smart label) without the need to update, reprint, or push any changes or updates out to the actual print packaging and labels 100 for the consumer products.

In the many aspects, once the brand owner or the retailer has replaced the non-compliant constituent "crude *stevia* extract" with another sweetener, for example, "saccharin," such information may be updated to the second layer of information 1504 by the publisher module 1500 without affecting the first layer of information 1502. The ingredient management platform 20 may, therefore, improve the ability for the retailer and the brand owner to almost immediately update the representation of the label view in the electronic label 1510 but also maintain an original version with edits (i.e., the first layer of information 1502) in tandem with a second layer memorializing the changes.

In the many aspects, the ingredient data management platform may allow for retrieving of related consumer products designated under one or more of master attributes that are different than the one or more master attributes. The ingredient data management platform 20 may allow a consumer to use the consumer user interface 450 to explore and automatically discover related products that may not include some ingredient. With reference to FIGS. 1-4, the ingredient data management platform 20 may include an analytics layer 250 and a market and product positioning analysis layer 270 that may automatically determine the context and relatedness of one or more consumer products relative to other products similarly assigned one or more base attributes 120 or the master attributes 124. In many aspects, the market and product positioning analysis layer 270 may facilitate the ingredient data management platform 20 automatically suggesting related products for a user who, for example, may not be interested in buying a product containing a specific ingredient (i.e., one or more pieces of the constituent information).

The ingredient data management platform 20 may be configured to receive a request from an external system about one or more of the consumer products using one or more of the master attributes 124. Upon receiving such request, the ingredient data management platform 20 may retrieve at least a portion of one or more of the images of the product labels 100 from the database or other storage system based on the master attributes 124 associated with the request. Additionally, the ingredient data management platform 20 may retrieve at least a portion of one or more images of product labels 100 associated with related consumer products from the database or other storage system but not otherwise designated under (or different from) one or more of the master attributes 124 associated with the requested consumer product. the ingredient data management platform 20 may then transmit contents of the label view to the consumer user interface 450 which may display to the consumer the master attributes 124 associated with the requested consumer product, along with at least a portion of product labels 100 of the consumer products 110 designated under the master attributes 124 associated with the request and at least a portion of product labels 100 associated with the related consumer products 110. Further, the ingredient data management platform 20 may receive one or more additional requests from the consumer about the related consumer product and may be configured to provide details on the constituent information 122 associated with the base attributes 120 that are associated with the related product. It will be understood that platform 20 may present the consumer with information not explicitly stated in the text and graphics of the product label 100 and may be derived through the master attributes 124 associated with the product label 100.

In many examples, a consumer who may be allergic to Yellow 5 may use the ingredient data management platform 20 to identify other related products which do not contain Yellow 5 as an ingredient. The consumer may, for example, present through the consumer user interface 450 a cereal product label to the ingredient management platform 20 to check for the presence of Yellow 5. The ingredient management platform 20, upon detecting "tartrazine" as a piece of constituent information of the cereal food product, and determining "contains Yellow 5" as master attribute 124 may flag such presence of Yellow 5 to the consumer. Further, the ingredient management platform 20 may retrieve related cereal food products which do not have Yellow 5 as an ingredient, say cereal food products containing "curcumin", and present such products through the consumer user interface 450 to the consumer or through other interfaces. The consumer may request further information from the ingredient data management platform 20 about the related cereal product. The ingredient management platform 20 may also highlight to the consumer that the presence of "curcumin" as the constituent and absence of "contains yellow 5" master attribute in the related cereal food product.

In many examples, a consumer who may be diabetic may use the consumer user interface 450 on the ingredient data management platform 20 to explore the product base of "sweetener" products and conduct searches based on different master attributes 124 and base attributes 120. The consumer may, for example, present through the consumer user interface 450 a snack bar product label to the ingredient management platform 20 to check for the sweetener used in the product. The ingredient management platform 20, upon detecting "sucrose" in the snack bar may indicate such presence to the consumer and allow the consumer to explore other snacks, energy or granola bar products with alternate sweetener ingredients. The ingredient management platform 20 may, for example, allow the consumer to adjust the base attribute 120 to "artificial sweetener" using the consumer user interface 450 and search platform 20 to identify snack bar products containing different artificial sweeteners like "sucralose", "saccharin" and *stevia*. The ingredient data management platform 20 may thus allow the consumer to explore and pick a snack bar product based on her preference of sweetener in the bar.

In many aspects, the ingredient data management platform 20 may provide hybrid data offerings combining product information data with other analytic data about the requested and related products. In exemplary embodiments, the ingredient data management platform 20 may allow a retailer to use retailer user interface 590 or the retailer API 580 to explore one or more different product categories such as based on ingredients, claims or other pieces of constituent information. With reference to FIGS. 1-4, the ingredient data management platform 20 includes the analytics layer 250 and the cross-product interaction analysis layer 260 that may interact with other layers 200 to determine patterns and other analytic data about one or more of the consumer products requested by the retailer or the brand owner and other products in one or more related product categories. In many aspects, the ingredient data management platform 20 may, for example, present to the retailer through the retailer user interface 590 sales history of a requested consumer product and one or more sales comparisons with one or more related products. The ingredient data management platform 20 may be adapted to receive one or more requests from an external system about one or more of the consumer products using one or more of the master attributes 124. Upon receiving such request, the ingredient data management platform 20 may retrieve at least a portion of one or more of the images of the product labels 100 from the database based on the master attributes 124 associated with the request along with additional analytic data including the sales history, sales comparisons, etc. of the requested product. Additionally, the ingredient data management platform 20 may retrieve and present to the retailer or the brand owner one or more related products and similar analytic data including sales history data of such products.

In the many aspects, a retailer or a brand owner looking to manage the retail shelf space may, for example, use the ingredient data management platform 20 to explore one or more sales comparison trends of different GMO labeled grocery food products. Accordingly, a retailer or a brand owner may present through the retailer user interface 590 or the brand user interface 550 the product label 100 of a dairy product to the ingredient management platform 20 to identify whether the product is GMO or non-GMO and to understand its sales history. The ingredient management platform 20 can then indicate to the retailer or the brand owner that the dairy product is GMO labeled. The ingredient data management platform 20 may also retrieve from the database or other storage architecture and display to the retailer or the brand owner the sales history of the dairy product along with one or more of the sales comparisons with multiple other dairy products. The ingredient data management platform 20 may thus assist the retailer in determining the arrangement of various dairy products on the retail shelf.

While various aspects of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part, or in whole, through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In various aspects of the present disclosure, the processor may be part of a server, cloud server, client, network infrastructure, mobile computing platform, stationary computing platform, or other computing platforms. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon.

In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In certain aspects, the process may be a dual core processor, quad core processors, other chip-level multiprocessor and the like that combine two or more independent cores (called a die).

The methods and systems described herein may be deployed in part, or in whole, through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications networks. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with certain aspects of the present disclosure shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific aspects, method, and examples herein. The disclosure should therefore not be limited by the above-described aspects, methods, and examples, but by all disclosure within the scope and spirit of the disclosure.

What is claimed is:

1. An ingredient data system that ingests text and graphics of product labels associated with consumer products, the system comprising:
    a memory having instructions stored thereon; and
    at least one processor to execute the instructions to:
        process and parse the text and graphics of images of the product labels to identify at least one piece of constituent information from the text and graphics, associate one or more base attributes to each piece of the constituent information, and assign one or more of the base attributes to one or more master attributes that are descriptive of one of claims, ingredients, and nutritional information of one or more of the consumer products having the product labels;
        store in a database the images of one or more of the product labels, one or more of the base attributes, and one or more of the master attributes associated with each of the product labels of the consumer products;
        receive a first request about one or more of the consumer products having one or more of the master attributes;
        retrieve at least a portion of one of one or more of the images of the product labels from the database based on one or more of the master attributes and at least a portion of one or more images of product labels associated with related consumer products from a storage system having at least one master attribute different from one or more of the master attributes associated with the first request; and
        transmit via a network a representation of a label view to a user interface on a client computing device that displays one or more of the master attributes associated with the first request, at least a portion of each of the images of one or more of the product labels of the consumer products having one or more of the master attributes associated with the first request, and at least a portion of each of the images of one or more of the product labels associated with the related consumer products having the at least one master attribute different from one or more of the master attributes associated with the first request.

2. The system of claim 1, the at least one processor further executes the instructions to: receive a second request about one or more of the related consumer products; and transmit, in response to the second request, a representation of the label view to the user interface on the client computing device that displays at least a portion of the images of one or more of the product labels associated with the related consumer products and detail regarding constituent information set forth in or absent from one or more of the product labels associated with the related consumer products having one or more of the master attributes different from the one or more master attributes associated with the first request.

3. The system of claim 1, wherein one or more of the master attributes associated with the first request provide information displayed on the user interface by the client device that is different from the text and graphics of the product labels of the consumer products having the one or more master attributes.

4. The system of claim 2, wherein the user interface receives an adjustment of one or more of the base attributes, which were assigned to the one or more of the master attributes associated with the first request.

5. The system of claim 2, wherein the first and second request are from one of a retailer and a brand owner, and wherein the label view displays via the user interface at least a portion of each of the images of one or more of the product labels of the related consumer products and detail regarding constituent information set forth in or absent from one or more of the product labels associated with consumer products having one or more master attributes different from the one or more master attributes associated with the first request.

6. The system of claim 4, wherein the at least one processor further executes the instructions to:
    generate and populate a first layer of information that includes in combination, at least a portion of the images of one or more of the product labels, one or more of the base attributes associated with the constituent information identified in the text and graphics on one or more of the product labels, and one or more of the master attributes associated with the one or more of the base attributes;
    generate and populate a second layer of information with information from the first layer of information and receive changes to the second layer of information via the user interface; and
    transmit a representation of the label view to the user interface to display at least the second layer of information with the changes received from the user interface.

7. The system of claim 6, the at least one processor further executes the instructions to accept changes from the client computing device via the user interface to the second layer of information while preventing changes to the first layer of information.

8. The system of claim 7, the at least one processor further executes the instructions to transmit contents of the label view to the user interface to display in the label view at least a portion of the first layer of information and at least a portion of the second layer of information with the changes from the user interface that hide from display at least a portion of the first layer of information in the label view.

9. The system of claim 7, the at least one processor further executes the instructions to transmit contents of the label view to the user interface to display the second layer of information with the changes from the user interface that includes information in addition to the first layer of information.

10. The system of claim 7, the at least one processor further executes the instructions to receive a request from one of a brand owner and a retailer to publish immediately to the label view the second layer of information and transmit contents of the label view to the user interface to display the second layer of information with the changes received from the user interface.

11. The system of claim 7, wherein the label view is accessible via the user interface from the client device that is selected from a group consisting of at least one of a smartphone, a handheld scanner, a kiosk by the consumer, a wearable, and a computer.

12. The system of claim 1, wherein the consumer products having the product labels are selected from a group consisting of at least one of foods, beverages, consumer packaged goods, and personal items.

13. The system of claim 1, further comprising a point-of-sale computing device that communicates via the network, wherein the point-of-sale computing device transmits to the at least one processor at least a portion of sales history for the consumer products associated with the first request and the related consumer products having the one or more master attributes different from the one or more master attributes associated with the first request.

14. An ingredient data system that ingests text and graphics of product labels associated with consumer products, the system comprising:
　a memory having instructions stored thereon; and
　at least one processor to execute the instructions to:
　　process and parse the text and graphics of images of the product labels to identify at least one piece of constituent information from the text and graphics, associate one or more base attributes to each piece of the constituent information, and assign one or more of the base attributes to one or more master attributes that are descriptive of one of claims, ingredients, and nutritional information of one or more of the consumer products having the product labels;
　　store in a database the images of the product labels, one or more of the base attributes, and one or more of the master attributes associated with each of the product labels of the consumer products;
　　receive a first request about one or more of the consumer products having one or more of the master attributes;
　　retrieve at least a portion of one of one or more of the images of the product labels from the database based on one or more of the master attributes associated with the first request and at least a portion of one or more images of product labels associated with related consumer products from the database having at least one master attribute different from one or more of the master attributes associated with the first request; and
　　transmit via a network a representation of an electronic label view to a user interface on a client computing device that displays one or more of the master attributes associated with the first request, at least a portion of each of the images of one or more of the product labels having one or more of the master attributes associated with the first request, and at least a portion of each of the images of one or more of the product labels associated with the related consumer products, wherein the first request is from one of a retailer and a brand owner, and wherein the electronic label view displays via the user interface at least a portion of each of the images of one or more of the product labels of the consumer products that are not associated with the first request and detail regarding constituent information set forth in or absent from one or more of the product labels associated with the related consumer products having at least one master attribute different from one or more of the master attributes associated with the first request.

15. The system of claim 14, wherein the user interface receives an adjustment of one or more of the base attributes, which were assigned to the one or more of the master attributes associated with the first request.

16. The system of claim 14, wherein the at least one processor further executes the instructions to:
　receive a second request about one or more of the related consumer products; and
　transmit, in response to the second request, a representation of the electronic label view to the user interface to display at least a portion of each of the images of one or more of the product labels associated with the related consumer products and detail regarding constituent information set forth in or absent from one or more of the product labels associated with the related consumer products having at least one master attribute different from one or more of the master attributes associated with the first request.

17. The system of claim 14, wherein one or more of the master attributes associated with the first request provide information via the user interface to the client device that is different from the text and graphics of the product labels of the consumer products having the one or more master attributes.

18. The system of claim 14, wherein the at least one processor further executes the instructions to:
　generate and populate a first layer of information that includes in combination, at least a portion of the images of one or more of the product labels, one or more of the base attributes associated with the constituent information identified in the text and graphics on one or more of the product labels, and one or more of the master attributes associated with the one or more of the base attributes;
　generate and populate a second layer of information with information from the first layer of information and receive changes to the second layer of information via the user interface; and
　transmit contents of the electronic label view to the user interface to display at least the second layer of information with the changes received from the user interface.

19. The system of claim 18, the at least one processor further executes the instructions to accept changes via the user interface to the second layer of information while preventing changes to the first layer of information via the user interface.

20. The system of claim 14, wherein the consumer products having the product labels are selected from a group consisting of at least one of foods, beverages, consumer packaged goods, and personal items.

* * * * *